(12) United States Patent
Hirao et al.

(10) Patent No.: US 8,456,564 B2
(45) Date of Patent: Jun. 4, 2013

(54) IMAGING LENS, IMAGING DEVICE, AND MOBILE TERMINAL

(75) Inventors: Yusuke Hirao, Sakai (JP); Keiji Matsusaka, Osaka (JP); Yasunari Fukuta, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 560 days.

(21) Appl. No.: 12/667,252

(22) PCT Filed: Jun. 25, 2008

(86) PCT No.: PCT/JP2008/061557
§ 371 (c)(1),
(2), (4) Date: Dec. 30, 2009

(87) PCT Pub. No.: WO2009/004965
PCT Pub. Date: Jan. 8, 2009

(65) Prior Publication Data
US 2010/0188555 A1   Jul. 29, 2010

(30) Foreign Application Priority Data
Jul. 4, 2007 (JP) .................................. 2007-176621

(51) Int. Cl.
*H04N 5/225* (2006.01)
*G02B 9/00* (2006.01)
*G02B 13/18* (2006.01)
*G02B 9/12* (2006.01)

(52) U.S. Cl.
USPC ............ 348/340; 359/754; 359/708; 359/784

(58) Field of Classification Search
USPC ............... 348/239, 14.08, 340; 359/754, 708, 359/784, 676, 678, 683, 690
See application file for complete search history.

(56) References Cited

U.S. PATENT DOCUMENTS 5,995,279 A * 11/1999 Ogino et al. ................... 359/355
6,847,389 B2 * 1/2005 Shiraishi ....................... 347/134

(Continued)

FOREIGN PATENT DOCUMENTS

EP   2 120 078   11/2009
JP   2004-212481 A   7/2004

(Continued)

OTHER PUBLICATIONS

Search Report issued on Feb. 6, 2012 in the corresponding European application No. EP 08 76 5832.

*Primary Examiner* — Aung S Moe
*Assistant Examiner* — Amy Hsu
(74) *Attorney, Agent, or Firm* — Cozen O'Connor

(57) ABSTRACT

Provided are a wafer scale lens, which is so short in an optical total length with respect to an image height that it can correct an aberration satisfactory, and an optical system including the wafer scale lens and having a thin lens element on the side closest to the image. The optical system includes a first lens having a positive refractive power relative to an object, and a second lens arranged on the side of the image of the first lens and having a recessed shape on the side of the object. At least one lens is arranged on the side of the second lens. When that one of the lenses arranged on the side of the image of the second lens, which is arranged on the side closest to the image, is an i-th lens (i>3), this i-th lens includes an i-th lens flat plate and is formed on the object side of the i-th lens flat plate but has a refractive index different from that of the i-th lens flat plate, and a lens element having a convex shape on the object side where the main light ray of the maximum image height passes. Moreover, the ratio between the optical axial distance (or the lens distance) between a (i−1)-th lens and the i-th lens and the optical axis distance (or the optical total length) from the object side face of the first lens to the image face is 0.01 to 0.15.

18 Claims, 40 Drawing Sheets

U.S. PATENT DOCUMENTS

| | | | |
|---|---|---|---|
| 6,985,306 B2 | 1/2006 | Abe | 359/716 |
| 7,295,383 B2 | 11/2007 | Saito | 359/716 |
| 7,342,731 B2 | 3/2008 | Lee et al. | 359/772 |
| 7,505,210 B2* | 3/2009 | Kuroda et al. | 359/676 |
| 7,636,202 B2* | 12/2009 | Watanabe et al. | 359/691 |
| 7,884,979 B2* | 2/2011 | Miyatake | 358/513 |
| 2003/0016453 A1* | 1/2003 | Momoki | 359/691 |
| 2003/0197945 A1* | 10/2003 | Kurata | 359/649 |
| 2004/0141242 A1 | 7/2004 | Abe | 359/792 |
| 2005/0041302 A1* | 2/2005 | Ozaki et al. | 359/680 |
| 2006/0221467 A1 | 10/2006 | Chen et al. | |
| 2006/0256453 A1* | 11/2006 | Endo | 359/754 |
| 2006/0262416 A1 | 11/2006 | Lee et al. | 359/645 |
| 2007/0091470 A1* | 4/2007 | Saito | 359/791 |
| 2007/0109662 A1* | 5/2007 | Ohno | 359/682 |
| 2007/0126898 A1 | 6/2007 | Feldman et al. | |
| 2007/0273981 A1* | 11/2007 | Sato et al. | 359/690 |
| 2008/0007808 A1* | 1/2008 | Ogasawara et al. | 359/30 |

FOREIGN PATENT DOCUMENTS

| | | |
|---|---|---|
| JP | 2006-301230 A | 11/2006 |
| JP | 2006-323365 A | 11/2006 |
| JP | 2007-47513 A | 2/2007 |
| JP | 2006-114473 A | 5/2007 |
| JP | 3976782 B1 | 6/2007 |
| JP | 3946245 B1 | 7/2007 |
| WO | WO 2004/027880 | 4/2004 |
| WO | WO 2008/011003 | 1/2008 |
| WO | WO 2009/004965 A1 | 1/2009 |

* cited by examiner

IMAGING LENS, IMAGING DEVICE, AND MOBILE TERMINAL

RELATED APPLICATIONS

This application is a U.S. National Phase Application under 35 USC 371 of International Application PCT/JP2008/061557 filed Jun. 25, 2008, which claims priority from Japanese Patent Application No. 2007-176621 filed Jul. 4, 2007.

TECHNICAL FIELD

The present invention relates to an imaging lens for photographing a subject, and an imaging lens of an imaging device using solid-state image sensing devices such as a CCD image sensor and a CMOS image sensor. In detail, the present invention relates to an image imaging lens in an optical system using a wafer-scale lens that is suitable for mass production and an imaging device using the imaging lens.

BACKGROUND ART

Small and thin imaging devices have come to be installed in personal digital assistants, which are small-sized and thin electronic equipment, such as a portable telephone and a PDA (Personal Digital Assistant). Whereby, it is possible to mutually transmit not only voice information but also image information to a remote place.

With respect to an image sensor used for such an imaging device, solid-state image sensing devices, such as a CCD (Charge Coupled Device) image sensor and a CMOS (Complementary Metal-Oxide Semiconductor) image sensor, are used. In order to reduce the cost, resin that can be mass-produced inexpensively has come to be used to manufacture a lens, which forms a subject image on these image sensors.

A type of optical system structured with three plastic lenses or with one glass lens and two plastic lenses is generally well known as an imaging lens used in the imaging device which is used in such a personal digital assistant. However, there is a technical limitation to achieving both of further microminiaturization of these optical systems and a mass-production capability required for use in a personal digital assistant.

In order to solve such a problem, a method of forming a lens and an optical system utilizing a replica method that simultaneously forms many lenses on one lens flat plate has been proposed (for example, refer to patent reference No. 1). Patent reference No. 1 discloses an imaging lens, in which a diffracting plane and a refracting interface are simultaneously produced on a lens flat plate and aberration is corrected.

However, it is not easy to form a diffracting surface and a refracting interface simultaneously on a lens flat plate. There are problems, in use of diffracting surface, that the diffraction efficiency decreases in wavelengths other than a design wavelength and that there is a large restriction to the angle of the incident light entering into the diffracting surface due to the poor angle characteristic of the incident light to the diffracting surface. Thus, there is a problem of difficulty in securing a wide field angle. In an optical system given in a patent reference No. 1, although the thickness of a lens element is not thick, there is a problem of a large astigmatism.

In the replica method, in order to easily give an aspheric surface shape, there is a technique in which UV hardening type resin is fixed by a metallic mold on a lens flat plate and UV hardening type resin is hardened by irradiation of a ultraviolet light. In this technique, in the case where the thickness of UV hardening type resin section is approximately greater than 0.25 (mm), there is a problem that a penetration of ultraviolet rays is poor and UV hardening type resin cannot be hardened sufficiently.

Patent reference No. 1: Laid-Open Japanese Patent Application Publication No. 2006-323365

DISCLOSURE OF INVENTION

Object of the Invention

The present invention has been made in view of such circumstances. An object of the present invention is to provide an optical system in which the most image-side lens element is thin, and in which optical system a lens structure is constituted of at least three lenses without using a diffracting surface, an optical overall length is short with respect to a image height, an astigmatism and other aberrations are well corrected, and a wafer-scale lens is included.

Here, the optical overall length is the distance from the most object-side lens surface to the most solid-state image-sensor-side lens. In a case of a bonded lens, the term of lens refers to all of the positive lens section (lens having a positive refractive power) and the negative lens section (lens having a negative refractive power). In the case where a lens flat plate (lens which does not have a convex or concave surface but has a flat surface) is included, the term lens refers all of the lens flat plate and a lens section formed on the surface of the lens flat plate. In each case, an individual lens section is called a lens element.

Means for Solving the Object

An above-mentioned object is attained by an invention described in any one of the following Items 1-18.

1. An imaging lens, comprising:
   a first lens having a positive refracting power and facing an object;
   a second lens which is provided on an image side of the first lens and has a concave shape toward an object side; and
   at least one lens or more provided on the image side of the second lens,
   wherein an i-th ($i \geq 3$) lens, which is counted from the object side and is provided on the most image side in the lens or lenses disposed on the image side of the second lens, includes:
   an i-th lens flat plate; and
   a lens element which is formed on an object-side surface of the i-th lens flat plate, has a different refractive index than the i-th lens flat plate, and has a convex shape toward the object side at a position where a principal ray of a maximum image height passes through,
   wherein the following relationship is satisfied:

$$0.01 < Di/Dt < 0.15 \tag{A}$$

where:
   Di is an optical axis distance, which is a lens interval, between an (i−1)th lens counted from the object side and the i-th lens; and
   Dt is an optical axis distance, which is an overall optical distance, from an object-side surface of the first lens and an image plane.

2. An imaging lens, comprising:
   a first lens having a positive refracting power and facing an object;
   a second lens which is provided on an image side of the first lens and has a concave shape toward an object side; and at least one lens or more provided on the image side of the second lens, wherein an i-th (i≧3) lens, which is counted from the object side and is provided on the most image side in the lens or lenses disposed on the image side of the second lens, includes:

an i-th lens flat plate;

a lens element which is formed on an object-side surface of the i-th lens flat plate, has a different refractive index than the i-th lens flat plate, and has a convex shape toward the object side at a position where a principal ray of a maximum image height passes through; and a lens or a lens element provided on the most objective side in the i-th lens.

3. An imaging lens, comprising:

a first lens having a positive refracting power and facing an object;

a second lens which is provided on an image side of the first lens and has a concave shape toward an object side; and at least one lens or more provided on the image side of the second lens, wherein an i-th (i≧3) lens, which is counted from the object side and is provided on the most image side in the lens or lenses disposed on the image side of the second lens, includes:

an i-th lens flat plate;

which is formed on a object-side surface of the i-th lens flat plate, has a different refractive index than the i-th lens flat plate, has a convex shape toward the object side at a position where a principal ray of a maximum image height passes through; and on an image-side surface of an (i−1)th lens provided on the object side of the i-th lens, and has a convex shape toward the image side at a position where the principal ray of the maximum image height passes through.

4. The imaging lens of any one of claims 1 to 3, wherein the following relationship is satisfied:

[Mathematical Expression 1]

$$0.6 \le \frac{f_{s1}}{f} \le 1.3 \qquad (1)$$

where:

$f_{s1}$ is a focal length of an object-side lens surface of an object-side lens element of the first lens; and f is a focal length of a lens system.

5. The imaging lens of any one of claims 1 to 4, wherein an image-side surface of an ib-th lens element formed on an image-side surface of the i-th lens satisfies, at a position which is a distance h apart from the optical axis and at which the principal ray of the maximum image height passes through, the following relationship:

[Mathematical Expression 2]

$$\frac{|X - X_0|}{Y} < 0.16 \qquad (2)$$

where:

X is an aspherical deviation given by the following Equation (a);

$X_0$ is an aspherical deviation of a rotational quadric surface given by the following Equation (b); and Y is a maximum image height in an optical system,

[Mathematical Expression 3]

$$X = \frac{h^2/R_{ib}}{1 + \sqrt{1 - (1+K_{ib})h^2/R_{ib}^2}} + \sum A_m h^m \qquad \text{Equation (a)}$$

[Mathematical Expression 4]

$$X_0 = \frac{h^2/R_{ib}}{1 + \sqrt{1 - (1+K_{ib})h^2/R_{ib}^2}} \qquad \text{Equation (b)}$$

where:

$A_{im}$ is an m-order aspherical coefficient of an image-side lens surface of the ib-th lens element;

$R_{ib}$ is a radius of curvature of the image-side lens surface of the ib-th lens element; and $K_{ib}$ is a conical coefficient of the image-side lens surface of the ib-th lens element.

6. The imaging lens of any one of claims 1 to 5, wherein the first lens is a cemented lens configured of a lens element having a positive refracting power and a lens element having a negative refracting power, and the following relationship is satisfied:

[Mathematical expression 5]

$$5 < |v_1 - v_2| < 70 \qquad (3)$$

where:

$v_1$ is an Abbe's number of the lens element, of the first lens, having a positive refracting power; and $v_2$ is an Abbe's number of the lens element, of the first lens, having a negative refracting power.

7. The imaging lens of any one of claims 1 to 5, wherein the first lens includes:

a first lens flat plane;

a 1f-th lens element formed on an object-side surface of the first lens flat plate and having a positive refracting power; and a 1b-th lens element formed on an image-side surface of the first lens flat plate and having a negative refracting power, wherein the following relationship is satisfied:

[Mathematical Expression 6]

$$5 < |v_1 - v_2| < 70 \qquad (3')$$

where:

$v_1$ is an Abbe's number of the lens element, of the first lens, having a positive refracting power; and $v_2$ is an Abbe's number of the lens element, of the first lens, having a negative refracting power.

8. The imaging lens of any one of claims 1 to 7, wherein the second lens is a meniscus lens which has a convex surface toward the image side.

9. The imaging lens of any one of claims 1 to 7, wherein the second lens includes:

a second lens flat plane;

a 2f-th lens element which is formed on an object-side surface of the second lens flat plane and has a negative refracting power; and a 2b-th lens element which is formed on an image-side surface of the second lens flat plane and has a positive refracting power.

10. The imaging lens of any one of claims 1 to 9, wherein an object-side surface of the lens element formed on an object-side surface of the i-th lens flat plate is aspheric surface having a concave shape toward the object side in the vicinity of the optical axis.

11. The imaging lens of any one of claims 1 to 10, comprising:

at least a lens or a lens element which are made of resin material.

12. The imaging lens of any one of claims 1 to 11, wherein all of the first lens to the i-th lens have a lens flat plate having a refractive index different than respective lens elements.

13. The imaging lens of any one of claims 1 to 12, wherein lens elements included in the respective lenses are made of UV hardening resin material, and the following relationship is satisfied:

[Mathematical Expression 7]

$$5 < |v_1 - v_2| < 40 \tag{4}$$

where:

$v_1$ is an Abbe's number of the lens element having a positive refracting power in the first lens, or is an Abbe's number of a 1f-th lens element if the first lens includes an lens flat plane; and $v_2$ is an Abbe's number of the lens element having a negative refracting power in the first lens, or is an Abbe's number of a 1b-th lens element if the first lens includes a lens flat plate.

14. The imaging lens of any one of claims 1 to 13, wherein i=3 for the i-th lens.

15. The imaging lens of any one of claims 1 to 14, wherein any one of the lens flat plates included in the lenses has an optical functional thin film on the surface thereof.

16. The imaging lens of any one of claims 1 to 15, wherein the lens elements have an aspherical shape on a lens surface other than a surface which is in touch with the lens flat plate.

17. An imaging device, comprising:
the imaging lens of any one of claims 1 to 16; and
a solid-state image sensor.

18. A mobile terminal, comprising:
the imaging device of claim 17.

Advantage of the Invention

According to the present invention, the incidence angle of the peripheral light ray with respect to a lens element formed on the image-side surface of the i-th flat plate is kept small by forming a convex shape directed to the object-side on a lens element formed on an object-side surface of an i-th flat plane lens at the most distant position (in the vicinity of the optical path, which is most distant from the optical axis, of the light ray emitted from an object) from the optical axis. Thereby, a lens element formed on the image-side surface of the i-th lens flat plate does not need to control the incidence angle with respect to a solid-state image sensing device small. Therefore, aspheric surface sag amount is reduced. Thus, the lens element on the i-th lens flat plate can be thin, and a miniaturization of the whole imaging lens can be attained. A conditional relationship (A) specifies a distance on the optical axis (distance between lenses) between the (i−1)th lens and the i-th lens. In order to satisfy the conditional relationship (A), the (i−1)th lens is put closer to the image side as much as possible, and the (i−1)th lens thus works as a negative lens in order to maintain the telecentricity of the light ray at the maximum view angle. As a result, a lens element of the first lens can be made thin.

In the present invention, the error sensitivity that heavily depends on a diaphragm position can be moderated by placing the diaphragm the more image-side than the most object-side lens peak, in other words, by placing the lens or a lens element on the most object-side. The error sensitivity will become critical when arranging three or more lenses in a compact formation. By placing the diaphragm according to this arrangement, miniaturization and mass production capability are both possible.

In the present invention, the curvature of field in the peripheral portion can be satisfactorily corrected by making surface convex toward the image side at a position where the principal ray of the maximum image height passes through the (i−1)th lens. Therefore, the burden of aberration correction of the i-th lens can be reduced. Thus, it becomes possible to make the lens element of the i-th lens thin.

The conditional relationship (1) in the present invention specifies the focal length of the object-side surface of the first lens. A satisfactory aberration performance and a short overall optical length can be obtained by satisfying the conditional relationship (1).

NUMERALS

| | |
|---|---|
| 110 | First Lens flat plate |
| 110a | Aperture diaphragm |
| 111 | 1f-th lens Element |
| 112 | 1b-th lens Element |
| 120 | Second Lens flat plate |
| 121 | 2f-th lens Element |
| 122 | 2b-th lens Element |
| S101, S104, S105, S108, S109 and S112 | Lens surfaces |

BEST MODE FOR CARRYING OUT THE INVENTION

Hereinafter, a lens portion formed on a surface of a lens flat plate will be referred to as a lens element in each case. In the case where an L-th lens from the object side includes a lens flat plate, which is referred to as an L-th lens flat plate. A lens element disposed on an object side of the above mentioned L-th lens flat plate is referred to as an Lf-th lens element. A lens element arranged on an image side of the above mentioned L-th lens flat plate is referred to as Lb-th lens element. Here, L (L=1, 2, 3, 4 - - - ) represents the number of a lens in order from the object side. Hereinafter, a lens at the most image-side may be referred to as an i-th lens. The image side refers to a side on which an image formation is performed after a light passes through an imaging lens. Hereinafter, in the case where a solid-state image pick-up device (CCD) is used, the maximum image height refers to the highest (most distant from an optical axis) image height defined by a size of the sensor. Further, in the case where only lens system is taken into consideration, the maximum image height refers to the highest position of the image formed through the lens. A principal ray is a light ray that passes through the center of an aperture diaphragm (or an incidence pupil in object space) in an optical system.

First Embodiment of the Present Invention

Figure 1:
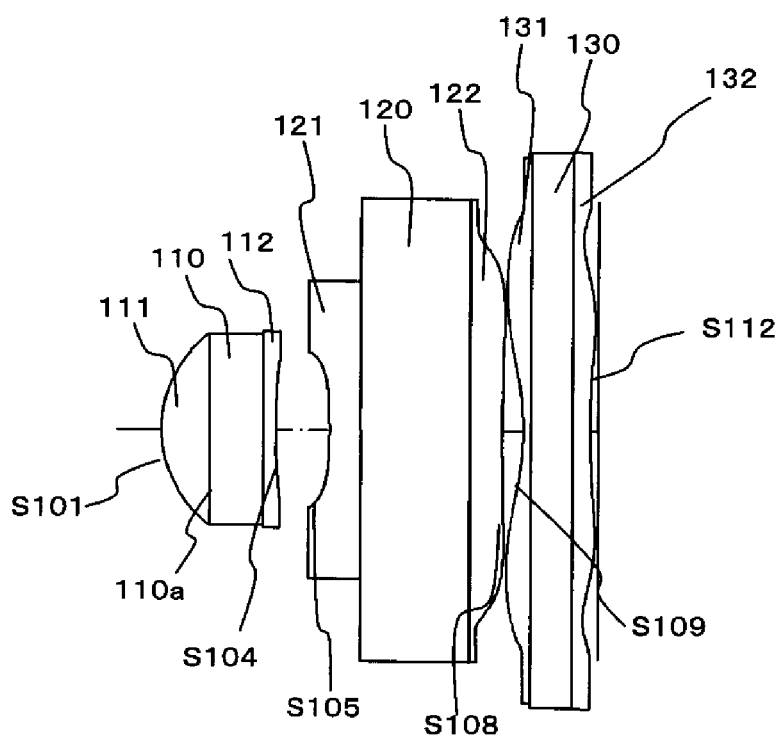
FIG. 1 illustrates a sectional view of an imaging lens according to a first embodiment of the present invention.

Hereinafter, an imaging lens according to a first embodiment of the present invention will be described. FIG. 1 illustrates a sectional view of the imaging lens according to this embodiment of the present invention.

As illustrated in FIG. 1, the imaging lens according to this embodiment of the present invention is configured of a lens system including a 1f-th lens element 111, an aperture diaphragm 110a, a first lens flat plate 110, a 1b-th lens element 112, a 2f-th lens element 121, a second lens flat plate 120, a 2b-th lens element 122, a 3f-th lens element 131, a third lens flat plate 130 and a 3b-th lens element 132 in the order from the object side. Here, the imaging lens configured of three lenses is described in this embodiment. However, the imaging lens may be configured of more lenses. For example, in the case where "i" (i>=4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 111 has a convex surface directed toward the object side and has a positive refractive power. The image side surface of the 1b-th lens element 112 has a concave surface directed toward the image side and has a negative refractive power. The object side surface of the 2f-th lens element 121 has a concave surface directed toward the object side and has a negative refractive power. The image side surface of the 2b-th lens element 122 has a concave surface directed toward the image side and has a negative refractive power. An 1f-th lens element has a concave surface directed toward the object side and has a negative refractive power near the optical axis of the object side surface. The 1f-th lens element has a convex surface directed toward the object side in the periphery of the object side surface. In this embodiment of the present invention, the 1f-th lens element 111, the 1b-th lens element 112, the 2f-th lens element 121, the 2b-th lens element 122, the 3f-th lens element 131, the third lens flat plate 130 and the 3b-th lens element 132 are made of a UV hardening type resin. The Abbe's number v1 of the 1f-th lens element 111 is set to 54. The Abbe's number v2 of the 1b-th lens element 112 is set to 29. Lens surfaces S101, S104, S105, S108, S109 and S112 have aspheric surface form.

In the embodiment having the above mentioned configuration, each parameter value of the imaging lens is as illustrated in Table 1 below. Here, "Sm" represents the m-th surface number sequentially from the object side. "Sm" also represents each surface of a lens element and a lens flat plate. The mutually bonded two surfaces are counted as one as a whole.

TABLE 1

| Sm | Curvature Radius (mm) | Surface Distance on Axis (mm) | Refractive Index | Abbe's Number | FIG. 1 |
|---|---|---|---|---|---|
| 1* | 0.926 | 0.350 | 1.507 | 54 | S101 |
| 2(ape) | ∞ | 0.385 | 1.587 | 50.919 | |
| 3 | ∞ | 0.092 | 1.574 | 29 | |
| 4* | 5 | 0.400 | | | S104 |
| 5* | −4.704 | 0.224 | 1.574 | 29 | S105 |
| 6 | ∞ | 0.797 | 1.587 | 50.919 | |
| 7 | ∞ | 0.231 | 1.574 | 29 | |
| 8* | −215.669 | 0.160 | | | S108 |
| 9* | −1.863 | 0.050 | 1.574 | 29 | S109 |
| 10 | ∞ | 0.300 | 1.587 | 50.919 | |
| 11 | ∞ | 0.130 | 1.574 | 29 | |
| 12* | 6.849 | 0.058 | | | S112 |

In this embodiment of the present invention, a ratio of Di/Dt=0.050 where "Di" represents a distance on an optical axial distance between the second lens and the third lens (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 111 and the 1b-th lens element 112 is represented by $|v_1-v_2|=25$. Thus, the difference in the Abbe's number satisfies the conditional relationship (4). A ratio of fsl/f=1.04 where "fsl" represents a focal length of the object side surface of the 1f-th lens element 111 and "f" represents a focal length of the overall optical system. Thus, the ratio of fsl/f satisfies the conditional relationship (1).

Figure 2:
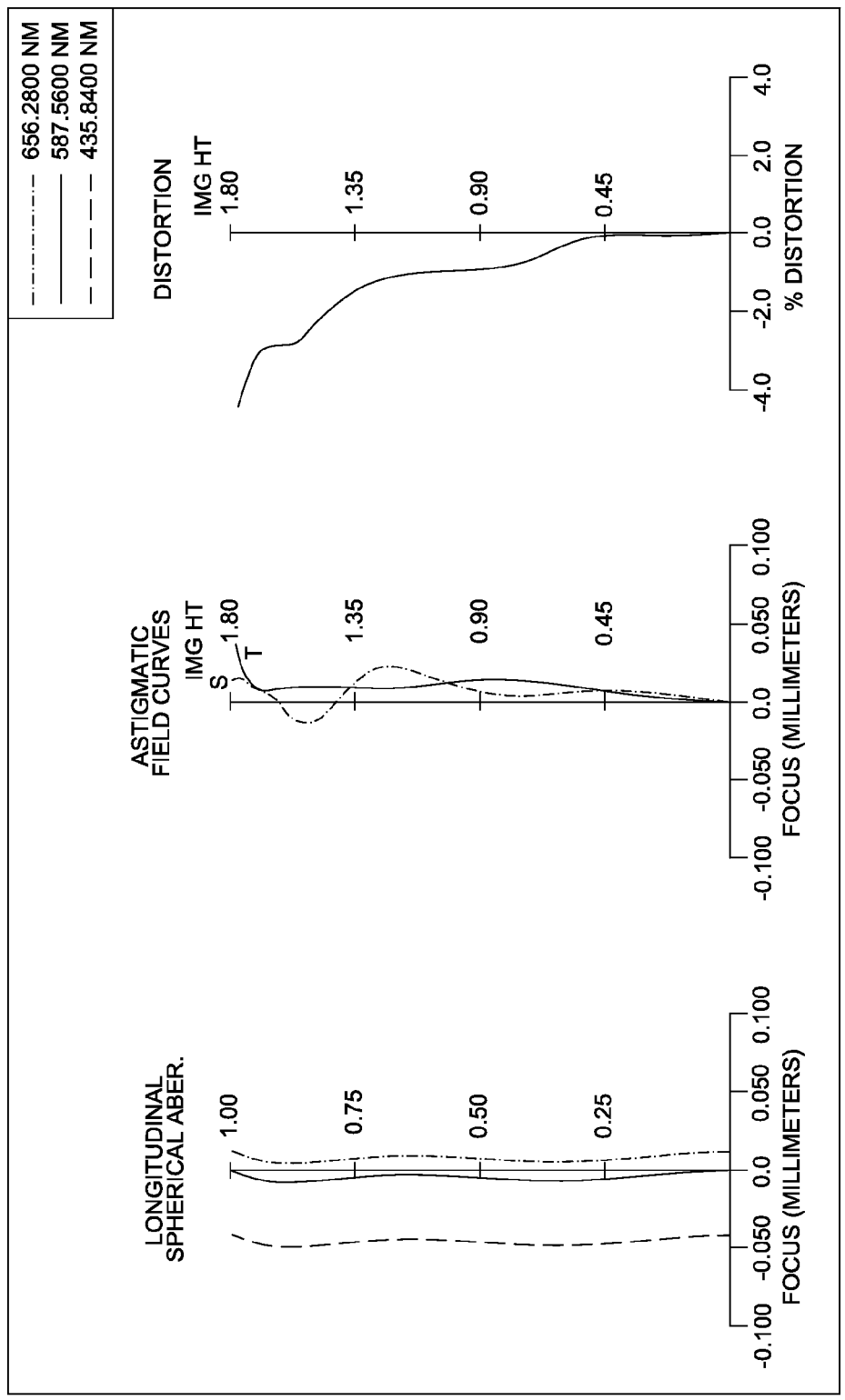
FIG. 2 illustrates aberration graphs of the imaging lens according to the first embodiment of the present invention.

FIG. 2 illustrates aberration graphs of the imaging lens of FIG. 1. FIG. 2 illustrates spherical aberration, astigmatism and distortion from the left. The spherical aberration graph illustrates how much the deviation of a focal position depends on the height of the incident light. In one spherical lens, the focal position shifts in the negative direction as the height of the incident light becomes higher. The spherical aberration graph in FIG. 2 illustrates deviation amounts for the lights of three waves. Here, the maximum height of the incident light is assumed to be 1 on the vertical axis. The astigmatism graph illustrates the focal point (the deviation amount from the paraxial focal point that is assumed to be zero) on a sagittal surface and a meridional surface. Here, a solid line represents a sagittal. The astigmatism graph in FIG. 2 indicates the amount at an image height "IMG HT". A distortion graph displays the shift amount, of the actual image height from the ideal image height, normalized by an image height. The paraxial value is assumed to be 0%. Similar aberration graphs to the above are used for all of the following embodiments. Although the lens system is simply configured, the lens system satisfies the conditional relationships (1) and (4), so that the overall optical length is short. Further, as illustrated in FIG. 2, the lens system obtains satisfactory aberration properties and allows the most image-side resin layer to be thin. By using the resin material, the cost can be maintained low, the production can be performed easily, a large quantity of lenses can be made at one time by irradiating UV light after a lens element has been formed on a glass plate. Also, the compatibility with the replica method is good.

Not only in this embodiment but other embodiments of the present invention, the aspheric surface is defined by the following mathematical expression. That is, where "X" represents a distance (sag amount), in the optical axis direction, from the tangent plane of a surface apex to the aspheric surface, "ρ" represents the height of the aspheric surface above the optical axis, "R" represents a paraxial curvature radius, "K" represents a conic constant and "$A_q$" (q=4, 6, 8, - - - , 20) represents q-th aspheric surface coefficient.

$$X = \frac{\rho^2/R}{1+\sqrt{1-(1+K)\rho^2/R^2}} + \sum A_q \rho^q \qquad \text{[Mathematical Expression 8]}$$

Therefore, the following Table 2 illustrates the value of "$A_q$" at the above-mentioned "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_o|/Y=0.07. \qquad \text{[Mathematical Expression 9]}$$

Thus, the Mathematical Expression 9 satisfies the conditional relationship (2).

TABLE 2

| S | K | A | B | C | D |
|---|---|---|---|---|---|
| 1 | 2.626E−01 | −3.537E−02 | −4.638E−01 | 2.010E+00 | −3.185E+00 |
| 4 | 6.205E+00 | 9.448E−03 | −2.448E−01 | 2.828E+00 | −1.171E+01 |
| 5 | −3.595E+01 | −4.986E−01 | 4.747E−01 | −6.496E+00 | 8.956E+00 |
| 8 | −1.000E+03 | 7.714E−02 | −1.096E−01 | 4.982E−02 | 1.557E−04 |
| 9 | −2.494E+00 | 1.430E−01 | −2.416E−02 | −4.832E−03 | 8.509E−04 |
| 12 | −1.000E+03 | 1.857E−01 | −3.212E−01 | 1.556E−01 | −1.705E−02 |

| S | E | F | G | H | J |
|---|---|---|---|---|---|
| 1 | −9.518E+00 | 3.442E+01 | −3.561E+01 | 9.604E+00 | 2.944E+00 |
| 4 | 1.334E+00 | 5.492E+01 | 1.366E+01 | −3.019E+01 | −3.271E+02 |
| 5 | 1.709E+01 | −5.982E+01 | −2.928E+01 | −7.829E+01 | −2.395E+02 |
| 8 | −8.714E−03 | −1.259E−03 | 1.202E−03 | 2.678E−04 | −8.898E−05 |
| 9 | 6.818E−04 | −1.263E−04 | 0.000E+00 | 0.000E+00 | 0.000E+00 |
| 12 | −5.055E−03 | 4.659E−04 | 2.479E−04 | 2.593E−05 | −1.654E−05 |

Second Embodiment

Figure 3:
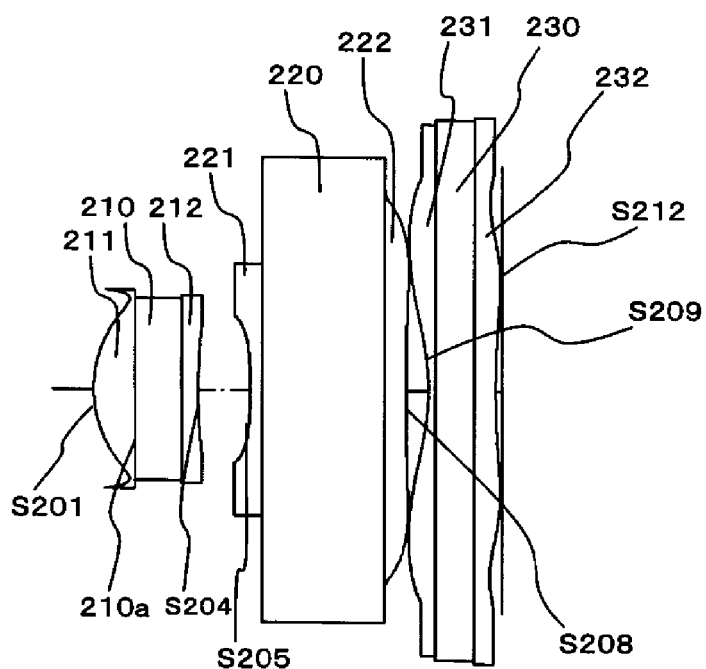
FIG. 3 illustrates a sectional view of the imaging lens according to a second embodiment of the present invention.

FIG. 3 illustrates a sectional view of the imaging lens according to an second embodiment of the present invention.

As illustrated in FIG. 3, the imaging lens according to this embodiment of the present invention is configured of a lens system including a 1f-th lens element 211, an aperture diaphragm 210a, a first lens flat plate 210, a 1b-th lens element 212, a 2f-th lens element 221, a second lens flat plate 220, a 2b-th lens element 222, a 3f-th lens element 231, a third lens flat plate 230 and a 3b-th lens element 232 in the order from the object side. Here, the imaging lens configured of three lenses is described in this embodiment. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 211 has a convex surface directed toward the object side and has a positive refractive power. The image side surface of the 1b-th lens element 212 has a concave surface directed toward the image side and has a negative refractive power. The object side surface of the 2f-th lens element 221 has a concave surface directed toward the object side and has a negative refractive power. The image side surface of the 2b-th lens element 222 has a concave surface directed toward the image side and has a negative refractive power. An 3f-th lens element 231 has a concave surface directed toward the object side and has a negative refractive power near the optical axis of the object side surface. The 3f-th lens element 231 has a convex surface directed toward the object side in the periphery of the object side surface. In this embodiment of the present invention, the 1f-th lens element 211, the 1b-th lens element 212, the 2f-th lens element 221, the 2b-th lens element 222, the 3f-th lens element 231, the third lens flat plate 230 and the 3b-th lens element 232 are made of a UV hardening type resin. The Abbe's number v1 of the 1f-th lens element 211 is set to 54. The Abbe's number v2 of the 1b-th lens element 212 is set to 29. Lens surfaces S201, S204, S205, S208, S209 and S212 have aspheric surface form. The material used for each of the lens flat plate is different.

In the embodiment having the above mentioned configuration, each parameter value of the imaging lens is as illustrated in Table 3 below. Here, "Sm" represents the m-th surface number sequentially from the object side. "Sm" also represents each surface of a lens element and a lens flat plate. The mutually bonded two surfaces are counted as one as a whole.

TABLE 3

| Sm | Curvature Radius (mm) | Surface Distance on Axis (mm) | Refractive Index | Abbe's Number | FIG. 3 |
|---|---|---|---|---|---|
| 1* | 0.929 | 0.320 | 1.507 | 54 | S201 |
| 2(ape) | ∞ | 0.367 | 1.565 | 61.701 | |
| 3 | ∞ | 0.129 | 1.574 | 29 | |
| 4* | 5 | 0.400 | | | S204 |
| 5* | −5.074 | 0.094 | 1.574 | 29 | S205 |
| 6 | ∞ | 0.952 | 1.487 | 70.44 | |
| 7 | ∞ | 0.177 | 1.574 | 29 | |
| 8* | −162.583 | 0.170 | | | S208 |
| 9* | −1.727 | 0.050 | 1.574 | 29 | S209 |
| 10 | ∞ | 0.300 | 1.820 | 29.004 | |
| 11 | ∞ | 0.170 | 1.574 | 29 | |
| 12* | 5.722 | 0.049 | | | S212 |

In this embodiment of the present invention, a ratio of $Di/Dt=0.055$ where "Di" represents a distance on an optical axial distance between the second lens and the third lens (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 211 and the 1b-th lens element 212 is represented by $|v_1-v_2|=25$. Thus, the difference in the Abbe's number satisfies the conditional relationship (4). A ratio of $fsl/f=1.04$ where "fsl" represents a focal length of the object side surface of the 1f-th lens element 111 and "f" represents a focal length of the overall optical system. Thus, the ratio of fsl/f satisfies the conditional relationship (1).

Figure 4:
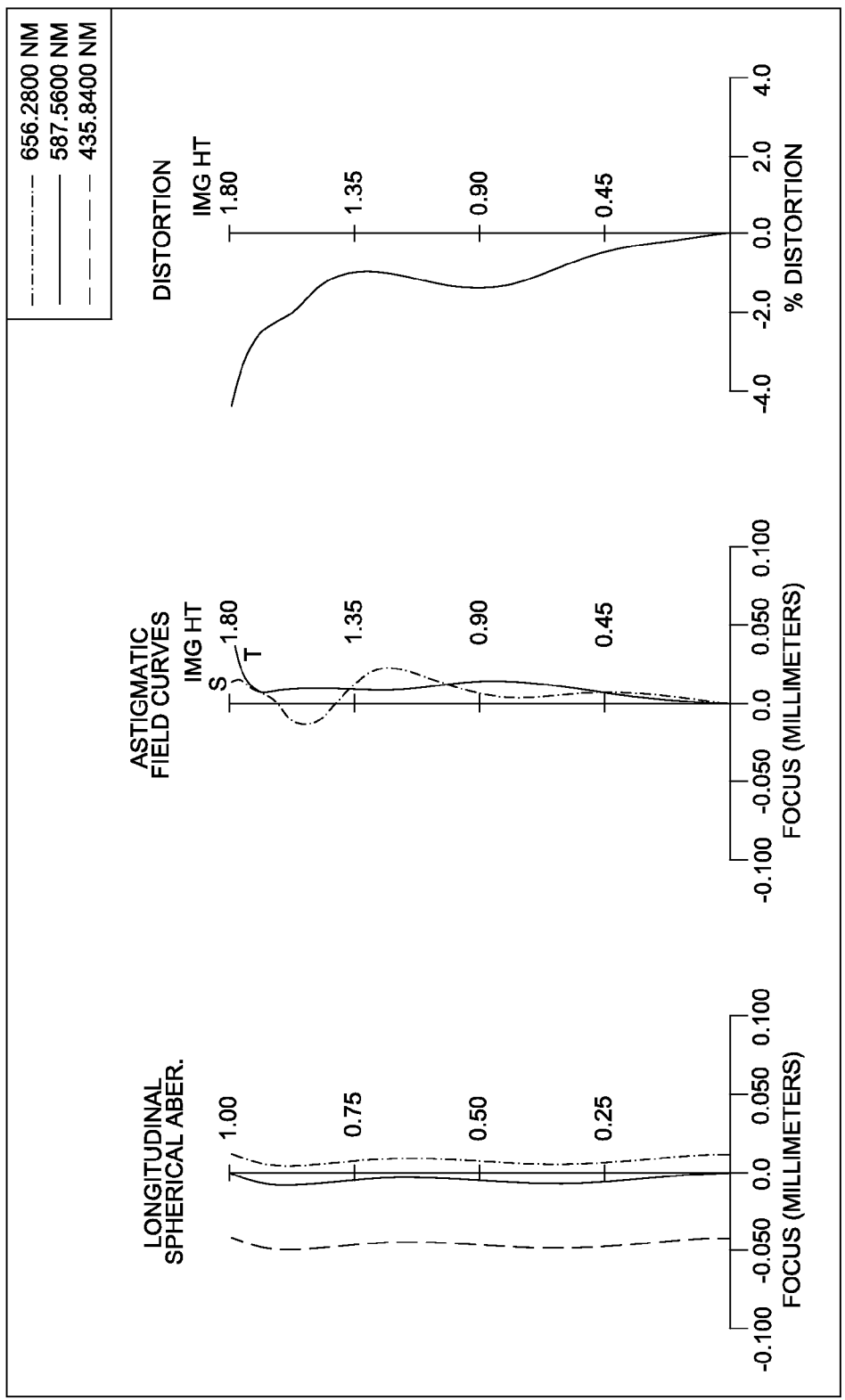
FIG. 4 illustrates aberration graphs of the imaging lens according to the second embodiment of the present invention.

FIG. 4 illustrates aberration graphs of the imaging lens of FIG. 3. Although the lens system is simply configured, the lens system satisfies the conditional relationships (1) and (4), so that the overall optical length is short. Further, as illustrated in FIG. 4, the lens system obtains satisfactory aberration properties and allows the most image-side resin layer to be thin. By using resin material, the cost can be maintained low, the production can be performed easily.

The following Table 4 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.10.$ [Mathematical Expression 10]

Thus, the Mathematical Expression 10 satisfies the conditional relationship (2).

TABLE 4

| S | K | A | B | C | D |
|---|---|---|---|---|---|
| 1 | 2.688E−01 | −3.546E−02 | −4.430E−01 | 1.980E+00 | −3.605E+00 |
| 4 | 5.340E+00 | 6.522E−03 | −1.058E−01 | 1.046E+00 | −2.184E+00 |
| 5 | −1.422E+01 | −4.543E−01 | 4.281E−01 | −5.903E+00 | 6.893E+00 |
| 8 | −1.000E+03 | 7.941E−02 | −9.730E−02 | 3.848E−02 | 2.471E−03 |
| 9 | −3.343E+00 | 1.334E−01 | −2.671E−02 | −4.747E−03 | 1.237E−03 |
| 12 | −1.000E+03 | 1.775E−01 | −3.192E−01 | 1.618E−01 | −1.871E−02 |

TABLE 4-continued

| S | E | F | G | H | J |
|---|---|---|---|---|---|
| 1 | −9.849E+00 | 4.106E+01 | −3.183E+01 | −7.537E+00 | −5.419E+01 |
| 4 | −1.723E+01 | 5.747E+01 | 1.366E+01 | −3.019E+01 | −3.271E+02 |
| 5 | 1.780E+01 | −5.061E+01 | −3.040E+01 | −8.285E+01 | −2.395E+02 |
| 8 | −8.244E−03 | −1.068E−03 | 1.246E−03 | 2.664E−04 | −1.220E−04 |
| 9 | 8.670E−04 | −1.959E−04 | 0.000E+00 | 0.000E+00 | 0.000E+00 |
| 12 | −6.078E−03 | 6.973E−04 | 2.866E−04 | 2.898E−05 | −1.947E−05 |

Third Embodiment

Figure 5:
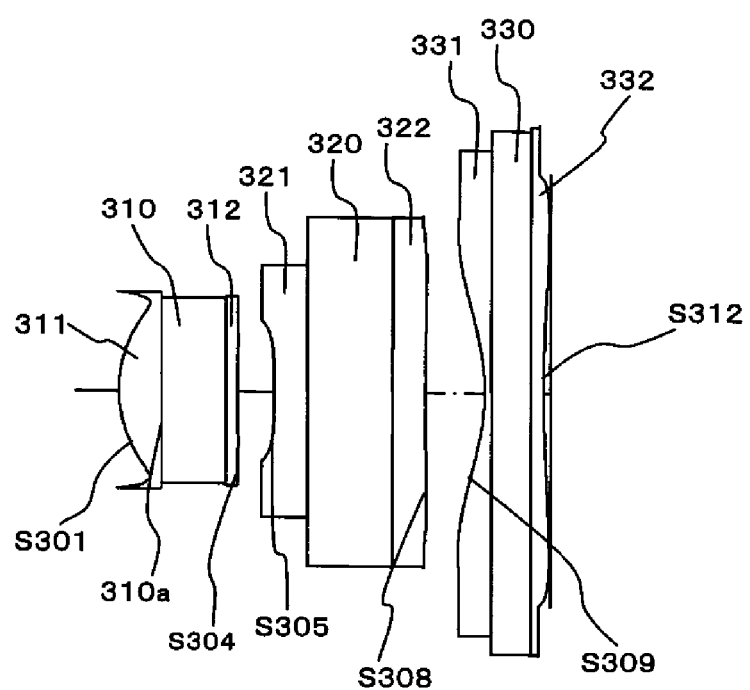
FIG. 5 illustrates a sectional view of the imaging lens according to a third embodiment of the present invention.

FIG. 5 illustrates a sectional view of the imaging lens according to a third embodiment of the present invention.

As illustrated in FIG. 5, the imaging lens according to this embodiment of the present invention is configured of a lens system including a 1f-th lens element 311, an aperture diaphragm 310a, a first lens flat plate 310, a 1b-th lens element 312, a 2f-th lens element 321, a second lens flat plate 320, a 2b-th lens element 322, a 3f-th lens element 331, a third lens flat plate 330 and a 3b-th lens element 332 in the order from the object side. Here, the imaging lens configured of three lenses is described in this embodiment. However, the imaging lens may be configured of more lenses. For example, in the case where "i" (i>=4) number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 311 has a convex surface directed toward the object side and has a positive refractive power. The image side surface of the 1b-th lens element 312 has a concave surface directed toward the image side and has a negative refractive power. The object side surface of the 2f-th lens element 321 has a concave surface directed toward the object side and has a negative refractive power. The image side surface of the 2b-th lens element 322 has a convex surface directed toward the image side and has a positive refractive power. An 3f-th lens element 331 has a concave surface directed toward the object side and has a negative refractive power near the optical axis of the object side surface. The 3f-th lens element 331 has a convex surface directed toward the object side in the periphery of the object side surface. In this embodiment of the present invention, the 1f-th lens element 311, the 1b-th lens element 312, the 2f-th lens element 321, the 2b-th lens element 322, the 3f-th lens element 331, and the 3b-th lens element 332 are made of a UV hardening type resin. The Abbe's number v1 of the 1f-th lens element 311 is set to 54. The Abbe's number v2 of the 1b-th lens element 312 is set to 29. Lens surfaces S301, S304, S305, S308, S309 and S312 have aspheric surface form.

In the embodiment having the above mentioned configuration, each parameter value of the imaging lens is as illustrated in Table 5 below. Here, "Sm" represents the m-th surface number sequentially from the object side. "Sm" also represents each surface of a lens element and a lens flat plate. The mutually bonded two surfaces are counted as one as a whole.

TABLE 5

| Sm | Curvature Radius (mm) | Surface Distance on Axis (mm) | Refractive Index | Abbe's Number | FIG. 5 |
|---|---|---|---|---|---|
| 1* | 1.032 | 0.330 | 1.507 | 54 | S301 |
| 2(ape) | ∞ | 0.492 | 1.591 | 55.694 | |
| 3 | ∞ | 0.085 | 1.574 | 29 | |
| 4* | 7.358 | 0.285 | | | S304 |
| 5* | −9.077 | 0.250 | 1.574 | 29 | S305 |
| 6 | ∞ | 0.650 | 1.591 | 55.694 | |
| 7 | ∞ | 0.250 | 1.574 | 29 | |
| 8* | −119.059 | 0.448 | | | S308 |
| 9* | −1.884 | 0.050 | 1.574 | 29 | S309 |
| 10 | ∞ | 0.300 | 1.591 | 55.694 | |
| 11 | ∞ | 0.100 | 1.574 | 29 | |
| 12* | 4.406 | 0.049 | | | S312 |

In this embodiment of the present invention, a ratio of Di/Dt=0.136 where "Di" represents a distance on an optical axial distance between the second lens and the third lens (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 311 and the 1b-th lens element 312 is represented by $|v_1-v_2|=25$. Thus, the difference in the Abbe's number satisfies the conditional relationship (4). A ratio of fsl/f=1.17 where "fsl" represents a focal length of the object side surface of the 1f-th lens element 311 and "f" represents a focal length of the overall optical system. Thus, the ratio of fsl/f satisfies the conditional relationship (1).

Figure 6:
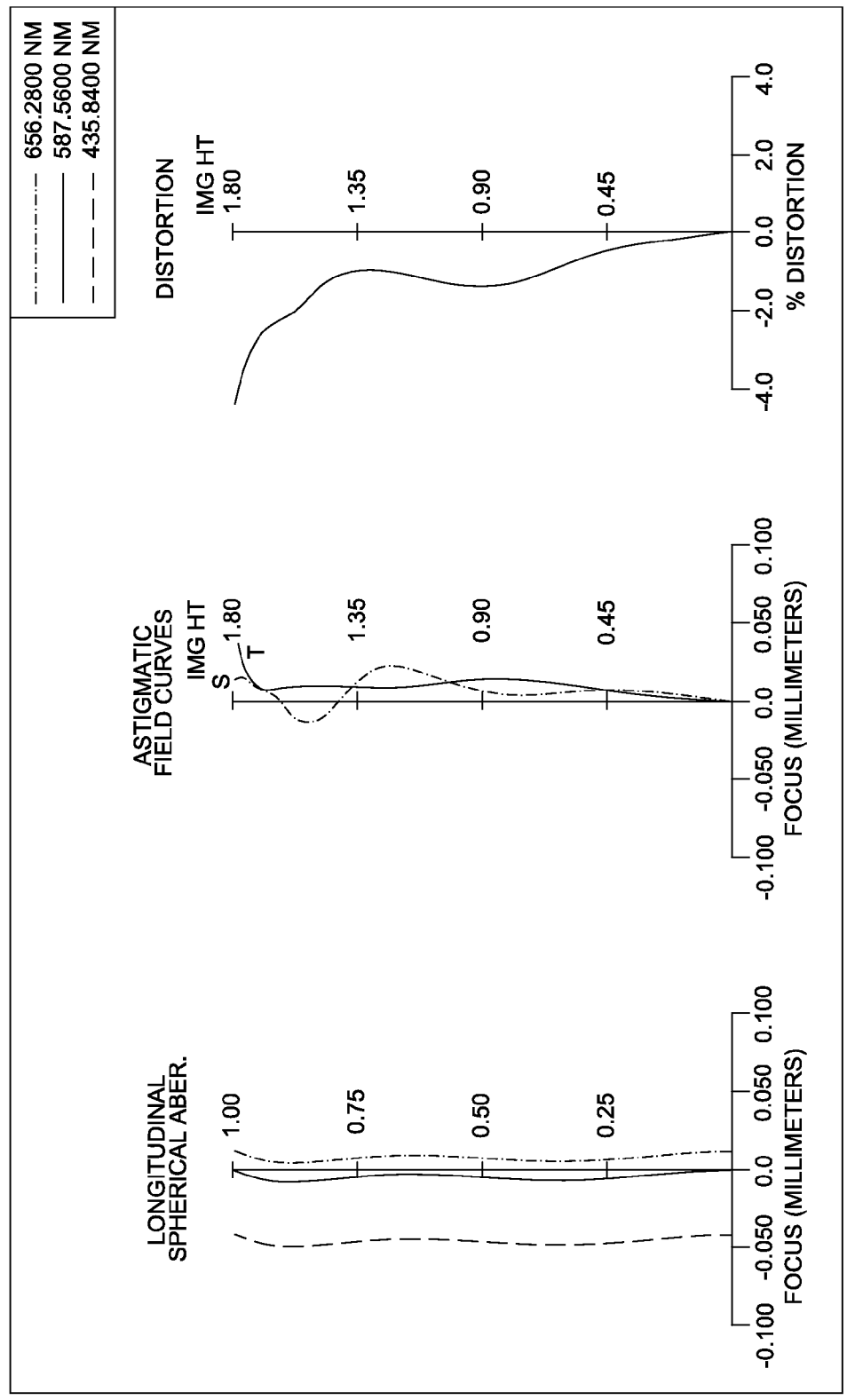
FIG. 6 illustrates aberration graphs of the imaging lens according to the third embodiment of the present invention.

FIG. 6 illustrates aberration graphs of the imaging lens of FIG. 5. Although the lens system is simply configured, the lens system satisfies the conditional relationships (1) and (4), so that the overall optical length is short. Further, as illustrated in FIG. 6, the lens system obtains satisfactory aberration properties and allows the most image-side resin layer to be thin. By using UV hardening resin, the cost can be maintained low, the production can be performed easily, a large quantity of lenses can be made at one time by irradiating UV light after a lens element has been formed on a glass plate. Also, the compatibility with the replica method is good.

The following Table 6 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.06$.                    [Mathematical Expression 11]

Thus, the Mathematical Expression 11 satisfies the conditional relationship (2).

TABLE 6

| S | K | A | B | C | D |
|---|---|---|---|---|---|
| 1 | 3.005E-01 | -4.475E-02 | -3.002E-01 | 1.436E+00 | -3.595E+00 |
| 4 | 3.070E+01 | -1.044E-01 | -4.187E-01 | 5.266E-01 | 1.994E+00 |
| 5 | -1.802E+03 | -6.085E-01 | 1.068E+00 | -6.408E+00 | 1.854E+00 |
| 8 | -1.000E+03 | 5.002E-02 | -4.435E-02 | 1.406E-02 | -1.776E-02 |
| 9 | 3.736E-01 | 1.028E-01 | 3.600E-02 | -1.610E-02 | -8.223E-04 |
| 12 | -1.000E+11 | 1.606E-01 | -2.456E-01 | 1.465E-01 | -2.586E-02 |

| S | E | F | G | H | J |
|---|---|---|---|---|---|
| 1 | -6.826E+00 | 3.901E+01 | -2.766E+01 | -3.558E+01 | -1.125E+01 |
| 4 | -2.040E+01 | -2.553E+01 | 1.798E+02 | -3.019E+01 | -3.271E+02 |
| 5 | 3.156E+01 | -6.853E+01 | -2.928E+01 | -7.829E+01 | -2.395E+02 |
| 8 | 2.029E-04 | 1.411E-02 | 1.418E-04 | -8.195E-03 | 2.898E-03 |
| 9 | 1.527E-03 | 8.519E-05 | 0.000E+00 | 0.000E+00 | 0.000E+00 |
| 12 | -5.853E-03 | 8.950E-04 | 4.440E-04 | 5.743E-05 | -3.681E-05 |

Fourth Embodiment

Figure 7:
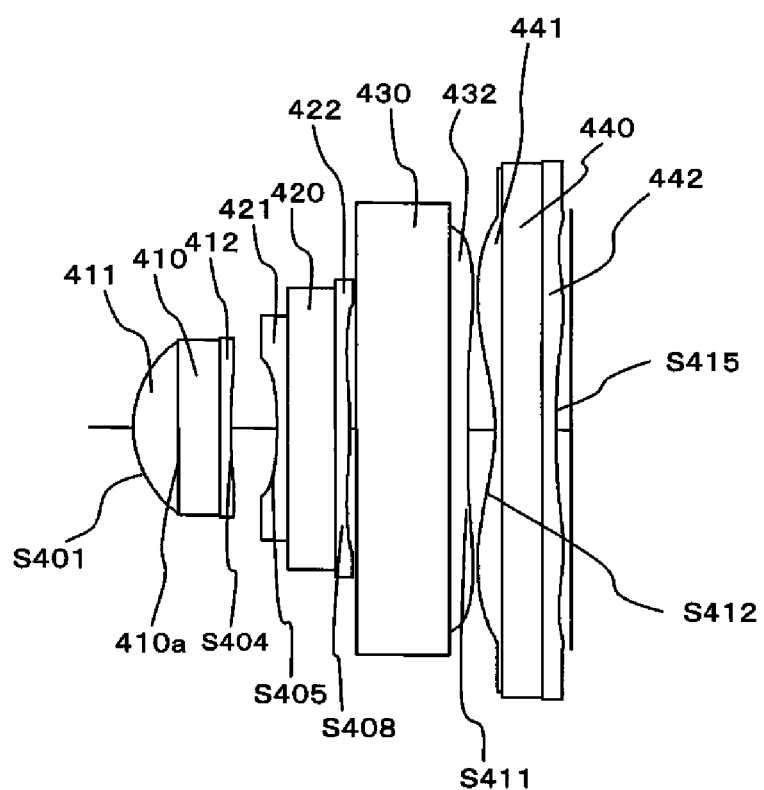
FIG. 7 illustrates a sectional view of the imaging lens according to a fourth embodiment of the present invention.

FIG. 7 illustrates a sectional view of the imaging lens according to a fourth embodiment of the present invention.

As illustrated in FIG. 7, the imaging lens according to this embodiment of the present invention is configured of a lens system including a 1f-th lens element 411, an aperture diaphragm 410a, a first lens flat plate 410, a 1b-th lens element 412, a 2f-th lens element 421, a second lens flat plate 420, a 2b-th lens element 422, a third lens flat plate 430, a 3b-th lens element 432, a 4f-th lens element 441, a 4-th lens flat plate 440, and a 4b-th lens element 442 in the order from the object side. Here, the imaging lens configured of fourth lenses is described in this embodiment. However, the imaging lens may be configured of more lenses. For example, in the case where "i" number of lenses are used, an i-th lens disposed at the most image side may be configured similar to the fourth lens in this embodiment. In this case, any kind of lens (for example, a bonded lens, a spherical lens or an aspherical lens) may be used in between the third lens and the i-th lens. Further, as long as the requested compactness can be secured, the number of lenses is not limited to four, and the number of lenses may be five or six. The object side surface of the 1f-th lens element 411 has a convex surface directed toward the object side and has a positive refractive power. The image side surface of the 1b-th lens element 412 has a concave surface directed toward the image side and has a negative refractive power. The object side surface of the 2f-th lens element 421 has a concave surface directed toward the object side and has a negative refractive power. The image side surface of the 2b-th lens element 422 has a convex surface directed toward the image side and has a positive refractive power. The image side surface of the 3b-th lens element 432 has a convex surface directed toward the image side and has a positive refractive power. The object side surface of the 4f-th lens element has a concave surface directed toward the object side and has a negative refractive power. The image side of the 4b-th lens element has a concave surface directed toward the image side and has a negative refractive power. In this embodiment of the present invention, the 1f-th lens element 411, the aperture diaphragm 410a, the first lens flat plate 410, the 1b-th lens element 412, the 2f-th lens element 421, the second lens flat plate 420, the 2b-th lens element 422, the third lens flat plate 430, the 3b-th lens element 432, the 4f-th lens element 441, the 4-th plate lens 440 and the 4b-th lens element 442 are made of a UV hardening type resin. The Abbe's number v1 of the 1f-th lens element 411 is set to 54. The Abbe's number v2 of the 1b-th lens element 412 is set to 29. Lens surfaces S401, S404, S405, S408, S411, S412 and S415 have aspheric surface form.

In the embodiment having the above mentioned configuration, each parameter value of the imaging lens is as illustrated in Table 7 below. Here, "Sm" represents the m-th surface number sequentially from the object side. "Sm" also includes each surface of a lens element and a lens flat plate. Surfaces muturally bonded are counted as one as a whole.

TABLE 7

| Sm | Curvature Radius (mm) | Surface Distance on Axis (mm) | Refractive Index | Abbe's Number | FIG. 7 |
|---|---|---|---|---|---|
| 1* | 0.923 | 0.330 | 1.507 | 54 | S401 |
| 2(ape) | ∞ | 0.300 | 1.530 | 48.910 | |
| 3 | ∞ | 0.080 | 1.574 | 29 | |
| 4* | 5 | 0.336 | | | S404 |
| 5* | -3.144 | 0.075 | 1.574 | 29 | S405 |
| 6 | ∞ | 0.359 | 1.530 | 48.910 | |
| 7 | ∞ | 0.100 | 1.574 | 29 | |
| 8* | -4.805 | 0.050 | | | |
| 9 | ∞ | 0.678 | 1.530 | 48.910 | |
| 10 | ∞ | 0.132 | 1.574 | 29 | |
| 11* | -277.220 | 0.200 | | | S411 |
| 12* | -1.681 | 0.050 | 1.574 | 29 | S412 |
| 13 | ∞ | 0.300 | 1.530 | 48.910 | |
| 14 | ∞ | 0.100 | 1.574 | 29 | |
| 15* | 15.376 | 0.108 | | | S414 |

In this embodiment of the present invention, a ratio of Di/Dt=0.063 where "Di" represents a distance between the third lens and the fourth lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 411 and the 1b-th lens element 412 is represented by $|v1-v2|=25$. Thus, the difference in the Abbe's number satisfies the conditional relationship (4). A ratio of fsl/f=1.01 where "fsl" represents a focal length of the object side surface of the 1f-th lens element 411 and "f" represents a focal length of the overall optical system. Thus, the ratio of fsl/f satisfies the conditional relationship (1).

Figure 8:
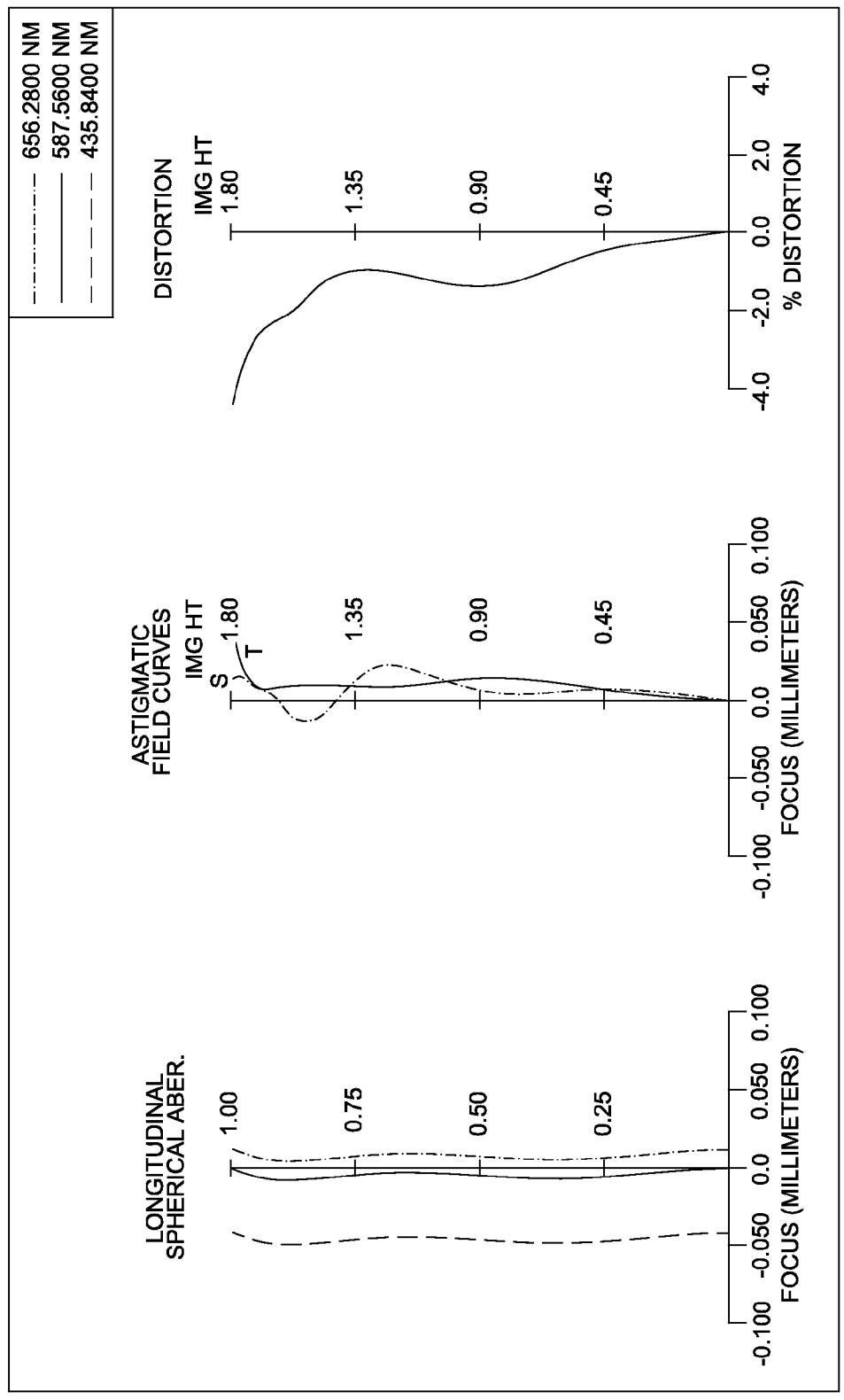
FIG. 8 illustrates aberration graphs of the imaging lens according to the fourth embodiment of the present invention.

FIG. 8 illustrates aberration graphs of the imaging lens of FIG. 7. The lens system is simply configured. The lens system satisfies the conditional relationships (1) and (4) so that the overall optical length is short. Further, as illustrated in FIG. 8, the lens system obtains satisfactory aberration properties and allows the most image-side resin layer to be thin. By using the UV hardening type resin material, the cost can be maintained low, the production can be performed easily, and a large quantity of lenses can be generated at one time by irradiating UV light after a lens element has been formed on a glass plate. Also, the compatibility with the reprica method is good.

The following Table 8 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.06$,  [Mathematical Expression 12]

Thus, the Mathematical Expression 12 satisfies the conditional relationship (2).

TABLE 8

| S | K | A | B | C | D |
|---|---|---|---|---|---|
| 1 | 2.768E−01 | −3.937E−02 | −2.964E−01 | 1.478E+00 | −3.810E+00 |
| 4 | 2.043E+01 | 2.874E−02 | −4.788E−01 | 3.302E+00 | −1.410E+01 |
| 5 | −9.387E+01 | −5.688E−01 | 9.324E−01 | −5.773E+00 | 5.954E+00 |
| 8 | 2.080E+01 | 1.618E−02 | 5.781E−02 | −6.961E−02 | −3.632E−02 |
| 11 | −1.000E+03 | 1.294E−01 | −1.376E−01 | 4.805E−02 | 7.376E−03 |
| 12 | −1.025E+01 | 8.523E−02 | −1.790E−02 | 7.431E−04 | −3.752E−05 |
| 15* | −1.000E+03 | 2.224E−01 | −3.203E−01 | 1.521E−01 | −1.798E−02 |

| S | E | F | G | H | J |
|---|---|---|---|---|---|
| 1 | −4.172E+00 | 2.598E+01 | −2.503E+01 | 9.604E+00 | 2.944E+00 |
| 4 | 3.198E+00 | 5.492E+01 | 1.366E+01 | −3.019E+01 | −3.271E+00 |
| 5 | 1.131E+01 | −5.986E+01 | −2.947E+01 | −7.938E+01 | −2.395E+02 |
| 8 | 2.855E−02 | 1.611E−02 | −7.643E−03 | −1.873E−02 | 5.595E−02 |
| 11 | −8.223E−03 | −1.401E−03 | 1.201E−03 | 2.209E−04 | −1.167E−04 |
| 12 | 3.178E−04 | −5.945E−05 | 0.000E+00 | 0.000E+00 | 0.000E+00 |
| 15* | −5.086E−03 | 4.892E−04 | 2.648E−04 | 3.593E−05 | −1.856E−05 |

Fifth Embodiment

Figure 9:
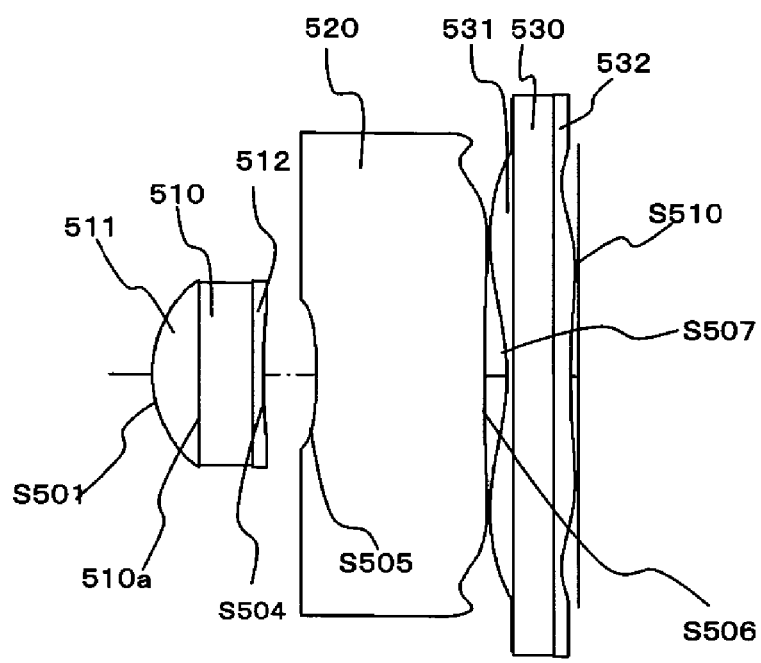
FIG. 9 illustrates a sectional view of the imaging lens according to a fifth embodiment of the present invention.

FIG. 9 illustrates a sectional view of the imaging lens according to a fifth embodiment of the present invention.

As illustrated in FIG. 9, the imaging lens according to this embodiment of the present invention is configured of a lens system including a 1f-th lens element 511, an aperture diaphragm 510a, a first lens flat plate 510, a 1b-th lens element 512, a second lens 520, a 3f-th lens element 531, a third lens flat plate 530 and a 3b-th lens element 532 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 511 has a convex surface directed toward the object side and has a positive refractive power. The image side surface of the 1b-th lens element 512 has a concave surface directed toward the image side and has a negative refractive power. The object side surface of the second lens 520 has a concave surface directed toward the object side. The image side surface of the second lens 520 has a convex surface directed toward the image side. The second lens 520 has a negative refractive power. The object side surface of the 3f-th lens element 531 has a concave surface directed toward the object side near the optical axis. In the periphery, the 3f-th lens element 531 has a convex surface directed toward the object side and has a negative refractive power. The image side surface of the 3b-th lens element 532 has a concave surface directed toward the image side and has a negative refractive power. In this embodiment of the present invention, the 1f-th lens element 511, the aperture diaphragm 510a, the first lens flat plate 510, the 1b-th lens element 512, the second lens 520, the 3f-th lens element 531, the third lens flat plate 530 and the 3b-th lens element 532 are made of a UV hardening type resin. The Abbe's number v1 of the 1f-th lens element 511 is set to 54. The Abbe's number v2 of the 1b-th lens element 512 is set to 29. Lens surfaces S501, S504, S505, S506, S507 and S510 have aspheric surface form.

In the embodiment having the above mentioned configuration, each parameter value of the imaging lens is as illustrated in Table 9 below. Here, "Sm" represents the m-th surface number sequentially from the object side. "Sm" also includes each surface of a lens element and a lens flat plate. Surfaces muturally bonded are counted as one as a whole.

TABLE 9

| Sm | Curvature Radius (mm) | Surface Distance on Axis (mm) | Refractive Index | Abbe's Number | FIG. 9 |
|---|---|---|---|---|---|
| 1* | 0.919 | 0.350 | 1.507 | 54 | S501 |
| 2(ape) | ∞ | 0.394 | 1.590 | 59.698 | |
| 3 | ∞ | 0.080 | 1.574 | 29 | |
| 4* | 5.000 | 0.403 | | | S504 |
| 5* | −4.409 | 1.249 | 1.574 | 29 | S505 |
| 6* | −175.543 | 0.163 | | | S506 |
| 7* | −1.837 | 0.050 | 1.574 | 29 | S507 |
| 8 | ∞ | 0.301 | 1.590 | 59.698 | |
| 9 | ∞ | 0.130 | 1.574 | 29 | |
| 10* | 6.557 | 0.058 | | | S510 |

In this embodiment of the present invention, a ratio of Di/Dt=0.051 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 511 and the 1b-th lens element 512 is represented by $|v1-v2|=25$. Thus, the difference in the Abbe's number satisfies the conditional relationship (4). A ratio of fsl/f=1.04 where "fsl" represents a focal length of the object side surface of the 1f-th lens element 511 and "f" represents a focal length of the overall optical system. Thus, the ratio of fsl/f satisfies the conditional relationship (1).

Figure 10:
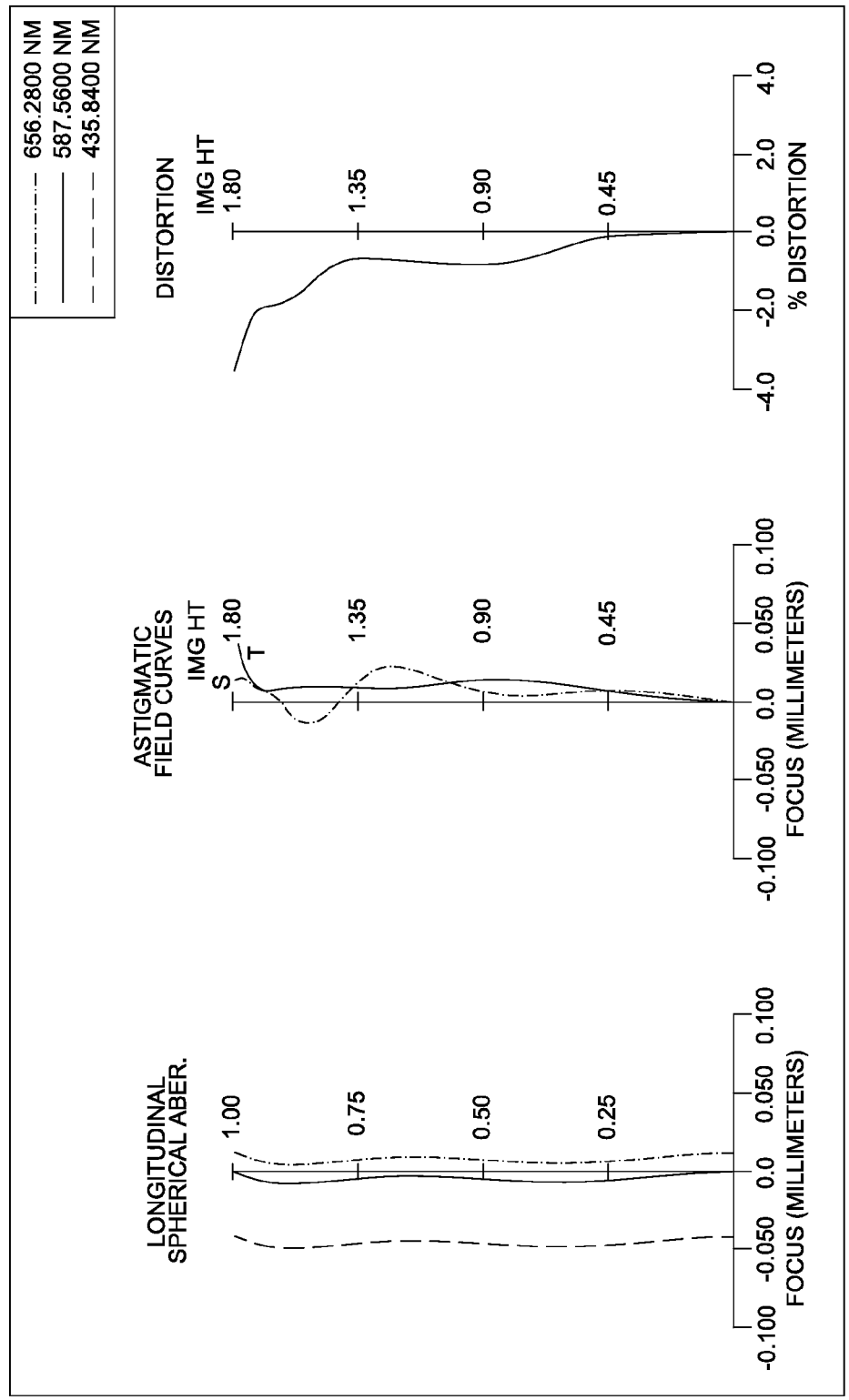
FIG. 10 illustrates aberration graphs of the imaging lens according to the fifth embodiment of the present invention.

FIG. 10 illustrates aberration graphs of the imaging lens of FIG. 9. The lens system is simply configured. The lens system satisfies the conditional relationships (1) and (4) so that the overall optical length is short. Further, as illustrated in FIG. 10, the lens system obtains satisfactory aberration properties and allows the most image-side resin layer to be thin. By using the resin material, the cost can be maintained low and the production can be performed easily.

The following Table 10 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_o|/Y=0.07.$$  [Mathematical Expression 13]

Thus, the Mathematical Expression 13 satisfies the conditional relationship (2).

TABLE 10

| S | K | A | B | C | D |
|---|---|---|---|---|---|
| 1 | 2.607E−01 | −3.857E−02 | −4.444E−01 | 2.025E+00 | −3.398E+00 |
| 4 | 6.720E+00 | 8.359E−03 | −2.423E−01 | 3.094E+00 | −1.290E+01 |
| 5 | −4.078E+01 | −5.199E−01 | 4.186E−01 | −6.256E+00 | 9.140E+00 |
| 6 | −1.000E+05 | 8.582E−02 | −1.100E−01 | 5.117E−02 | 7.913E−04 |
| 7 | −2.901E+00 | 1.455E−01 | −2.460E−02 | −4.527E−03 | 7.748E−04 |
| 10 | −1.000E+03 | 1.779E−01 | −3.197E−01 | 1.559E−01 | −1.710E−02 |

| S | E | F | G | H | J |
|---|---|---|---|---|---|
| 1 | −1.039E+01 | 3.370E+01 | −2.501E+01 | 9.604E+00 | 2.944E+00 |
| 4 | 3.209E+00 | 5.492E+01 | 1.366E+01 | −3.019E+01 | −3.271E+02 |
| 5 | 1.409E+01 | −5.982E+01 | −2.928E+01 | −7.829E+01 | −2.395E+02 |
| 6 | −8.594E−03 | −1.245E−03 | 1.174E−03 | 2.408E−04 | −9.665E−05 |
| 7 | 6.755E−04 | −1.322E−04 | 0.000E+00 | 0.000E+00 | 0.000E+00 |
| 10 | −5.072E−03 | 4.573E−04 | 2.457E−04 | 2.663E−05 | −1.611E−05 |

Sixth Embodiment

Figure 11:
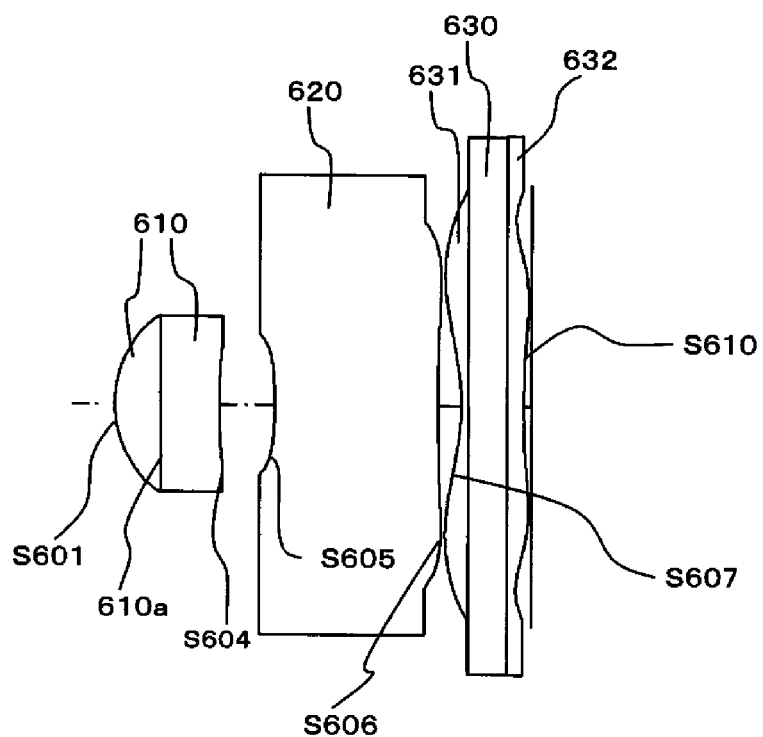
FIG. 11 illustrates a sectional view of the imaging lens according to a sixth embodiment of the present invention.

FIG. 11 illustrates a sectional view of the imaging lens according to a sixth embodiment of the present invention.

As illustrated in FIG. 11, the imaging lens according to this embodiment of the present invention is configured of a lens system including a first lens 610 made of a positive lens and a negative lens mutually bonded with an aperture diaphragm 610a inbetween, a second lens 620, a 3f-th lens element 631, a third lens flat plate 630 and a 3b-th lens element 632 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 610 has a positive lens on the object side and a negative lens on the image side. The first lens 610 has a positive refractive power. The image side surface of the second lens 620 has a concave surface directed toward the image side and has a negative refractive power. The object side surface of the 3f-th lens element 631 has a concave surface directed toward the object side near the optical axis and has a convex surface directed toward the object side in the periphery. The 3f-th element 631 has a negative refractive power. The image side surface of the 3b-th lens element 632 has a concave surface directed toward the image side and has a negative refractive power. In this embodiment of the present invention, the first lens 610 having an aperture diaphragm on the boundary where the positive lens and the negative lens are bonded, and the second lens 620 is made of resin material. The 3f-th lens element 631, the third lens flat plate 630 and the 3b-th lens element 632 are made of UV hardening type resin material. The Abbe's number v1 of the positive lens in the first lens 610 is set to 54. The Abbe's number v2 of the negative lens in the first lens 610 is set to 29. Lens surfaces S601, S604, S605, S606, S607 and S610 have aspheric surface form.

In the embodiment having the above mentioned configuration, each parameter value of the imaging lens is as illustrated in Table 11 below. Here, "Sm" represents the m-th surface number sequentially from the object side. "Sm" also includes each surface of a lens element and a lens flat plate. Surfaces muturally bonded are counted as one as a whole.

TABLE 11

| Sm | Curvature Radius (mm) | Surface Distance on Axis (mm) | Refractive Index | Abbe's Number | FIG. 11 |
|---|---|---|---|---|---|
| 1* | 0.920 | 0.350 | 1.507 | 54 | S601 |
| 2(ape) | ∞ | 0.444 | 1.574 | 29 | |
| 3* | 5 | 0.421 | | | S604 |
| 4* | −4.365 | 1.249 | 1.574 | 29 | S605 |
| 5* | 251.951 | 0.174 | | | S606 |
| 6* | −1.925 | 0.051 | 1.574 | 29 | S607 |
| 7 | ∞ | 0.300 | 1.557 | 62.362 | |
| 8 | ∞ | 0.130 | 1.574 | 29 | |
| 9* | 11.769 | 0.057 | | | S610 |

In this embodiment of the present invention, a ratio of Di/Dt=0.055 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in Abbe's numbers of the Abbe's number v1 of the positive lens of the first lens 610 and the Abbe's number v2 of the negative lens of the first lens 610 is represented by |v1−v2|=25. Thus, the difference in Abbe's numbers satisfies the conditional relationship (3). A ratio of fsl/f=1.03 where "fsl" represents a focal length of the object side surface of the positive lens of the first lens 601 and "f" represents a focal length of the overall optical system. Thus, the ratio of fsl/f satisfies the conditional relationship (1).

Figure 12:
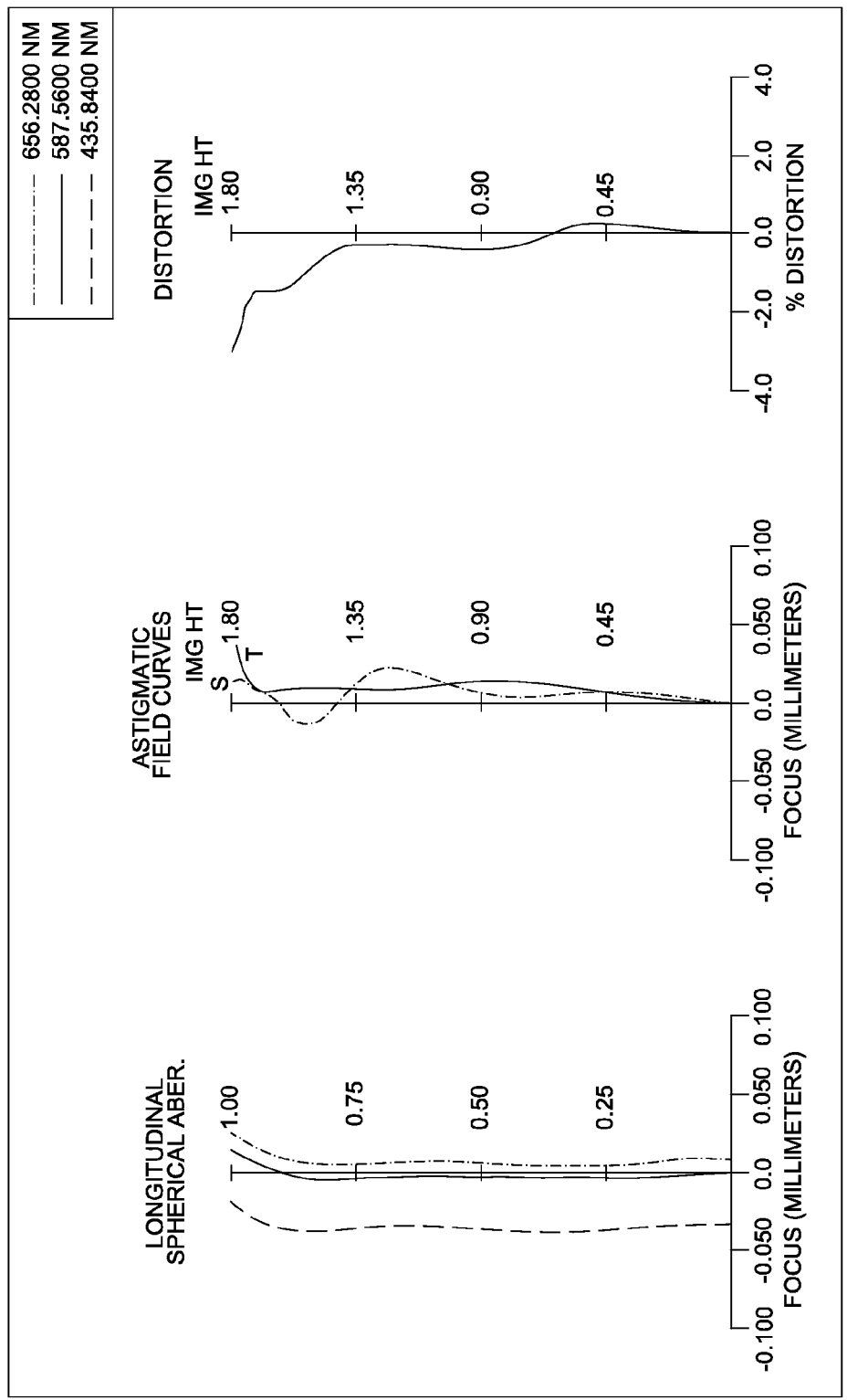
FIG. 12 illustrates aberration graphs of the imaging lens according to the sixth embodiment of the present invention.

FIG. 12 illustrates aberration graphs of the imaging lens of FIG. 11. The lens system is simply configured. The lens system satisfies the conditional relationships (1) and (3) so that the overall optical length is short. Further, as illustrated in FIG. 12, the lens system obtains satisfactory aberration properties and allows the most image-side resin layer to be thin. By using the UV hardening type resin material, the cost can be maintained low, the production can be performed easily, and a large quantity of lenses can be generated at one time by irradiating UV light after a lens element has been formed on a glass plate. Also, the compatibility with the reprica method is good.

The following Table 12 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07.$  [Mathematical Expression 14]

Thus, the Mathematical Expression 14 satisfies the conditional relationship (2).

second lens 720 has a concave surface directed toward the object side. The image side surface of the second lens 720 has a convex surface directed toward the image side. The second lens 720 has a negative refractive power. The object side surface of the 3f-th lens 731 has a concave surface directed toward the object side near the optical axis and has a convex surface directed toward the object side in the periphery. The 3f-th lens 731 has a negative refractive power. The image side surface of the 3b-th lens element 732 has a concave surface directed toward the image side and has a negative refractive power. In this embodiment of the present invention, the first lens 710, the second lens 720, the 3f-th lens element 731, the third lens flat plate 730 and the 3b-th lens element 732 are made of resin material. The third lens flat plate 730 and the 3b-th lens element 732 are made of a UV hardening type resin. The Abbe's number v1 of the first lens 710 is set to 54. The Abbe's number v2 of the second lens 720 is set to 29. Lens surfaces S701, S702, S703, S704, S705 and S708 have aspheric surface form.

In the embodiment having the above mentioned configuration, each parameter value of the imaging lens is as illustrated in Table 13 below. Here, "Sm" represents the m-th surface number sequentially from the object side. "Sm" also includes each surface of a lens element and a lens flat plate. Surfaces muturally bonded are counted as one as a whole.

TABLE 12

| S | K | A | B | C | D | E | F | G | H | J |
|---|---|---|---|---|---|---|---|---|---|---|
| 1 | 2.572E−01 | −4.340E−02 | −4.029E−01 | 1.935E+00 | −3.569E+00 | −9.717E+00 | 3.380E+01 | −2.501E+01 | 9.604E+00 | 2.944E+00 |
| 4 | 7.402E+00 | 1.037E−02 | −3.104E−01 | 3.427E+00 | −1.356E+01 | 3.209E+00 | 5.492E+01 | 1.366E+01 | −3.019E+01 | −3.271E+02 |
| 7 | −5.185E+01 | −5.288E−01 | 4.265E−01 | −6.096E+00 | 8.951E+00 | 1.217E+01 | −5.319E+01 | −2.928E+01 | −7.829E+01 | −2.395E+02 |
| 8 | −1.000E+03 | 8.077E−02 | −1.070E−01 | 4.976E−02 | 1.211E−03 | −8.430E−03 | −1.194E−03 | 1.184E−03 | 2.148E−04 | −9.591E−05 |
| 9 | −2.258E+00 | 1.449E−01 | −2.292E−02 | −3.551E−03 | 6.822E−04 | 4.225E−04 | −7.779E−05 | 0.000E+00 | 0.000E+00 | 0.000E+00 |
| 12 | −1.000E+03 | 1.941E−01 | −3.244E−01 | 1.547E−01 | −1.716E−02 | −5.016E−03 | 4.839E−04 | 2.543E−04 | 2.699E−05 | −1.700E−05 |

Seventh Embodiment

Figure 13:
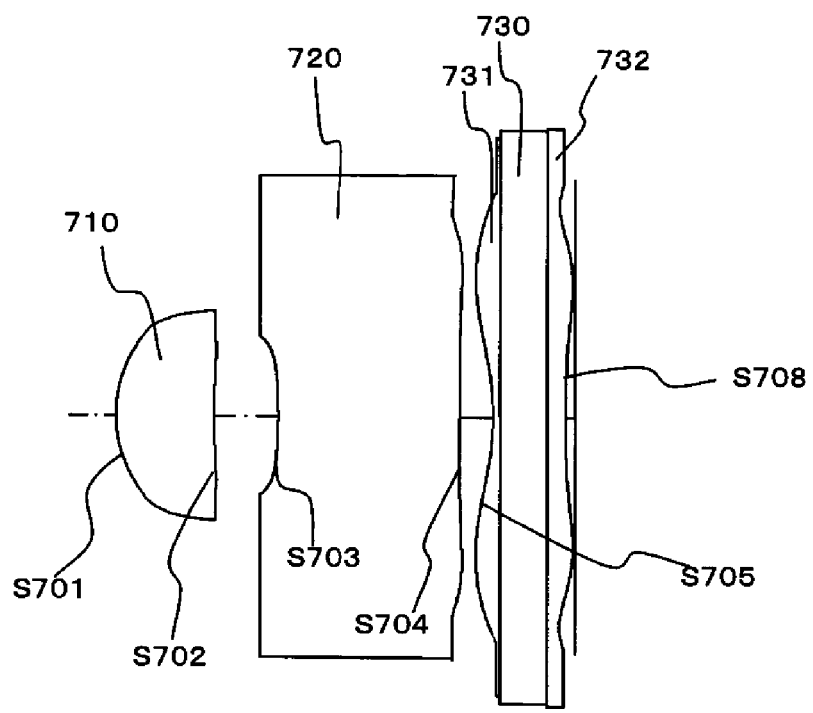
FIG. 13 illustrates a sectional view of the imaging lens according to a seventh embodiment of the present invention.

FIG. 13 illustrates a sectional view of the imaging lens according to a seventh embodiment of the present invention.

As illustrated in FIG. 13, the imaging lens according to this embodiment of the present invention is configured of a lens system including a first lens 710, a second lens 720, a 3f-th lens element 731, a third lens flat plate 730 and a 3b-th lens element 732 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 710 has an aperture diaphragm (not illustrated) on the object side surface and has a positive refractive power. The object side surface of the

TABLE 13

| Sm | Curvature Radius (mm) | Surface Distance on Axis (mm) | Refractive Index | Abbe's Number | FIG. 13 |
|---|---|---|---|---|---|
| 1* (ape) | 0.973 | 0.684 | 1.507 | 54 | S701 |
| 2* | 6.025 | 0.441 | | | S702 |
| 3* | −6.278 | 1.255 | 1.574 | 29 | S703 |
| 4* | −55.007 | 0.236 | | | S704 |
| 5* | −1.865 | 0.050 | 1.574 | 29 | S705 |
| 6 | ∞ | 0.325 | 1.487 | 70.440 | |
| 7 | ∞ | 0.130 | 1.574 | 29 | |
| 8* | 3.668 | 0.060 | | | S708 |

In this embodiment of the present invention, a ratio of Di/Dt=0.074 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A ratio of fsl/f=1.07 where "fsl" represents a focal length of the object side surface of the first lens 710 and "f" represents a focal length of the overall optical system. Thus, the ratio of fsl/f satisfies the conditional relationship (1).

Figure 14:
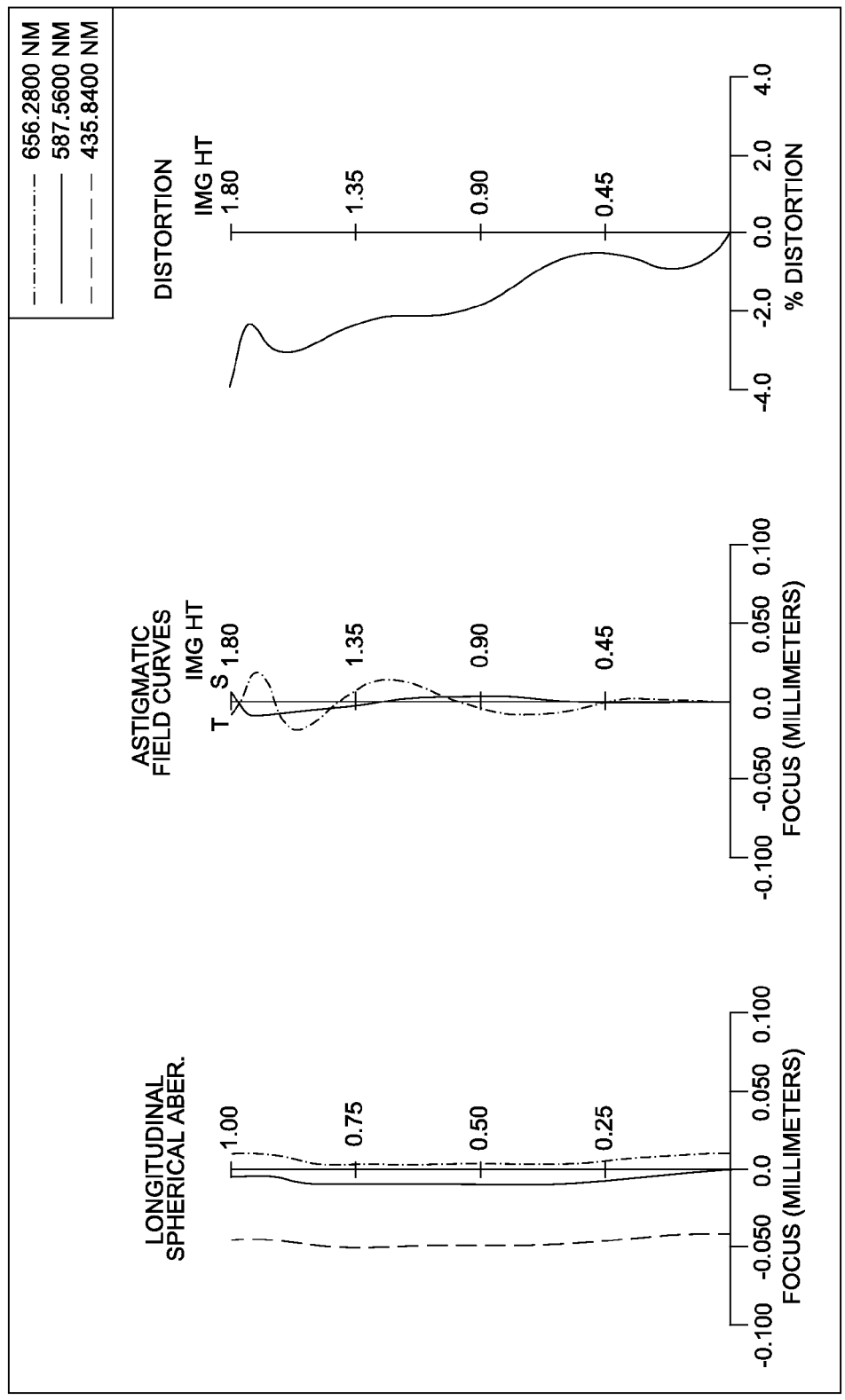
FIG. 14 illustrates aberration graphs of the imaging lens according to the seventh embodiment of the present invention.

FIG. 14 illustrates aberration graphs of the imaging lens of FIG. 13. The lens system is simply configured. The lens system satisfies the conditional relationship (1) so that the overall optical length is short. Further, as illustrated in FIG. 14, the lens system obtains satisfactory aberration properties and allows the most image-side resin layer to be thin. As illustrated in FIG. 14, the lens system is simply configured. Also, by satisfying the conditional relationship (1), the overall optical length becomes short, satisfactory aberration properties are obtained, and the thickness of the resin section of the image side surface becomes thin. By using the UV hardening type resin material, the cost can be maintained low, the production can be performed easily, and a large quantity of lenses can be generated at one time by irradiating UV light after a lens element has been formed on a glass plate. Also, the compatibility with the reprica method is good.

The following Table 14 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07.$  [Mathematical Expression 15]

Thus, the Mathematical Expression 15 satisfies the conditional relationship (2).

The image side surface of the second lens 820 has a concave surface directed toward the image side and has a negative refractive power. The object side surface of the 3f-th lens element 831 has a concave surface directed toward the object side near the optical axis and has a convex surface directed toward the object side in the periphery. The 3f-th lens element 831 has a negative refractive power. The image side surface of the 3b-th lens element 832 has a concave surface directed toward the image side and has a negative refractive power. In this embodiment of the present invention, the first lens 810 having an aperture diaphragm on the boundary where a positive lens and a negative lens are mutually bonded and the second lens 820 is made of glass. The 3f-th lens element 831, the third lens flat plate 830 and the 3b-th lens element 832 are made of resin material. The Abbe's number v1 of the positive lens in the first lens 810 is set to 61.1. The Abbe's number v2 of the negative lens in the first lens 910 is set to 25.4. Lens surfaces S801, S803, S804, S805, S806 and S809 have aspheric surface form.

In the embodiment having the above mentioned configuration, each parameter value of the imaging lens is as illustrated in Table 15 below. Here, "Sm" represents the m-th surface number sequentially from the object side. "Sm" also includes each surface of a lens element and a lens flat plate. Surfaces muturally bonded are counted as one as a whole.

TABLE 14

| S | K | A | B | C | D | E | F | G | H | J |
|---|---|---|---|---|---|---|---|---|---|---|
| 1 | 2.686E−01 | −3.992E−02 | −4.442E−01 | 1.859E+00 | −2.973E+00 | −1.104E+01 | 3.252E+01 | −2.351E+01 | 2.824E+01 | 1.833E+01 |
| 2 | −6.399E+01 | −2.288E−02 | −4.353E−01 | 2.971E+00 | −1.262E+01 | −1.071E+00 | 5.235E+01 | 1.976E+01 | −4.102E+01 | −3.701E+02 |
| 3 | −3.584E+02 | −5.755E−01 | 7.009E−01 | −5.609E+00 | 3.091E+00 | 1.450E+01 | 6.222E+00 | −1.137E+02 | −9.163E+01 | −2.801E+02 |
| 4 | −1.000E+03 | 9.811E−02 | −1.086E−01 | 4.361E−02 | 3.162E−03 | −7.185E−03 | −1.280E−03 | 9.964E−04 | 1.789E−04 | −6.126E−05 |
| 5 | −1.864E+00 | 1.615E−01 | −2.703E−02 | −2.786E−03 | 9.852E−05 | 5.477E−04 | −7.008E−05 | 0.000E+00 | 0.000E+00 | 0.000E+00 |
| 8 | −1.000E+09 | 2.583E−01 | −3.376E−01 | 1.484E−01 | −1.819E−02 | −4.895E−03 | 6.521E−04 | 3.346E−04 | 4.016E−05 | −2.832E−05 |

Eighth Embodiment

Figure 15:
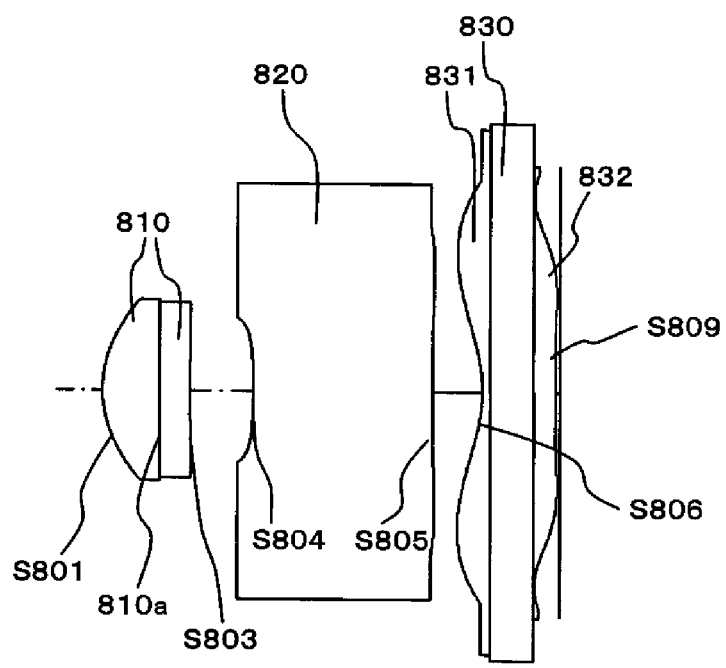
FIG. 15 illustrates a sectional view of the imaging lens according to an eighth embodiment of the present invention.

FIG. 15 illustrates a sectional view of the imaging lens according to an eighth embodiment of the present invention.

As illustrated in FIG. 15, the imaging lens according to this embodiment of the present invention is configured of a lens system including a first lens 810 having an aperture diaphragm on the boundary where a positive lens and a negative lens are mutually bonded, a second lens 820, a 3f-th lens element 831, a third lens flat plate 830 and a 3b-th lens element 832 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 810 has a positive lens on the object side and a negative lens on the image side. The first lens 810 has a positive refractive power. The object side surface of the second 820 has a concave surface directed toward the object side and has a negative refractive power.

TABLE 15

| Sm | Curvature Radius (mm) | Surface Distance on Axis (mm) | Refractive Index | Abbe's Number | FIG. 15 |
|---|---|---|---|---|---|
| 1* | 1.004 | 0.391 | 1.589 | 61.113 | S801 |
| 2(ape) | 219.874 | 0.216 | 1.805 | 25.432 | |
| 3* | 6.225 | 0.439 | | | S803 |
| 4* | −7.646 | 1.249 | 1.805 | 25.432 | S804 |
| 5* | 32.657 | 0.345 | | | S805 |
| 6* | −1.265 | 0.050 | 1.574 | 29 | S806 |
| 7 | ∞ | 0.300 | 1.492 | 69.839 | |
| 8 | ∞ | 0.150 | 1.574 | 29 | |
| 9* | −2.878 | 0.040 | | | S809 |

In this embodiment of the present invention, a ratio of Di/Dt=0.108 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the positive lens and the negative lens of the first lens 810 is represented by |v1−v2|=35.7. Thus, the difference in the Abbe's number satisfies the conditional relationship (3). A ratio of fsl/f=0.98 where "fsl" represents a focal length of the object side surface of the positive lens of the first lens 810 and "f" represents a focal length of the overall optical system. Thus, the ratio of fsl/f satisfies the conditional relationship (1).

Figure 16:
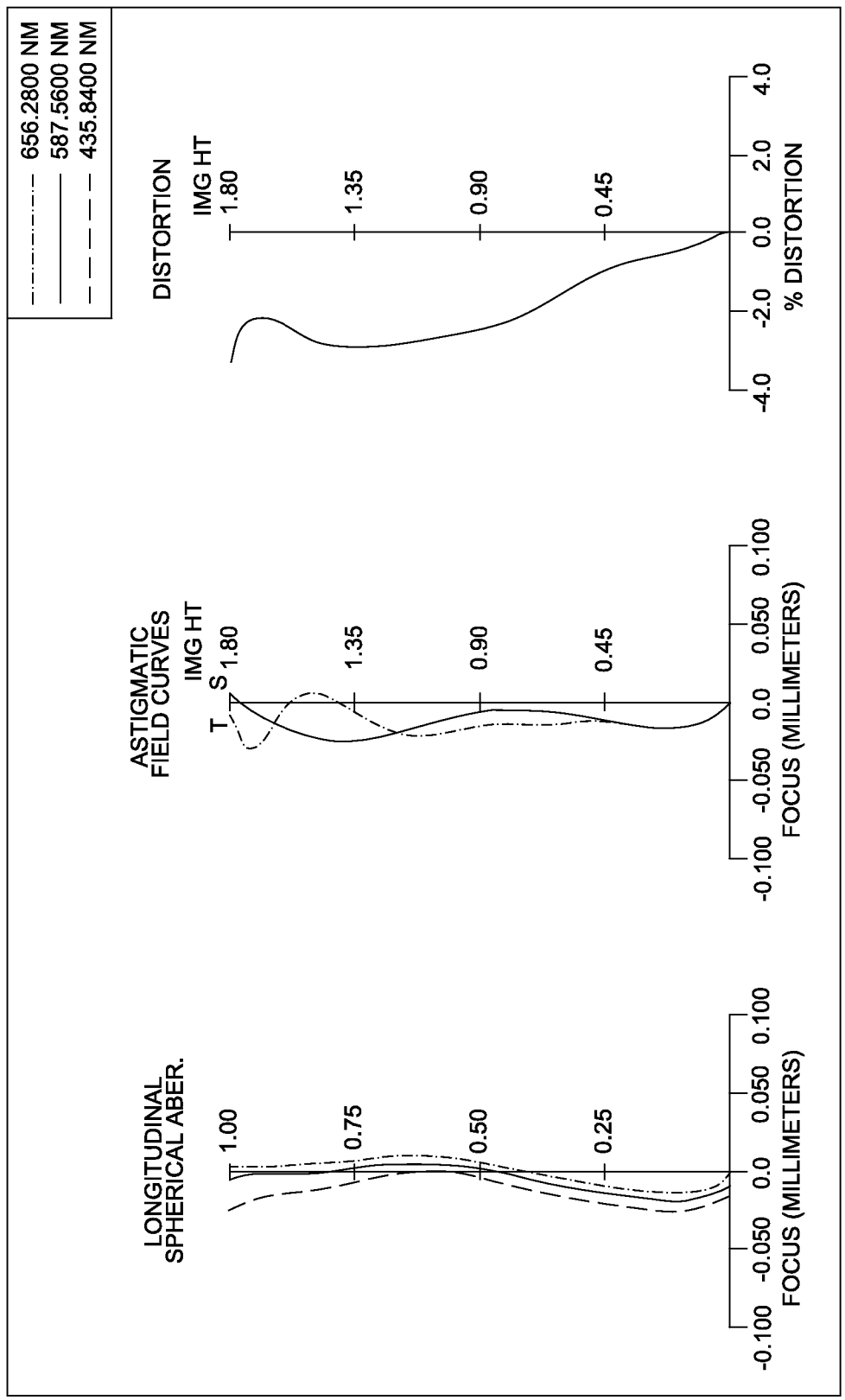
FIG. 16 illustrates aberration graphs of the imaging lens according to the eighth embodiment of the present invention.

FIG. 16 illustrates aberration graphs of the imaging lens of FIG. 15. The lens system is simply configured. The lens system satisfies the conditional relationships (1) and (3) so that the overall optical length is short. Further, as illustrated in FIG. 16, the lens system obtains satisfactory aberration properties and allows the most image-side resin layer to be thin. By using the UV hardening type resin material for the 3f-th lens element 831 and the 3b-th lens element 832, the cost can be maintained low, the production can be performed easily, and a large quantity of lenses can be generated at one time by irradiating UV light after a lens element has been formed on a glass plate. Also, the compatibility with the reprica method is good.

The following Table 16 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$$|X-X_o|/Y=0.09. \qquad \text{[Mathematical Expression 16]}$$

Thus, the Mathematical Expression 16 satisfies the conditional relationship (2).

object side surface of the second lens 920 has a concave surface directed toward the object side. The object side surface of the third f lens element 931 has a concave surface directed toward the object side near the optical axis and has a convex surface directed toward the object side in the periphery. The 3f-th lens element 931 has a negative refractive power. The image side of the 3b-th lens element 932 has a concave surface directed toward the image side and has a negative refractive power. In this embodiment of the present invention, the first lens 910 having an aperture diaphragm on the boundary where a positive lens and a negative lens are mutually bonded and the second lens 920 is made of glass. The 3f-th lens element 931, the third lens flat plate 930 and the 3b-th lens element 932 are made of resin material. The Abbe's number ν1 of the positive lens in the first lens 910 is set to 70.4. The Abbe's number ν2 of the negative lens in the first lens 910 is set to 61.1. Lens surfaces S901, S903, S904, S905, S906 and S909 have aspheric surface form.

In the embodiment having the above mentioned configuration, each parameter value of the imaging lens is as illustrated in Table 17 below. Here, "Sm" represents the m-th surface number sequentially from the object side. "Sm" also includes each surface of a lens element and a lens flat plate. Surfaces muturally bonded are counted as one as a whole.

TABLE 16

| S | K | A | B | C | D | E | F | G | H | J |
|---|---|---|---|---|---|---|---|---|---|---|
| 1 | 2.043E−01 | −5.352E−02 | −4.011E−01 | 1.809E+00 | −4.002E+00 | −1.037E+01 | 3.662E+01 | −2.351E+01 | 2.215E+00 | 3.841E+00 |
| 3 | −2.449E+01 | −4.535E−02 | −7.656E−01 | 3.056E+00 | −1.068E+01 | 3.134E+00 | 2.626E+01 | 3.077E+01 | −4.625E+01 | −3.184E+02 |
| 4 | 1.728E+02 | −3.376E−01 | 2.058E+00 | −5.708E+00 | 1.143E+01 | 8.734E+00 | −4.205E+01 | −2.017E+02 | −6.559E+01 | 5.531E+02 |
| 5 | −1.000E+11 | 7.374E−02 | −1.063E−01 | 5.091E−02 | 1.510E−03 | −8.385E−03 | −1.177E−03 | 1.121E−03 | 2.369E−04 | −3.802E−05 |
| 6 | −5.379E+00 | 1.149E−01 | −1.699E−02 | −1.183E−03 | 3.096E−04 | 3.447E−04 | −8.001E−05 | 0.000E+00 | 0.000E+00 | 0.000E+00 |
| 9 | −1.000E+07 | 1.855E−01 | −3.302E−01 | 1.558E−01 | −1.652E−02 | −4.958E−03 | 4.795E−04 | 2.423E−04 | 2.600E−05 | −1.707E−05 |

Ninth Embodiment

Figure 17:
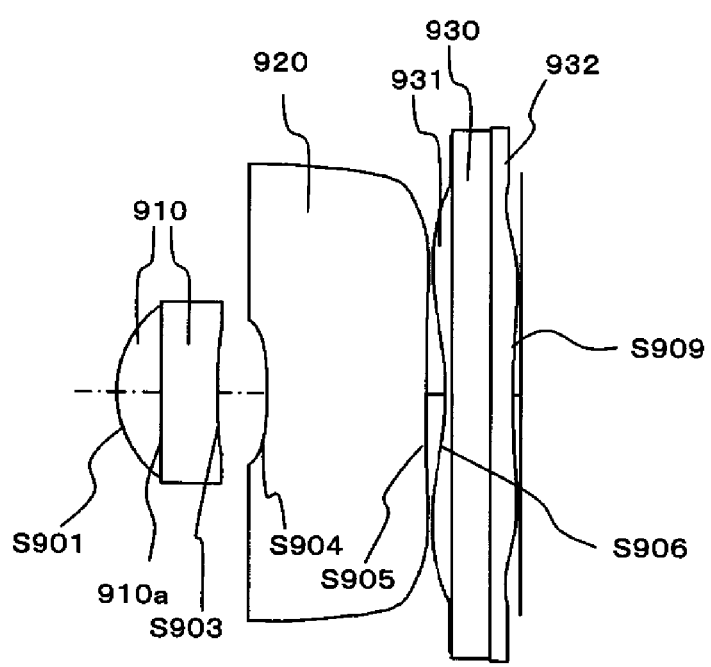
FIG. 17 illustrates a sectional view of the imaging lens according to a ninth embodiment of the present invention.

FIG. 17 illustrates a sectional view of the imaging lens according to a ninth embodiment of the present invention.

As illustrated in FIG. 17, the imaging lens according to this embodiment of the present invention is configured of a lens system including a first lens 910 having an aperture diaphragm 910a on the boundary where a positive lens and a negative lens are mutually bonded, a second lens 920, a 3f-th lens element 931, a third lens flat plate 930 and a 3b-th lens element 932 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 910 has a positive lens on the object side and has a negative lens on the image side. The first lens 910 has a positive refractive power. The

TABLE 17

| Sm | Curvature Radius (mm) | Surface Distance on Axis (mm) | Refractive Index | Abbe's Number | FIG. 17 |
|---|---|---|---|---|---|
| 1* | 0.868 | 0.350 | 1.487 | 70.45 | S901 |
| 2 (ape) | ∞ | 0.444 | 1.589 | 61.113 | |
| 3* | 5 | 0.387 | | | S903 |
| 4* | −4.066 | 1.249 | 1.589 | 61.113 | S904 |
| 5* | −194.882 | 0.160 | | | S905 |
| 6* | −2.159 | 0.050 | 1.574 | 29 | S906 |
| 7 | ∞ | 0.300 | 1.514 | 66.926 | |
| 8 | ∞ | 0.180 | 1.574 | 29 | |
| 9* | 6.243 | 0.058 | | | S909 |

In this embodiment of the present invention, a ratio of Di/Dt=0.050 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the positive lens and the negative lens of the first lens 910 is represented by |ν1−ν2|=9.3. Thus, the difference in the Abbe's number satisfies the conditional relationship (3). A ratio of fsl/f=1.02 where "fsl" represents a focal length of the object side surface of the positive lens of the first lens 910 and "f" represents a focal length of the overall optical system. Thus, the ratio of fsl/f satisfies the conditional relationship (1).

Figure 18:
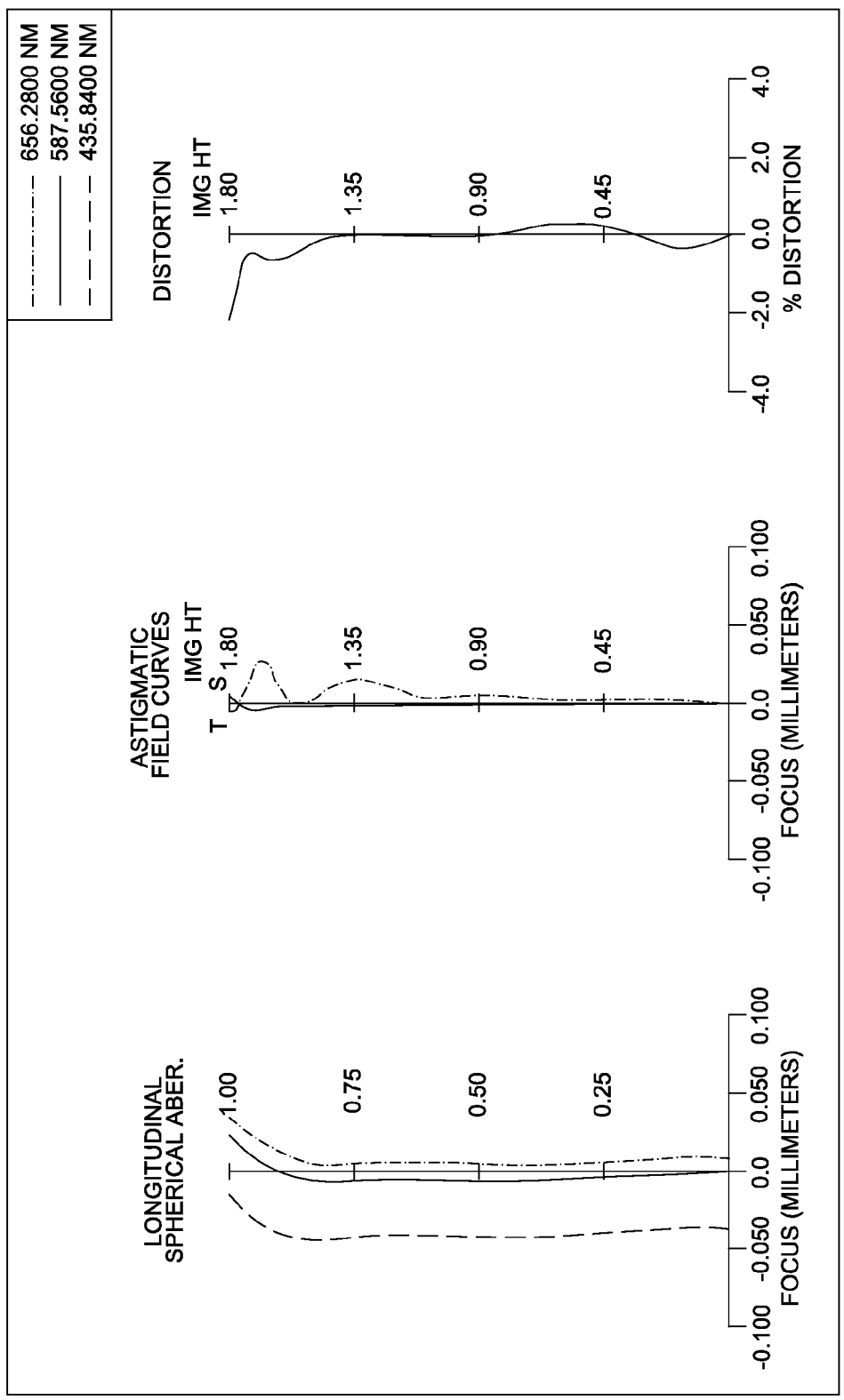
FIG. 18 illustrates aberration graphs of the imaging lens according to the ninth embodiment of the present invention.

FIG. 18 illustrates aberration graphs of the imaging lens of FIG. 17. The lens system is simply configured. The lens system satisfies the conditional relationships (1) and (3) so that the overall optical length is short. Further, as illustrated in FIG. 18, the lens system obtains satisfactory aberration properties and allows the most image-side resin layer to be thin. By using the UV hardening type resin material for the 3f-th lens element 931 and the 3b-th lens element 932, the cost can be maintained low, the production can be performed easily, and a large quantity of lenses can be generated at one time by irradiating UV light after a lens element has been formed on a glass plate. Also, the compatibility with the reprica method is good.

The following Table 18 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.10.$  [Mathematical Expression 17]

Thus, the Mathematical Expression 17 satisfies the conditional relationship (2).

object side surface of the second lens 1021 has a concave surface directed toward the object side. The object side surface of the 3f-th lens element 1031 has a concave surface directed toward the object side near the optical axis and has a convex surface directed toward the object side in the periphery. The 3f-th lens element 1031 has a negative refractive power. The image side surface of the 3b-th lens element 1032 has a concave surface directed toward the image side and has a negative refractive power. In this embodiment of the present invention, the first lens 1010 having an aperture diaphragm on the boundary where a positive lens and a negative lens are mutually bonded and the second lens 1020 is made of glass. The 3f-th lens element 1031, the third lens flat plate 1030 and the 3b-th lens element 1032 are made of resin material. The Abbe's number ν1 of the positive lens in the first lens 1010 is set to 70.4. The Abbe's number ν2 of the negative lens in the first lens 1010 is set to 61.1. Lens surfaces S1001, S1003, S1004, S1005, S1006 and S1009 have aspheric surface form.

In the embodiment having the above mentioned configuration, each parameter value of the imaging lens is as illustrated in Table 19 below. Here, "Sm" represents the m-th surface number sequentially from the object side. "Sm" also includes each surface of a lens element and a lens flat plate. Surfaces muturally bonded are counted as one as a whole.

TABLE 18

| S | K | A | B | C | D | E | F | G | H | J |
|---|---|---|---|---|---|---|---|---|---|---|
| 1 | 2.543E−01 | −4.666E−02 | −4.372E−01 | 1.882E+00 | −2.935E+00 | −1.091E+01 | 3.148E+01 | −2.501E+01 | 9.604E+00 | 2.944E+00 |
| 3 | 5.892E+00 | 4.011E−02 | −2.151E−01 | 3.239E+00 | −1.171E+01 | 3.209E+00 | 5.492E+01 | 1.366E+01 | −3.019E+01 | −3.271E+02 |
| 4 | −1.213E+02 | −6.520E−01 | 6.420E−01 | −5.189E+00 | 3.200E+00 | 1.415E+01 | −8.260E+00 | −1.110E+02 | −7.829E+01 | −2.395E+02 |
| 5 | −1.000E+11 | 8.052E−02 | −1.043E−01 | 4.587E−02 | 2.467E−03 | −7.270E−03 | −1.161E−03 | 1.061E−03 | 1.707E−04 | −8.488E−05 |
| 6 | −1.270E+00 | 1.413E−01 | −2.039E−02 | −2.146E−03 | 1.936E−04 | 3.325E−04 | −4.600E−05 | 0.000E+00 | 0.000E+00 | 0.000E+00 |
| 9 | −1.000E+07 | 2.237E−01 | −3.293E−01 | 1.519E−01 | −1.753E−02 | −4.949E−03 | 5.386E−04 | 2.683E−04 | 2.957E−05 | −1.897E−05 |

Tenth Embodiment

Figure 19:
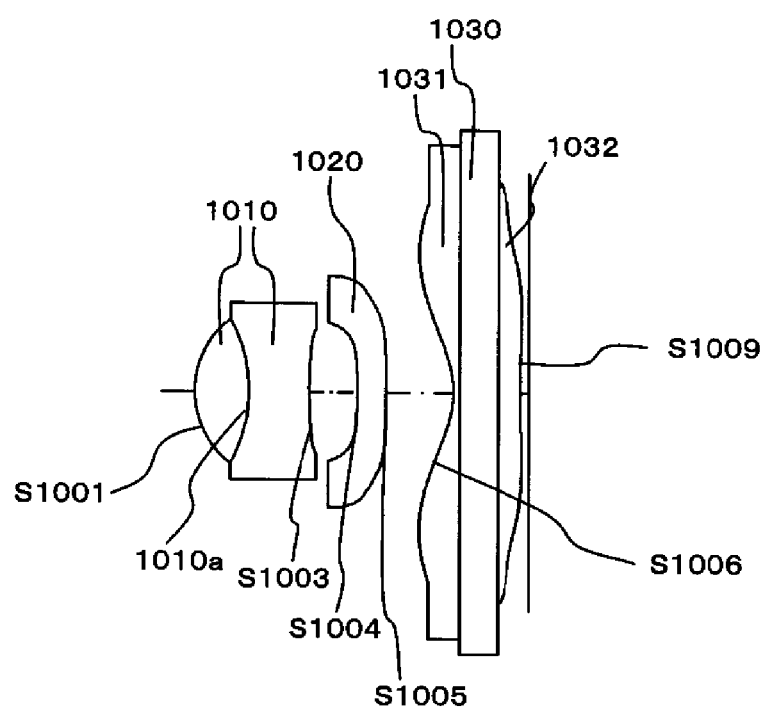
FIG. 19 illustrates a sectional view of the imaging lens according to a tenth embodiment of the present invention.

FIG. 19 illustrates a sectional view of the imaging lens according to a tenth embodiment of the present invention.

As illustrated in FIG. 19, the imaging lens according to this embodiment of the present invention is configured of a lens system including a first lens 1010 having an aperture diaphragm 1010a on the boundary where a positive lens and a negative lens are mutually bonded, a second lens 1020, a 3f-th lens element 1031, a third lens flat plate 1030 and a 3b-th lens element 1032 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 1010 has a positive lens on the object side and has a negative lens on the image side. The first lens 1010 has a positive refractive power. The

TABLE 19

| Sm | Curvature Radius (mm) | Surface Distance on Axis (mm) | Refractive Index | Abbe's Number | FIG. 19 |
|---|---|---|---|---|---|
| 1* | 0.759 | 0.423 | 1.487 | 70.45 | S1001 |
| 2 (ape) | −1.266 | 0.476 | 1.589 | 61.113 | |
| 3* | 5.000 | 0.375 | | | S1003 |
| 4* | −7.391 | 0.221 | 1.589 | 61.113 | S1004 |
| 5* | −159.185 | 0.526 | | | S1005 |
| 6* | −0.803 | 0.050 | 1.574 | 29 | S1006 |
| 7 | ∞ | 0.300 | 1.487 | 70.440 | |
| 8 | ∞ | 0.180 | 1.574 | 29 | |
| 9* | −5559.366 | 0.059 | | | S1009 |

In this embodiment of the present invention, a difference in the Abbe's numbers of the positive lens and the negative lens of the first lens 1010 is represented by |ν1−ν2|=9.3. Thus, the difference in the Abbe's number satisfies the conditional relationship (3). A ratio of fsl/f=0.84 where "fsl" represents a focal length of a positive object side surface of the first lens 1010 and "f" represents a focal length of the overall optical system. Thus, the ratio of fsl/f satisfies the conditional relationship (1).

Figure 20:
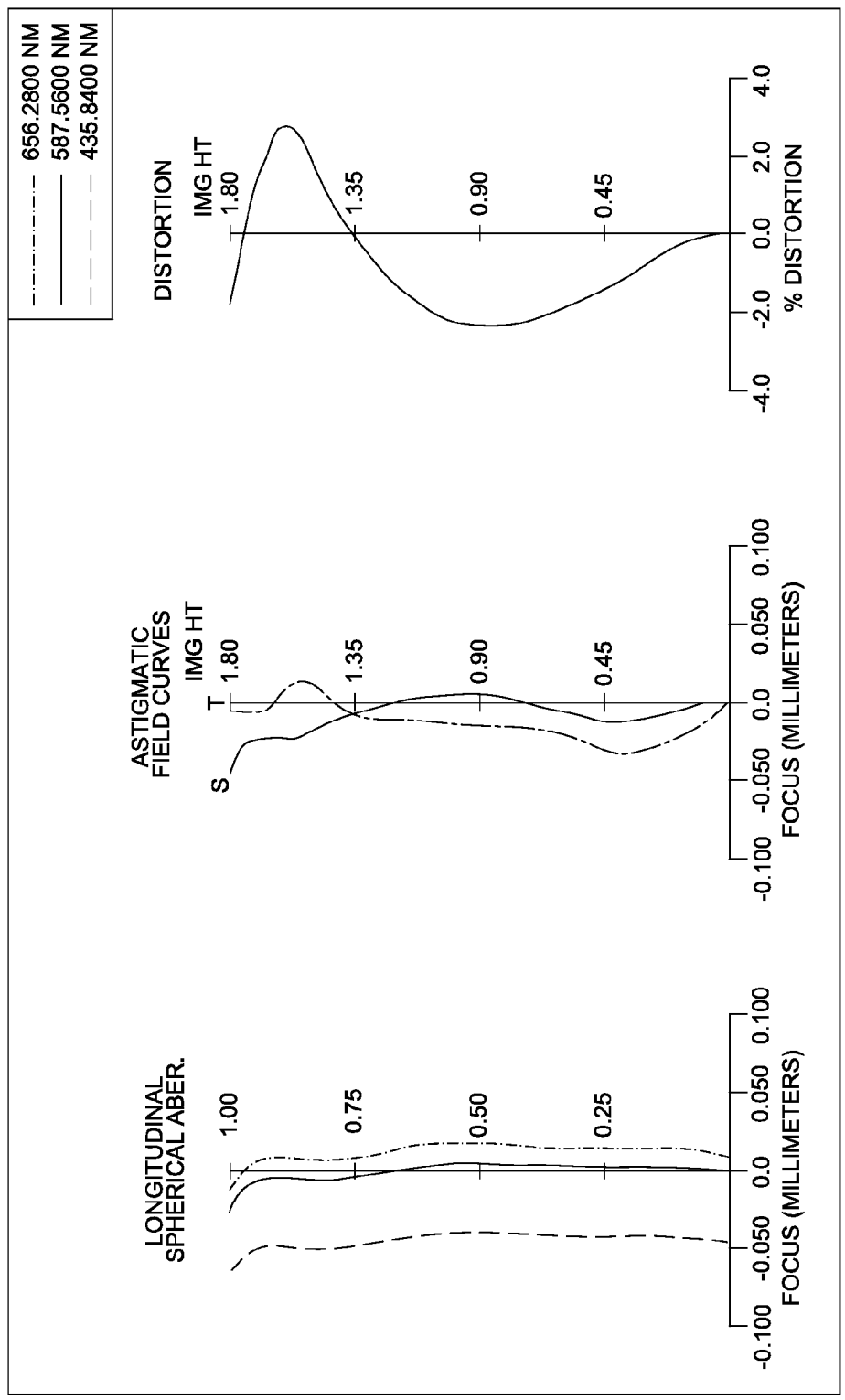
FIG. 20 illustrates aberration graphs of the imaging lens according to the tenth embodiment of the present invention.

FIG. 20 illustrates aberration graphs of the imaging lens of FIG. 19. The lens system is simply configured. The lens system satisfies the conditional relationships (1) and (3) so that the overall optical length is short. Further, as illustrated in FIG. 20, the lens system obtains satisfactory aberration properties and allows the most image-side resin layer to be thin. By using the UV hardening type resin material for the 3f-th lens element 1031 and the 3b-th lens element 1032, the cost can be maintained low, the production can be performed easily, and a large quantity of lenses can be generated at one time by irradiating UV light after a lens element has been formed on a glass plate. Also, the compatibility with the reprica method is good.

The following Table 20 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.10$.     [Mathematical Expression 18]

Thus, the Mathematical Expression 18 satisfies the conditional relationship (2).

refractive power. In this embodiment of the present invention, the positive lens on the object side of the bonded first lens 1110 is made of glass. The negative lens on the objective side of the bonded first lens 1110 and the second lens 1120 are made of resin material. The 3f-th lens element 1131 and the 3b-th lens element 1132 are made of UV hardening type resin material. The Abbe's number v1 of the positive lens of the first lens 1110 is set to 70.4. The Abbe's number v2 of the negative lens of the first lens 1110 is set to 29. In this embodiment of the present invention, a negative lens on the object side of the bonded first lens 1110 and the second lens 1120 are made of resin material. However, they may be made of glass. Lens surfaces S1101, S1102, S1103, S1104, S1105, S1106 and S1109 have aspheric surface form.

In the embodiment having the above mentioned configuration, each parameter value of the imaging lens is as illustrated in Table 21 below. Here, "Sm" represents the m-th surface number sequentially from the object side. "Sm" also includes each surface of a lens element and a lens flat plate. Surfaces muturally bonded are counted as one as a whole.

TABLE 20

| S | K | A | B | C | D | E | F | G | H | J |
|---|---|---|---|---|---|---|---|---|---|---|
| 1 | 2.202E−01 | −1.129E−01 | −1.727E−01 | 1.437E+00 | −4.563E+00 | −1.412E+01 | 3.776E+01 | 3.277E+01 | 9.604E+00 | 2.944E+00 |
| 3 | 9.132E+01 | 8.344E−02 | −4.408E−01 | 4.136E+00 | −1.580E+01 | 3.089E+01 | 5.492E+01 | 1.366E+01 | −3.019E+01 | −3.271E+02 |
| 4 | −4.218E+03 | −1.197E+00 | 1.924E+00 | −1.412E+01 | 3.668E+00 | 4.601E+01 | −1.536E+02 | −1.110E+02 | −7.829E+01 | −2.395E+02 |
| 5 | −9.789E+10 | −1.013E−01 | −7.848E−01 | 5.181E−01 | −6.354E−02 | −1.609E−01 | 8.316E−01 | 4.894E−01 | 8.209E−01 | −2.546E+00 |
| 6 | −3.254E+00 | 1.860E−01 | −4.944E−02 | 1.209E−03 | 1.754E−03 | 2.450E−04 | −1.501E−04 | 0.000E+00 | 0.000E+00 | 0.000E+00 |
| 9 | −9.209E+12 | 1.281E−01 | −2.854E−01 | 1.567E−01 | −1.784E−02 | −6.157E−03 | 3.595E−04 | 2.708E−04 | 5.709E−05 | −1.999E−05 |

Eleventh Embodiment

Figure 21:
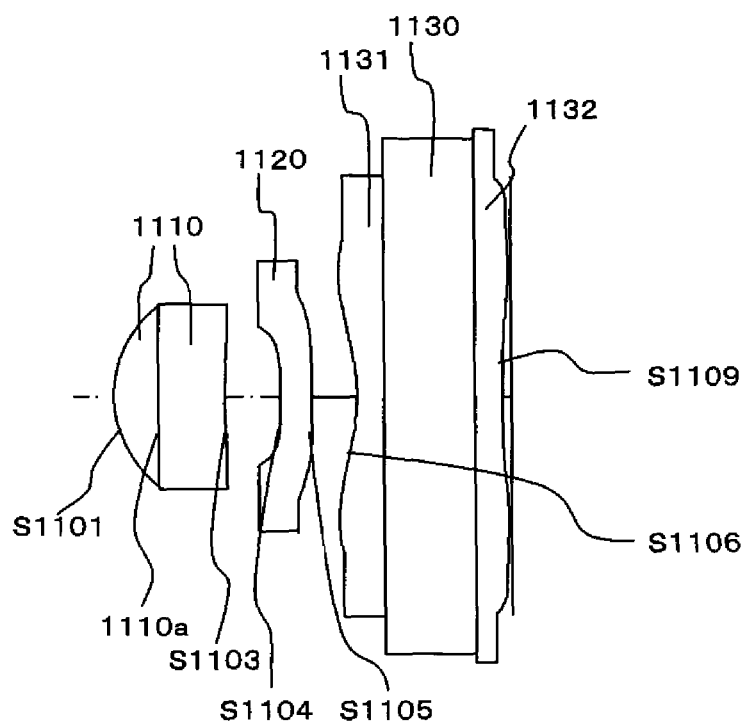
FIG. 21 illustrates a sectional view of the imaging lens according to an eleventh embodiment of the present invention.

FIG. 21 illustrates a sectional view of the imaging lens according to an eleventh embodiment of the present invention.

As illustrated in FIG. 21, the imaging lens according to this embodiment of the present invention is configured of a lens system including a first lens 1110 having an aperture diaphragm 1110a on the boundary where a positive lens and a negative lens are mutually bonded, a second lens 1120, a 3f-th lens element 1131, a third lens flat plate 1130 and a 3b-th lens element 1132 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 1110 has a positive lens on the object side and has a negative lens on the image side. The first lens 1110 has a positive refractive power. The object side surface of the second lens 1120 has a concave surface directed toward the object side. The object side surface of the 3f-th lens 1131 has a concave surface directed toward the object side near the optical axis and has a convex surface directed toward the object side in the periphery. The 3f-th lens 1131 has a negative refractive power. The image side surface of the 3b-th lens element 1132 has a concave surface directed toward the image side and has a negative

TABLE 21

| Sm | Curvature Radius (mm) | Surface Distance on Axis (mm) | Refractive Index | Abbe's Number | FIG. 21 |
|---|---|---|---|---|---|
| 1* | 0.903 | 0.350 | 1.487 | 70.450 | S1101 |
| 2 (ape) | ∞ | 0.536 | 1.574 | 29 | |
| 3* | 5.000 | 0.441 | | | S1103 |
| 4* | −10.084 | 0.250 | 1.574 | 29 | S1104 |
| 5* | −449.196 | 0.365 | | | S1105 |
| 6* | −1.613 | 0.216 | 1.574 | 29 | S1106 |
| 7 | ∞ | 0.728 | 1.760 | 50.663 | |
| 8 | ∞ | 0.220 | 1.574 | 29 | |
| 9* | 9.514 | 0.068 | | | S1109 |

In this embodiment of the present invention, a ratio of Di/Dt=0.115 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the positive lens and the negative lens of the first lens 1110 is represented by |v1−v2|=41.4. Thus, the difference in the Abbe's number satisfies the conditional relationship (3). A ratio of fsl/f=1.06 where "fsl" represents a focal length of the object side surface of the positive lens of the first lens 1110 and "f" represents a focal length of the overall optical system. Thus, the ratio of fsl/f satisfies the conditional relationship (1).

Figure 22:
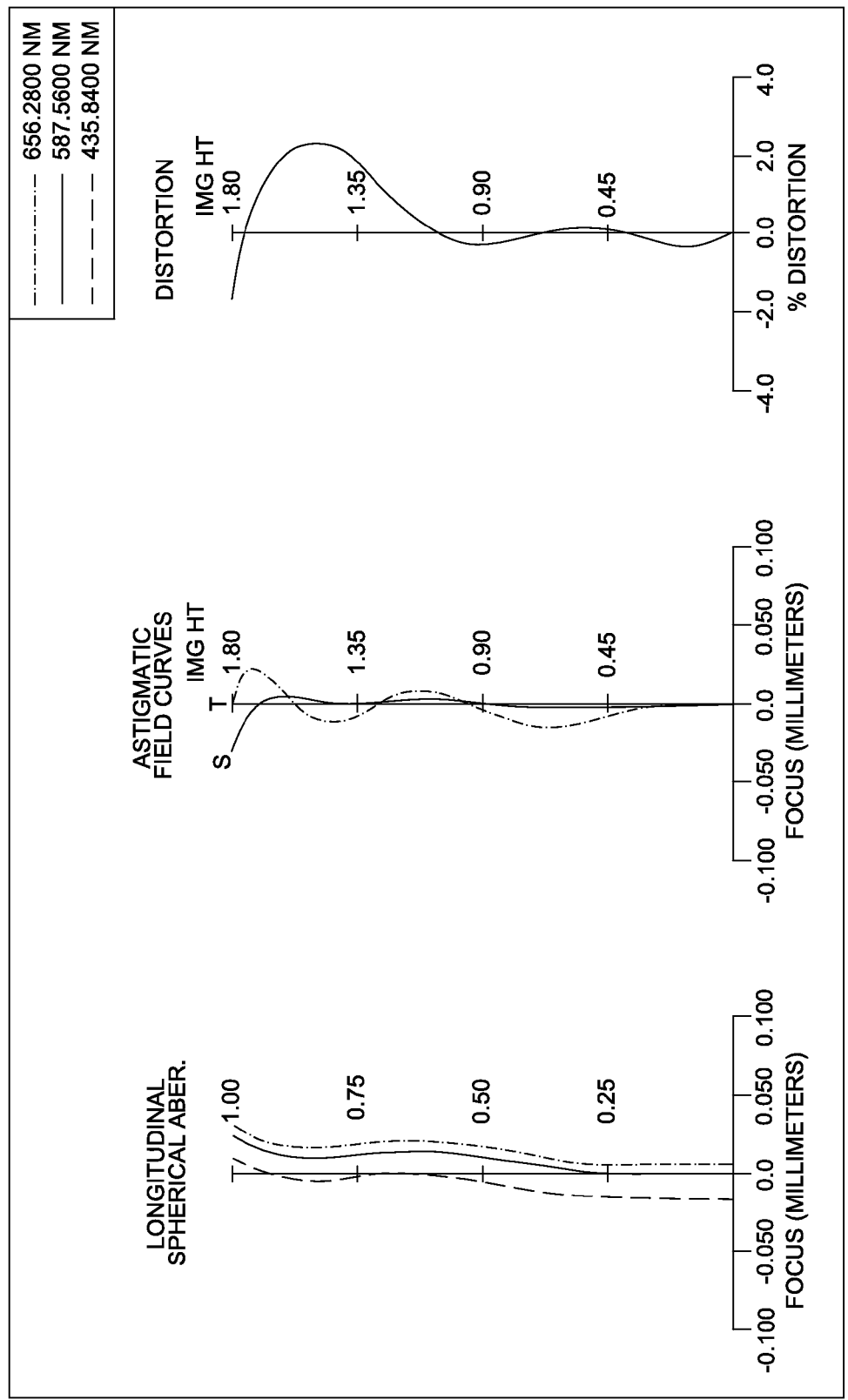
FIG. 22 illustrates aberration graphs of the imaging lens according to the eleventh embodiment of the present invention.

FIG. 22 illustrates aberration graphs of the imaging lens of FIG. 21. The lens system is simply configured. The lens system satisfies the conditional relationships (1) and (3) so that the overall optical length is short. Further, as illustrated in FIG. 22, the lens system obtains satisfactory aberration properties and allows the most image-side resin layer to be thin. By using the UV hardening type resin material for the 3f-th lens element 1131 and the 3b-th lens element 1132, the cost can be maintained low, the production can be performed easily, and a large quantity of lenses can be generated at one time by irradiating UV light after a lens element has been formed on a glass plate. Also, the compatibility with the reprica method is good. The following Table 22 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.13$     [Mathematical Expression 19]

Thus, the Mathematical Expression 19 satisfies the conditional relationship (2).

power. In this embodiment of the present invention, the bonded positive lens on the object side of the first lens 1210 is made of glass. The bonded negative lens on the objective side of the first lens 1210 and the second lens 1220 are made of resin material. The 3f-th lens element 1231 and the 3b-th lens element 1232 are made of UV hardening type resin material. The Abbe's number v1 of the positive lens in the first lens 1210 is set to 70.4. The Abbe's number v2 of the negative lens in the first lens 1210 is set to 29. In this embodiment of the present invention, a negative lens on the object side of the bonded first lens 1210 and the second lens 1220 are made of resin material. However, they may be made of glass. Lens surfaces S1201, S1202, S1203, S1204, S1205, S1206 and S1209 have aspheric surface form.

In the embodiment having the above mentioned configuration, each parameter value of the imaging lens is as illustrated in Table 23 below. Here, "Sm" represents the m-th surface number sequentially from the object side. "Sm" also

TABLE 22

| S | K | A | B | C | D | E | F | G | H | J |
|---|---|---|---|---|---|---|---|---|---|---|
| 1 | 2.187E−01 | −6.371E−02 | −4.229E−01 | 1.886E+00 | −3.486E+00 | −9.017E+00 | 3.449E+01 | −3.544E+01 | 9.490E+00 | 2.947E+00 |
| 3 | −1.240E+01 | −1.241E−02 | −5.027E−01 | 3.301E+00 | −1.277E+01 | −7.908E−01 | 5.492E+01 | 1.366E+01 | −3.019E+01 | −3.271E+02 |
| 4 | 2.661E+02 | −7.368E−01 | 1.613E−01 | −6.956E+00 | 7.722E+00 | 1.622E+01 | −5.123E+01 | −2.654E+02 | −7.830E+01 | −2.395E+02 |
| 5 | −1.000E+04 | −1.634E−01 | −2.120E−01 | 6.340E−02 | 8.017E−02 | 3.801E−02 | 5.217E−02 | 6.217E−02 | 6.717E−02 | 6.199E−02 |
| 6 | −2.363E+00 | 1.660E−01 | −2.099E−02 | −5.837E−03 | 2.670E−04 | 5.006E−04 | −6.995E−05 | 0.000E+00 | 0.000E+00 | 0.000E+00 |
| 9 | −1.000E+07 | 2.374E−01 | −3.232E−01 | 1.533E−01 | −1.780E−02 | −5.230E−03 | 4.537E−04 | 2.526E−04 | 2.926E−05 | −1.593E−05 |

Twelfth Embodiment

Figure 23:
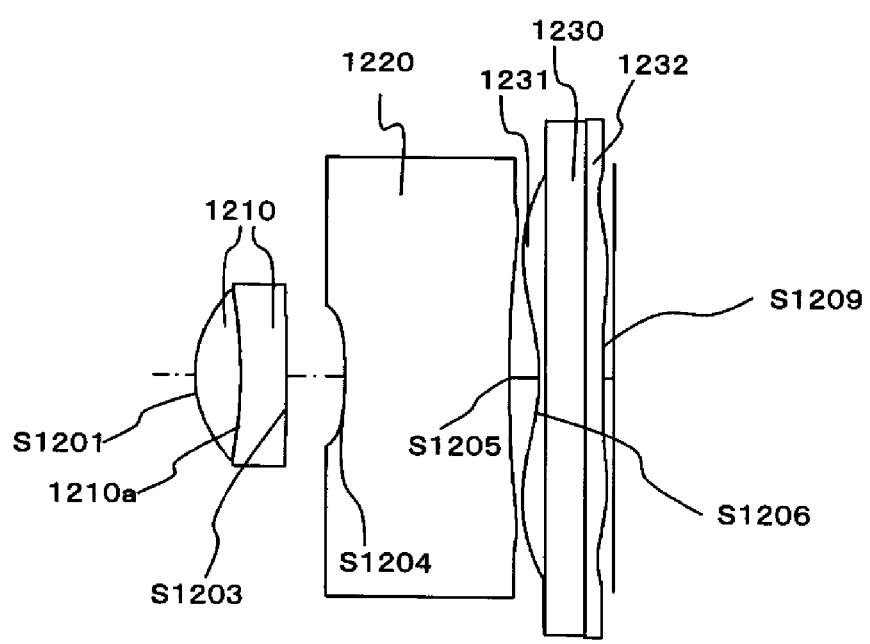
FIG. 23 illustrates a sectional view of the imaging lens according to a twelfth embodiment of the present invention.

FIG. 23 illustrates a sectional view of the imaging lens according to a twelfth embodiment of the present invention.

As illustrated in FIG. 23, the imaging lens according to this embodiment of the present invention is configured of a lens system including a first lens 1210 having an aperture diaphragm 1210a on the boundary where a positive lens and a negative lens are mutually bonded, a second lens 1220, a 3f-th lens element 1231, an i-th lens flat plate 1230 and an i-th "b" lens element 1232 in the order from the object side. Here, the imaging lens is configured of three lenses in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 1210 has a positive lens on the object side and a negative lens on the image side. The first lens 1210 has a positive refractive. The object side surface of the second lens 1220 has a concave surface directed toward the object side. The object side surface of the 3f-th lens element 1231 has a concave surface directed toward the object side near the optical axis and has a convex surface directed toward the object side in the periphery. The 3f-th lens element 1231 has a negative refractive power. The image side surface of the 3b-th lens element 1232 has a concave surface directed toward the image side and has a negative refractive includes each surface of a lens element and a lens flat plate. Surfaces muturally bonded are counted as one as a whole.

TABLE 23

| Sm | Curvature Radius (mm) | Surface Distance on Axis (mm) | Refractive Index | Abbe's Number | FIG. 23 |
|---|---|---|---|---|---|
| 1* | 0.952 | 0.350 | 1.487 | 70.450 | S1201 |
| 2 (ape) | −4.106 | 0.348 | 1.574 | 29 | |
| 3* | 25.819 | 0.441 | | | S1203 |
| 4* | −4.866 | 1.249 | 1.574 | 29 | S1204 |
| 5* | 321.365 | 0.223 | | | S1205 |
| 6* | −1.759 | 0.050 | 1.574 | 29 | S1206 |
| 7 | ∞ | 0.300 | 1.487 | 70.440 | |
| 8 | ∞ | 0.130 | 1.574 | 29 | |
| 9* | 15.162 | 0.079 | | | S1209 |

In this embodiment of the present invention, a ratio of Di/Dt=0.070 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the positive lens and the negative lens of the first lens 1210 is represented by |v1−v2|=41.4. Thus, the difference in the Abbe's number satisfies the conditional relationship (3). A ratio of fsl/f=1.05 where "fsl" represents a focal length of the object side surface of the positive lens of the first lens 1210 and "f" represents a focal length of the overall optical system. Thus, the ratio of fsl/f satisfies the conditional relationship (1).

Figure 24:
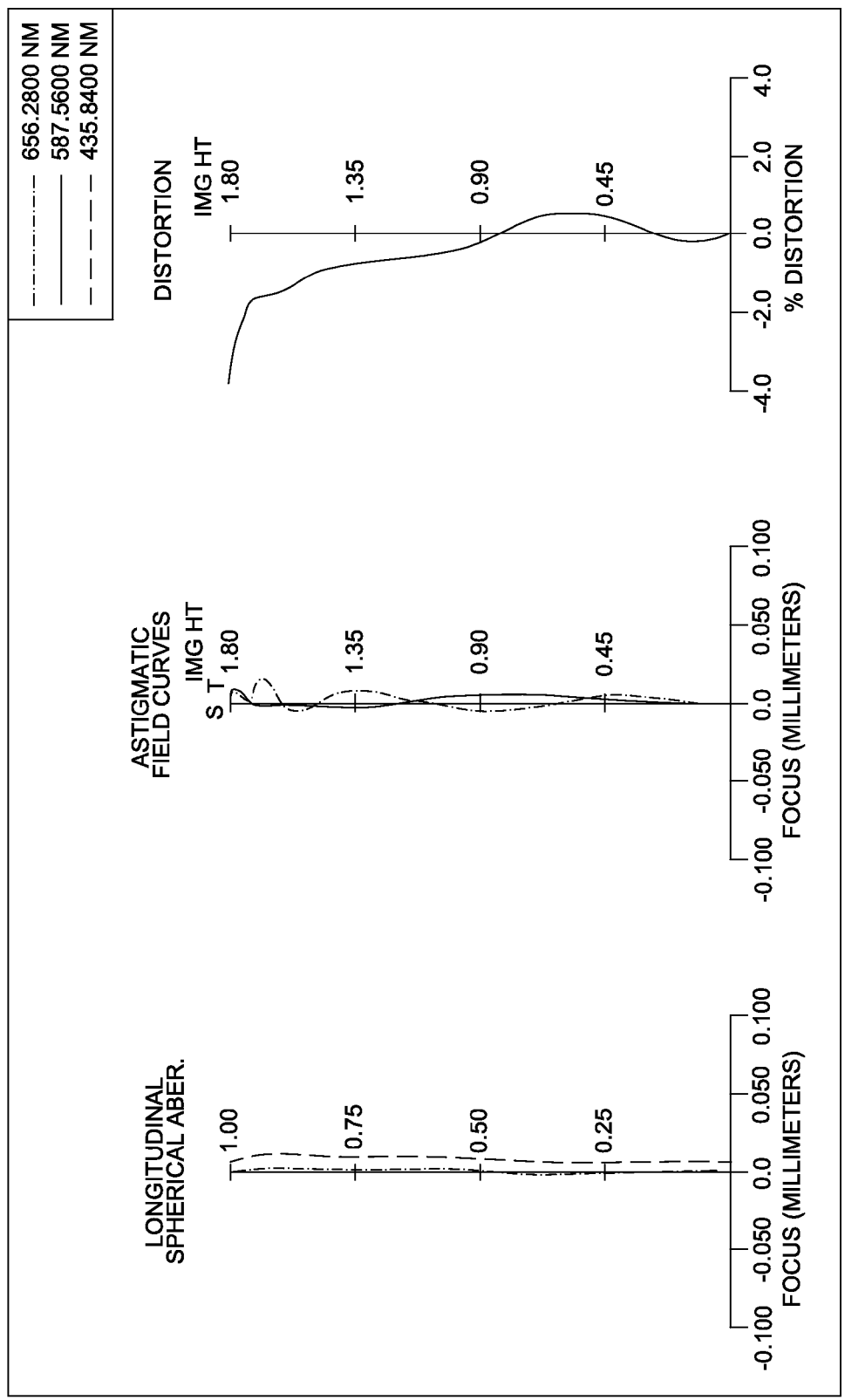
FIG. 24 illustrates aberration graphs of the imaging lens according to twelfth embodiment of the present invention.

FIG. 24 illustrates aberration graphs of the imaging lens of FIG. 23. The lens system is simply configured. The lens system satisfies the conditional relationships (1) and (3) so that the overall optical length is short. Further, as illustrated in FIG. 24, the lens system obtains satisfactory aberration properties and allows the most image-side resin layer to be thin. By using the UV hardening type resin material for the 3f-th lens element 1231 and the 3b-th lens element 1232, the cost can be maintained low, the production can be performed easily, and a large quantity of lenses can be generated at one time by irradiating UV light after a lens element has been formed on a glass plate. Also, the compatibility with the reprica method is good.

The following Table 24 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07$.             [Mathematical Expression 20]

Thus, the Mathematical Expression 20 satisfies the conditional relationship (2).

directed toward the object side near the optical axis and a convex surface directed toward the object side in the periphery. The 3f-th lens element 1331 has a negative refractive power. The image side surface of the 3b-th lens element 1332 has a concave surface directed toward the image side and has a negative refractive power. In this embodiment of the present invention, the first lens 1310 and the second lens 1320 are made of glass. The 3f-th lens element 1331 and the 3b-th lens element 1332 are made of resin material. The Abbe's number v1 of the positive lens in the first lens 1310 is set to 70.4. The Abbe's number v2 of the negative lens in the first lens 1310 is set to 25.4. Lens surfaces S1301, S1302, S1303, S1304, S1305, S1306 and S1409 have aspheric surface form.

In the embodiment having the above mentioned configuration, each parameter value of the imaging lens is as illustrated in Table 25 below. Here, "Sm" represents the m-th surface number sequentially from the object side. "Sm" also includes each surface of a lens element and a lens flat plate. Surfaces muturally bonded are counted as one as a whole.

TABLE 24

| S | K | A | B | C | D | E | F | G | H | J |
|---|---|---|---|---|---|---|---|---|---|---|
| 1 | 2.142E-01 | -5.725E-02 | -3.994E-01 | 1.641E+00 | -3.582E+00 | -8.302E+00 | 3.339E+01 | -3.042E+01 | 9.615E+00 | 2.951E+00 |
| 3 | -3.903E+03 | -5.336E-02 | -5.659E-01 | 2.938E+00 | -1.080E+01 | -5.647E+00 | 5.491E+01 | 1.365E+01 | -3.019E+01 | -3.271E+02 |
| 4 | -1.008E+02 | -5.800E-01 | 5.138E-01 | -6.586E+00 | 6.694E+00 | 1.860E+01 | -2.639E+01 | -1.395E+02 | -7.830E+01 | -2.395E+02 |
| 5 | -1.000E+04 | 1.142E-01 | -1.173E-01 | 4.579E-02 | 4.470E-03 | -6.843E-03 | -1.616E-03 | 1.154E-03 | 1.103E-04 | -6.423E-05 |
| 6 | -2.640E+00 | 1.523E-01 | -1.986E-02 | -4.479E-03 | 3.572E-04 | 3.567E-04 | -3.223E-05 | 0.000E+00 | 0.000E+00 | 0.000E+00 |
| 9 | -1.000E+07 | 2.270E-01 | -3.289E-01 | 1.522E-01 | -1.753E-02 | -4.935E-03 | 5.359E-04 | 2.729E-04 | 2.907E-05 | -1.991E-05 |

Thirteenth Embodiment

Figure 25:
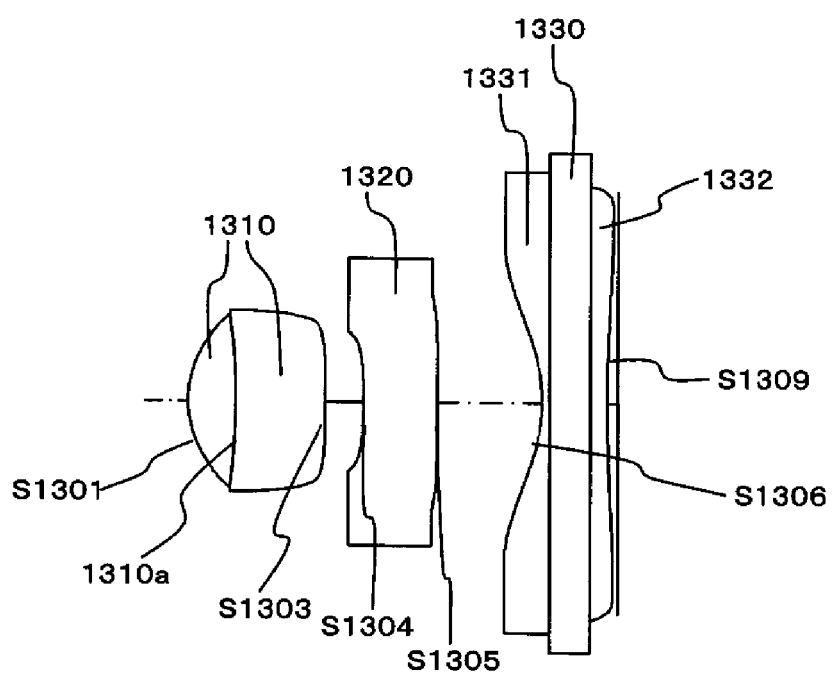
FIG. 25 illustrates a sectional view of the imaging lens according to a thirteenth embodiment of the present invention.

FIG. 25 illustrates a sectional view of the imaging lens according to a thirteenth embodiment of the present invention.

As illustrated in FIG. 25, the imaging lens according to this embodiment of the present invention is configured of a lens system including a first lens 1310 having an aperture diaphragm 1310a on the boundary where a positive lens and a negative lens are mutually bonded, a second lens 1320, a 3f-th lens element 1331, a third lens flat plate 1330 and a 3b-th lens element 1332 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The first lens 1310 has a positive lens on the object side and has a negative lens on the image side. The first lens 1310 has a positive refractive power. The object side surface of the second lens 1320 has a concave surface directed toward the object side. The object side surface of the 3f-th lens element 1331 has a concave surface

TABLE 25

| Sm | Curvature Radius (mm) | Surface Distance on Axis (mm) | Refractive Index | Abbe's Number | FIG. 25 |
|---|---|---|---|---|---|
| 1* | 0.957 | 0.350 | 1.487 | 70.45 | S1301 |
| 2 (ape) | -5.486 | 0.659 | 1.805 | 25.432 | |
| 3* | -49.161 | 0.284 | | | S1303 |
| 4* | -9.825 | 0.541 | 1.805 | 25.432 | S1304 |
| 5* | 20.856 | 0.778 | | | S1305 |
| 6* | -1.361 | 0.050 | 1.574 | 29 | S1306 |
| 7 | ∞ | 0.300 | 1.487 | 70.44 | |
| 8 | ∞ | 0.130 | 1.574 | 29 | |
| 9* | -3.606 | 0.078 | | | S1309 |

In this embodiment of the present invention, a difference in the Abbe's numbers of the positive lens and the negative lens of the first lens 1310 is represented by $|v1-v2|=45$. Thus, the difference in the Abbe's number satisfies the conditional relationship (3). A ratio of fsl/f=1.02 where "fsl" represents a focal length of the object side surface of the positive lens of the first lens 1310 and "f" represents a focal length of the overall optical system. Thus, the ratio of fsl/f satisfies the conditional relationship (1).

Figure 26:
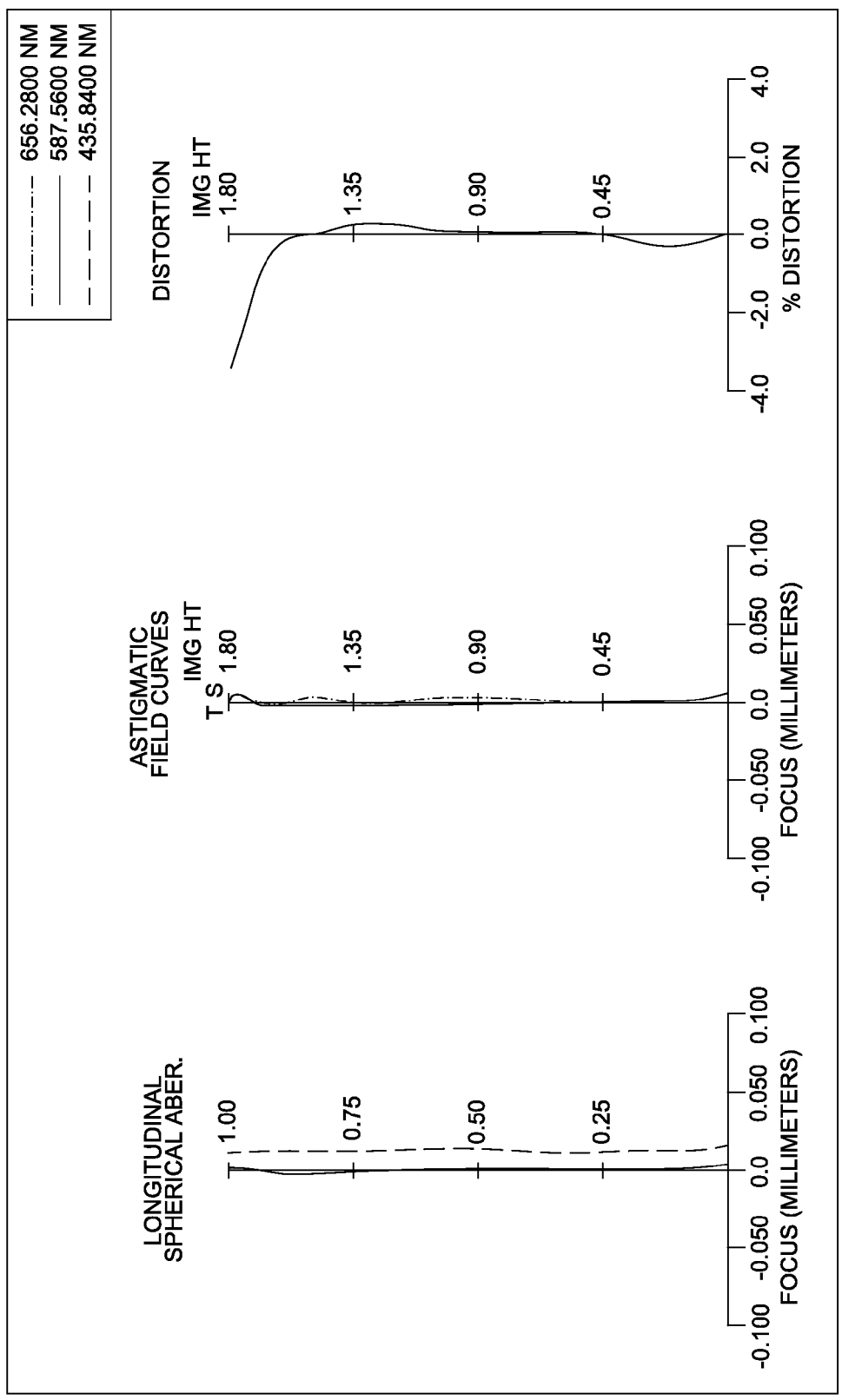
FIG. 26 illustrates aberration graphs of the imaging lens according to the thirteenth embodiment of the present invention.

FIG. 26 illustrates aberration graphs of the imaging lens of FIG. 25. The lens system is simply configured. The lens system satisfies the conditional relationships (1) and (3) so that the overall optical length is short. Further, as illustrated in FIG. 26, the lens system obtains satisfactory aberration properties and allows the most image-side resin layer to be thin. By using the UV hardening type resin material for the 3f-th lens element 1331 and the 3b-th lens element 1332, the cost can be maintained low, the production can be performed easily, and a large quantity of lenses can be generated at one time by irradiating UV light after a lens element has been formed on a glass plate. Also, the compatibility with the reprica method is good.

The following Table 26 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07$.  [Mathematical Expression 21]

Thus, the Mathematical Expression 21 satisfies the conditional relationship (2).

1f-th lens element 1411, the 1b-th lens element 1412, the 2f-th lens element 1421, the 2b-th lens element 1422, the 3f-th lens element 1431, the third lens flat plate 1430 and the 3b-th lens element 1432 are made of UV hardening type resin. The Abbe's number ν of the 1f-th lens element 1411 is set to 54. The Abbe's number ν2 of the 1b-th lens element 1412 is set to 33. Lens surfaces S1401, S1404, S1405, S1408, S1409 and S1412 have aspheric surface form. The glass material used for the lens flat plate may differ respectively.

In the embodiment having the above mentioned configuration, each parameter value of the imaging lens is as illustrated in Table 27 below. Here, "Sm" represents the m-th surface number sequentially from the object side. "Sm" also includes each surface of a lens element and a lens flat plate. Surfaces muturally bonded are counted as one as a whole.

TABLE 26

| S | K | A | B | C | D | E | F | G | H | J |
|---|---|---|---|---|---|---|---|---|---|---|
| 1 | 1.962E−01 | −5.936E−02 | −2.967E−01 | 1.136E+00 | −3.400E+00 | −2.520E+00 | 3.175E+01 | −8.176E+01 | 8.758E+01 | −3.189E−01 |
| 3 | −3.669E+11 | −9.850E−02 | −7.823E−01 | 3.099E+00 | −7.382E+00 | −7.639E+00 | 1.251E+01 | 9.901E+01 | −3.485E+01 | −3.521E+02 |
| 4 | −1.868E+03 | −5.257E−01 | 3.589E−01 | −4.386E+00 | 7.285E−01 | 1.059E+01 | −1.141E+01 | −9.209E+01 | 3.784E+01 | −3.268E+02 |
| 5 | −9.282E+10 | 3.676E−02 | −1.773E−01 | −3.752E−03 | 8.420E−02 | 9.014E−02 | −1.470E−02 | −1.278E−01 | −1.076E−01 | 1.781E−01 |
| 6 | −1.168E+00 | 1.459E−01 | −2.791E−02 | 2.716E−03 | 1.118E−03 | 2.922E−04 | −2.610E−04 | 0.000E+00 | 0.000E+00 | 0.000E+00 |
| 9 | −1.000E+07 | 1.325E−01 | −2.063E−01 | 1.300E−01 | −2.509E−02 | −5.353E−03 | 9.766E−04 | 4.486E−04 | 5.168E−05 | −3.817E−05 |

Fourteenth Embodiment

Figure 27:
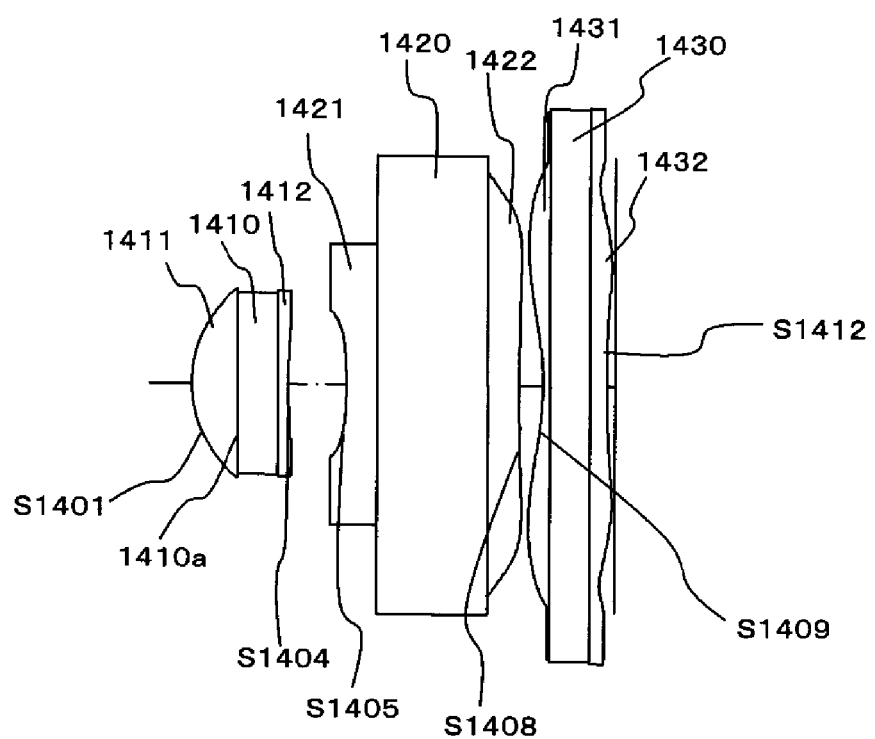
FIG. 27 illustrates a sectional view of the imaging lens according to a fourteenth embodiment of the present invention.

FIG. 27 illustrates a sectional view of the imaging lens according to a fourteenth embodiment of the present invention.

As illustrated in FIG. 27, the imaging lens according to this embodiment of the present invention is configured of a lens system including a 1f-th lens element 1411, an aperture diaphragm 1410*a*, a first lens flat plate 1410, a 1b-th lens element 1412, a 2f-th lens element 1421, a second lens flat plate 1420, a 2b-th lens element 1422, a 3f-th lens element 1431, a third lens flat plate 1430 and a 3b-th lens element 1432 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 1411 has a convex surface directed toward the object side and has a positive refractive power. The image side surface of the 1b-th lens element 1412 has a concave surface directed toward the image side and has a negative refractive power. The object side surface of the 2f-th lens element 1421 has a concave surface directed toward the object side and has a negative refractive power. The image side surface of the 2b-th lens element 1422 has a concave surface directed toward the image side and has a negative refractive power. The object side surface of the 3f-th lens element 1431 has a concave surface directed toward the object side near the optical axis and has a convex surface directed toward the object side in the periphery. The 3f-th lens element 1431 has a negative refractive power. In this embodiment of the present invention, the

TABLE 27

| Sm | Curvature Radius (mm) | Surface Distance on Axis (mm) | Refractive Index | Abbe's Number | FIG. 27 |
|---|---|---|---|---|---|
| 1* | 0.919 | 0.350 | 1.507 | 54 | S1401 |
| 2 (ape) | ∞ | 0.300 | 1.544 | 53.297 | |
| 3 | ∞ | 0.080 | 1.583 | 33 | |
| 4* | 5.098 | 0.434 | | | S1404 |
| 5* | −4.421 | 0.228 | 1.583 | 33 | S1405 |
| 6 | ∞ | 0.837 | 1.544 | 53.297 | |
| 7 | ∞ | 0.236 | 1.583 | 33 | |
| 8* | −4841.631 | 0.175 | | | S1408 |
| 9* | −2.249 | 0.050 | 1.574 | 29 | S1409 |
| 10 | ∞ | 0.300 | 1.544 | 53.297 | |
| 11 | ∞ | 0.130 | 1.574 | 29 | |
| 12* | 8.116 | 0.059 | | | S1412 |

In this embodiment of the present invention, a ratio of Di/Dt=0.055 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 1411 and the 1b-th lens element 1412 is represented by |ν1−ν2|=21. Thus, the difference in the Abbe's number satisfies the conditional relationship (4). A ratio of fsl/f=1.01 where "fsl" represents a focal length of the object side surface of the 1f-th lens element 1411 and "f" represents a focal length of the overall optical system. Thus, the ratio of fsl/f satisfies the conditional relationship (1).

Figure 28:
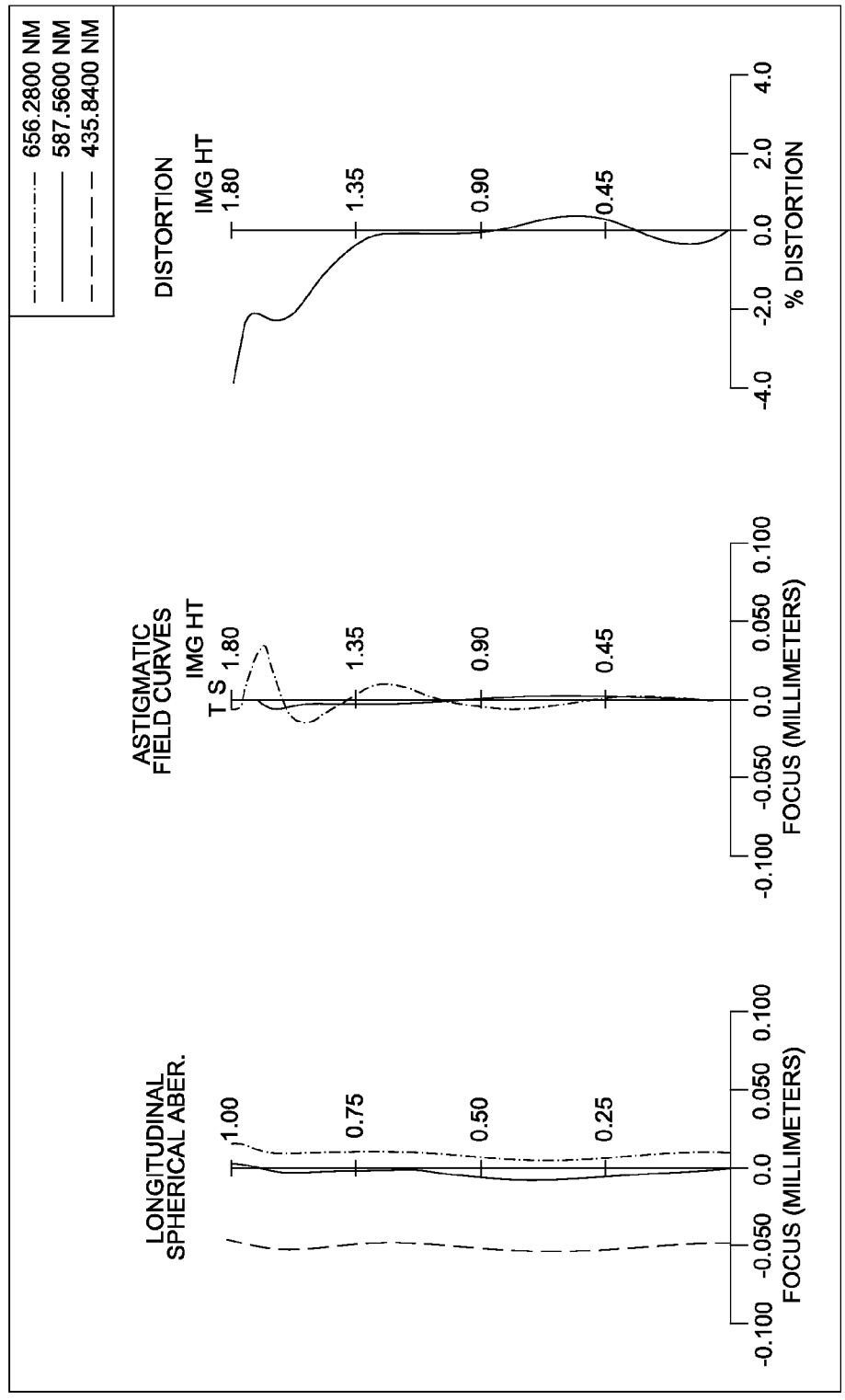
FIG. 28 illustrates aberration graphs of the imaging lens according to the fourteenth embodiment of the present invention.

FIG. 28 illustrates aberration graphs of the imaging lens of FIG. 27. The lens system is simply configured. The lens system satisfies the conditional relationships (1) and (4) so that the overall optical length is short. Further, as illustrated in FIG. 28, the lens system obtains satisfactory aberration properties and allows the most image-side resin layer to be thin.

By using the resin material, the cost can be maintained low and the production can be performed easily.

The following Table 28 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07$.  [Mathematical Expression 22]

Thus, the Mathematical Expression 22 satisfies the conditional relationship (2).

TABLE 28

| S | K | A | B | C | D |
|---|---|---|---|---|---|
| 1 | 2.649E-01 | -3.276E-02 | -4.623E-01 | 1.943E+00 | -3.188E+00 |
| 4 | 1.168E+01 | 1.526E-02 | -3.562E-01 | 2.877E+00 | -9.897E+00 |
| 5 | -8.373E+01 | -5.455E-01 | 4.820E-01 | -5.916E+00 | 8.235E+00 |
| 8 | -1.000E+07 | 7.988E-02 | -1.004E-01 | 4.348E-02 | 6.842E-04 |
| 9 | -1.225E+00 | 1.379E-01 | -2.145E-02 | -4.077E-03 | 7.149E-04 |
| 12 | -1.000E+07 | 2.209E-01 | -3.185E-01 | 1.522E-01 | -1.965E-02 |

| S | E | F | G | H | J |
|---|---|---|---|---|---|
| 1 | -8.833E+00 | 3.210E+01 | -3.028E+01 | 5.518E+00 | 2.944E+00 |
| 4 | -4.463E+00 | 5.492E+01 | 1.366E+01 | -3.019E+01 | -3.271E+02 |
| 5 | 1.492E+01 | -5.982E+01 | -2.928E+01 | -7.829E+01 | -2.395E+02 |
| 8 | -8.038E-03 | -8.393E-04 | 1.066E-03 | 2.797E-04 | -1.176E+04 |
| 9 | 5.859E-04 | -1.071E-04 | 0.000E+00 | 0.000E+00 | 0.000E+00 |
| 12 | -5.821E-03 | 8.209E-04 | 3.986E-04 | 2.247E-05 | -2.661E-05 |

Fifteenth Embodiment

Figure 29:
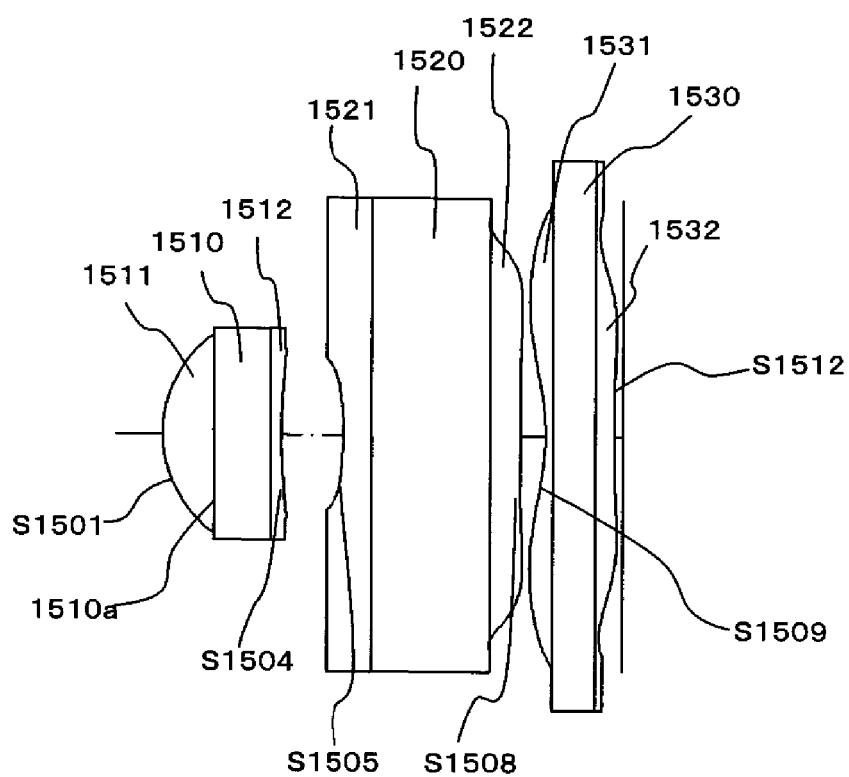
FIG. 29 illustrates a sectional view of the imaging lens according to a fifteenth embodiment of the present invention.

FIG. 29 illustrates a sectional view of the imaging lens according to a fifteenth embodiment of the present invention.

As illustrated in FIG. 29, the imaging lens according to this embodiment of the present invention is configured of a lens system including a 1f-th lens element 1511, an aperture diaphragm 1510a, a first lens flat plate 1510, a 1b-th lens element 1512, a 2f-th lens element 1521, a second lens flat plate 1520, a 2b-th lens element 1522, a 3f-th lens element 1531, a third lens flat plate 1530 and a 3b-th lens element 1532 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 1511 has a convex surface directed toward the object side and has a positive refractive power. The image side surface of the 1b-th lens element 1512 has a concave surface directed toward the image side and has a negative refractive power. The object side surface of the 2f-th lens element 1521 has a concave surface directed toward the object side and has a negative refractive power. The image side surface of the 2b-th lens element 1522 has a concave surface directed toward the image side and has a negative refractive power. The object side surface of the 3f-th lens element 1531 has a concave surface directed toward the object side near the optical axis and has a convex surface directed toward the object side in the periphery. The 3f-th lens element 1531 has a negative power. In this embodiment of the present invention, the 1f-th lens element 1511, the 1b-th lens element 1512, the 2f-th lens element 1521, the 2b-th lens element 5422, the 3f-th lens element 1531, the third lens flat plate 1530 and the 3b-th lens element 1532 are made of UV hardening type resin. The Abbe's number v1 of the 1f-th lens element 1511 is set to 56.3. The Abbe's number v2 of the 1b-th lens element 1512 is set to 30.2. Lens surfaces S1501, S1504, S1505, S1508, S1509 and S1512 have aspheric surface form. The glass material used for the lens flat plate may differ respectively.

In the embodiment having the above mentioned configuration, each parameter value of the imaging lens is as illustrated in Table 29 below. Here, "Sm" represents the m-th surface number sequentially from the object side. "Sm" also includes each surface of a lens element and a lens flat plate. Surfaces muturally bonded are counted as one as a whole.

TABLE 29

| Sm | Curvature Radius (mm) | Surface Distance on Axis (mm) | Refractive Index | Abbe's Number | FIG. 29 |
|---|---|---|---|---|---|
| 1* | 0.950 | 0.350 | 1.5251 | 56.341 | S1501 |
| 2 (ape) | ∞ | 0.389 | 1.601 | 52.471 | |
| 3 | ∞ | 0.080 | 1.583 | 30.228 | |
| 4* | 5.000 | 0.429 | | | S1504 |
| 5* | -4.521 | 0.197 | 1.583 | 30.228 | S1505 |
| 6 | ∞ | 0.816 | 1.601 | 52.471 | |
| 7 | ∞ | 0.204 | 1.583 | 30.228 | |
| 8* | -58.304 | 0.175 | | | S1508 |
| 9* | -1.773 | 0.050 | 1.583 | 30.228 | S1509 |
| 10 | ∞ | 0.300 | 1.601 | 52.471 | |
| 11 | ∞ | 0.130 | 1.583 | 30.228 | |
| 12* | 7.175 | 0.058 | | | S1512 |

In this embodiment of the present invention, a ratio of Di/Dt=0.055 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 1511 and the 1b-th lens element 1512 is represented by $|v1-v2|=26.1$. Thus, the difference in the Abbe's number satisfies the conditional relationship (4). A ratio of fsl/f=1.05 where "fsl" represents a focal length of the object side surface of the 1f-th lens element 1511 and "f" represents a focal length of the overall optical system. Thus, the ratio of fsl/f satisfies the conditional relationship (1).

Figure 30:
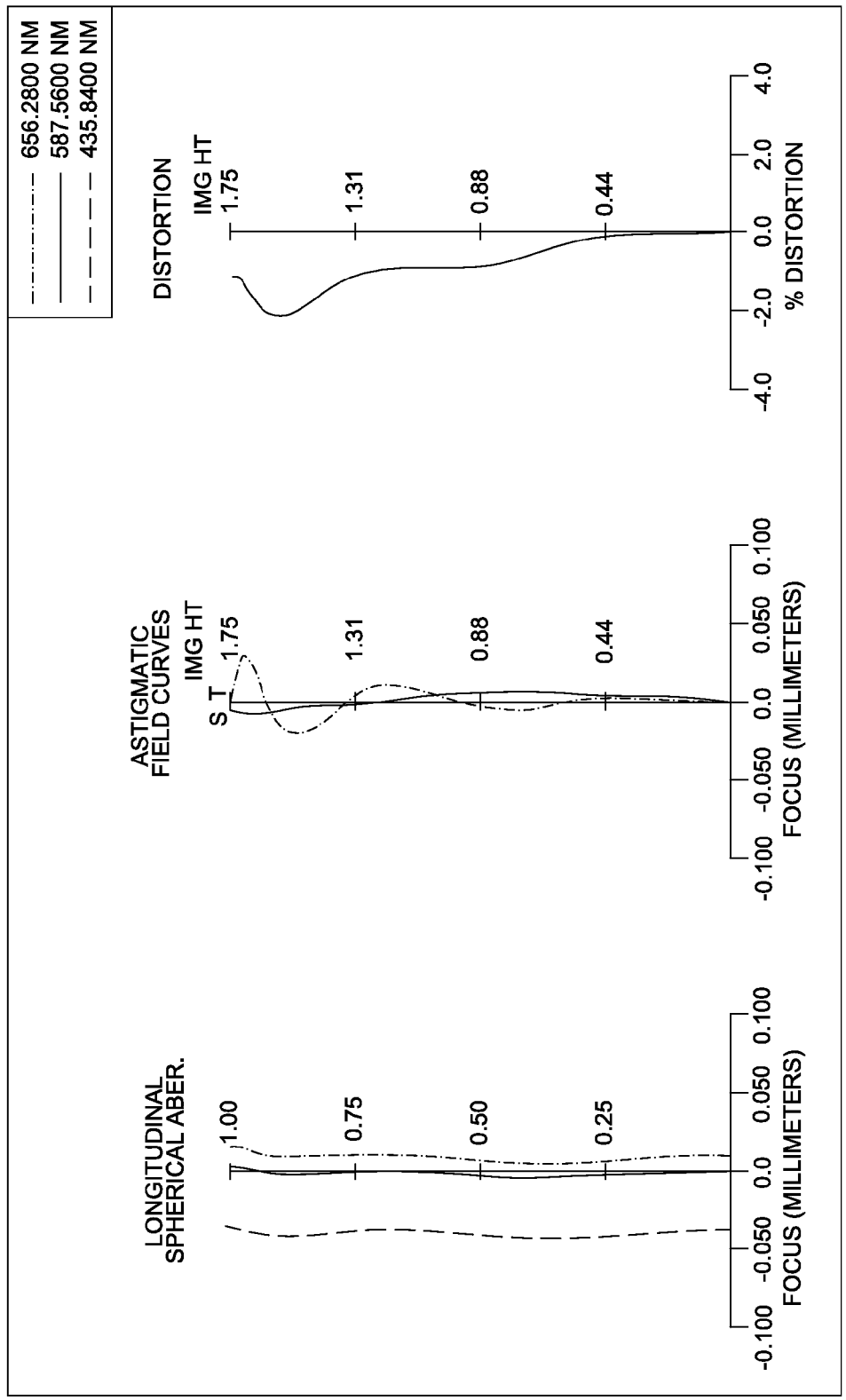
FIG. 30 illustrates aberration graphs of the imaging lens according to the fifteenth embodiment of the present invention.

FIG. 30 illustrates aberration graphs of the imaging lens of FIG. 29. The lens system is simply configured. The lens system satisfies the conditional relationships (1) and (4) so that the overall optical length is short. Further, as illustrated in FIG. 30, the lens system obtains satisfactory aberration properties and allows the most image-side resin layer to be thin. By using the resin material, the cost can be maintained low and the production can be performed easily.

The following Table 30 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07$. [Mathematical Expression 23]

Thus, the Mathematical Expression 23 satisfies the conditional relationship (2).

TABLE 30

| S | K | A | B | C | D |
|---|---|---|---|---|---|
| 1 | 2.727E−01 | −3.214E−02 | −4.508E−01 | 1.958E+00 | −3.208E+00 |
| 4 | 5.162E+00 | 8.159E−03 | −3.715E−01 | 3.332E+00 | −1.255E+01 |
| 5 | −5.912E+01 | −5.306E−01 | 3.984E−01 | −6.034E+00 | 8.841E+00 |
| 8 | −1.000E+09 | 9.274E−02 | −1.122E−01 | 4.582E+00 | 1.185E−04 |
| 9 | −8.778E+00 | 1.192E−01 | −2.713E−02 | −3.607E−03 | 1.162E−03 |
| 12 | −1.000E+09 | 1.888E−01 | −3.226E−01 | 1.552E−01 | −1.717E−02 |

| S | E | F | G | H | J |
|---|---|---|---|---|---|
| 1 | −9.317E+00 | 3.472E+01 | −3.430E+01 | 9.604E+00 | 2.944E+00 |
| 4 | −5.437E−01 | 5.492E+01 | 1.366E+01 | −3.019E+01 | −3.271E+02 |
| 5 | 1.441E+01 | −5.982E+01 | −2.928E+01 | −7.829E+01 | −2.395E+02 |
| 8 | −8.306E−03 | −1.119E−03 | 1.209E−03 | 2.501E−04 | −9.719E−05 |
| 9 | 6.475E−04 | −1.449E−04 | 0.000E+00 | 0.000E+00 | 0.000E+00 |
| 12 | −5.060E−03 | 4.677E−04 | 2.489E−04 | 2.700E−05 | −1.611E−05 |

Sixteenth Embodiment

Figure 31:
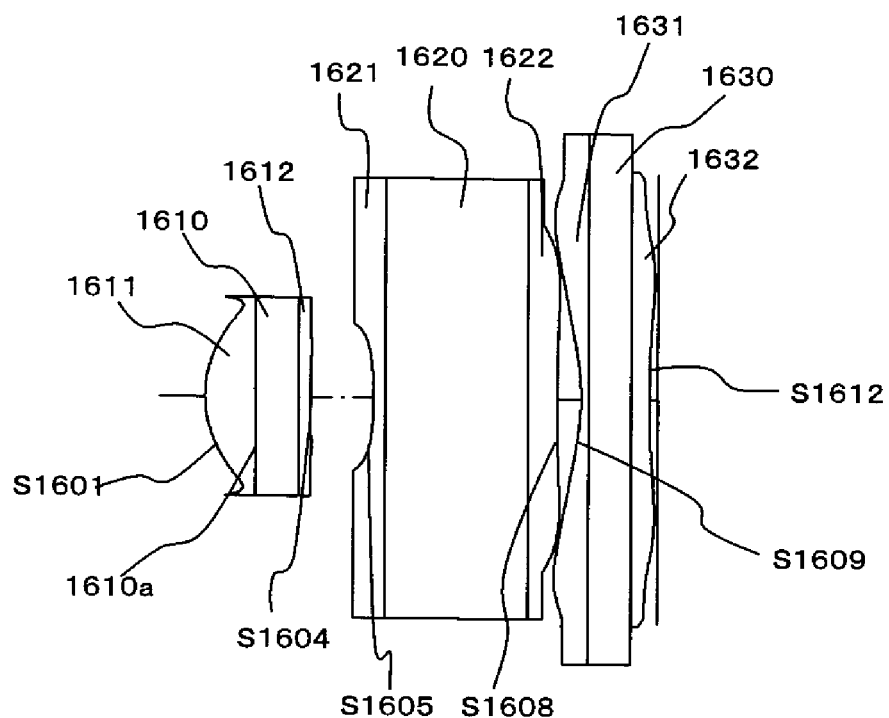
FIG. 31 illustrates a sectional view of the imaging lens according to a sixteenth embodiment of the present invention.

FIG. 31 illustrates a sectional view of the imaging lens according to a sixteenth embodiment of the present invention.

As illustrated in FIG. 31, the imaging lens according to this embodiment of the present invention is configured of a lens system including a 1f-th lens element 1611, an aperture diaphragm 1610a, a first lens flat plate 1610, a 1b-th lens element 1612, a 2f-th lens element 1621, a second lens flat plate 1620, a 2b-th lens element 1622, a 3f-th lens element 1631, a third lens flat plate 1630 and a 3b-th lens element 1632 in the order from the object side. Here, the imaging lens configured of three lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to three, and the number of lenses may be four or five. The object side surface of the 1f-th lens element 1611 has a convex surface directed toward the object side and has a positive refractive power. The image side surface of the 1b-th lens element 1612 has a concave surface directed toward the image side and has a negative refractive power. The object side surface of the 2f-th lens element 1621 has a concave surface directed toward the object side and has a negative refractive power. The image side surface of the 2b-th lens element 1622 has a concave surface directed toward the image side and has a negative refractive power. The object side surface of the 3f-th lens element 1631 has a concave surface directed toward the object side near the optical axis and has a convex surface directed toward the object side in the periphery. The 3f-th lens element 1631 has a negative refractive power. In this embodiment of the present invention, the 1f-th lens element 1611, the 1b-th lens element 1612, the 2f-th lens element 1621, the 2b-th lens element 1622, the 3f-th lens element 1631, the third lens flat plate 1630 and the 3b-th lens element 1632 are made of UV hardening type resin. The Abbe's number ν1 of the 1f-th lens element 1611 is set to 70.4. The Abbe's number ν2 of the 1b-th lens element 1612 is set to 61.1. Lens surfaces S1601, S1604, S1605, S1608, S1609 and S1612 have aspheric surface form. The glass material used for the lens flat plate may differ respectively.

In the embodiment having the above mentioned configuration, each parameter value of the imaging lens is as illustrated in Table 31 below. Here, "Sm" represents the m-th surface number sequentially from the object side. "Sm" also includes each surface of a lens element and a lens flat plate. Surfaces muturally bonded are counted as one as a whole.

TABLE 31

| Sm | Curvature Radius (mm) | Surface Distance on Axis (mm) | Refractive Inde | Abbe's Number | FIG. 31 |
|---|---|---|---|---|---|
| 1* | 0.955 | 0.350 | 1.487 | 70.450 | S1601 |
| 2 (ape) | ∞ | 0.308 | 1.487 | 70.440 | |
| 3 | ∞ | 0.085 | 1.589 | 61.113 | |
| 4* | 15.283 | 0.441 | | | S1604 |
| 5* | −3.910 | 0.081 | 1.589 | 61.113 | S1605 |
| 6 | ∞ | 1.000 | 1.487 | 70.440 | |
| 7 | ∞ | 0.211 | 1.589 | 61.113 | |
| 8* | 71.532 | 0.165 | | | S1608 |
| 9* | −1.898 | 0.050 | 1.589 | 61.113 | S1609 |
| 10 | ∞ | 0.300 | 1.694 | 53.873 | |
| 11 | ∞ | 0.130 | 1.589 | 61.113 | |
| 12* | −9.916 | 0.059 | | | S1612 |

In this embodiment of the present invention, a ratio of Di/Dt=0.052 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 1611 and the 1b-th lens element 1612 is represented by |v1−v2|=9.3. Thus, the difference in the Abbe's number satisfies the conditional relationship (3'). A ratio of fsl/f=1.05 where "fsl" represents a focal length of the object side surface of the 1f-th lens element 1611 and "f" represents a focal length of the overall optical system. Thus, the ratio of fsl/f satisfies the conditional relationship (1).

Figure 32:
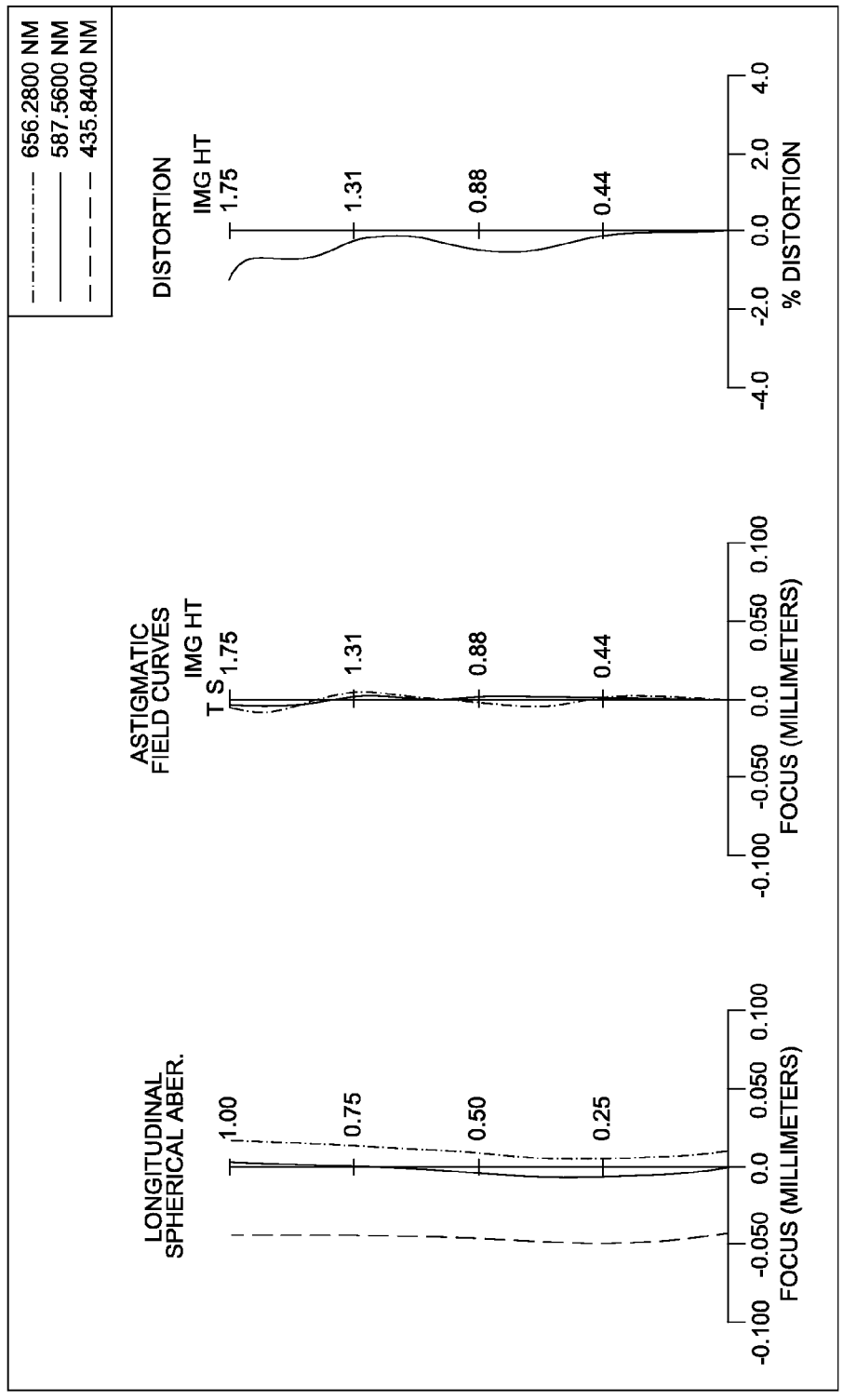
FIG. 32 illustrates aberration graphs of the imaging lens according to the sixteenth embodiment of the present invention.

FIG. 32 illustrates aberration graphs of the imaging lens of FIG. 31. The lens system is simply configured. The lens system satisfies the conditional relationships (1) and (3') so that the overall optical length is short. Further, as illustrated in FIG. 32, the lens system obtains satisfactory aberration properties and allows the most image-side resin layer to be thin. By using the resin material, the cost can be maintained low and the production can be performed easily.

The following Table 32 illustrates the value of "$A_q$" in the above-mentioned mathematical expression of the aspheric sag amount "X" and specifies the aspheric surface form. In this embodiment of the present invention, the most image-side lens surface of a lens has, at the height h that is in the direction perpendicular to the optical axis and of the principal ray of the maximum image height, an aspheric sag amount:

$|X-X_o|/Y=0.07$.                    [Mathematical Expression 24]

Thus, the Mathematical Expression 24 satisfies the conditional relationship (2).

requested compactness can be secured, the number of lenses is not limited to four, and the number of lenses may be five or six. The object side surface of the 1f-th lens element 1711 has a convex surface directed toward the object side and has a positive refractive power. The image side surface of the 1b-th lens element 1712 has a concave surface directed toward the image side and has a negative refractive power. The object side surface of the 2f-th lens element 1721 has a concave surface directed toward the object side and has a negative refractive power. The object side surface of the 3f-th lens element 1731 has a convex surface directed toward the object side near the optical axis and has a convex surface directed toward the object side in the periphery. The 3f-th lens element 1731 has a positive refractive power. In this embodiment of the present invention, the 1f-th lens element 1711, the 1b-th lens element 1712, the 2f-th lens element 1721, the 3f-th lens element 1731, the third lens flat plate 1730, the 3b-th lens element 1732 and the fourth lens flat plate 1740 are made of UV hardening type resin. The Abbe's number v1 of the 1f-th lens element 1711 is set to 57.0. The Abbe's number v2 of the 1b-th lens element 1712 is set to 32.0. Lens surfaces S1701, S1704, S1705, S1709 and S1712 have aspheric surface form. The glass material used for the lens flat plate may differ respectively.

In the embodiment having the above mentioned configuration, each parameter value of the imaging lens is as illus-

TABLE 32

| S | K | A | B | C | D |
|---|---|---|---|---|---|
| 1 | 2.426E−01 | −4.873E−02 | −4.346E−01 | 1.915E+00 | −3.873E+00 |
| 4 | −5.964E+02 | −3.266E−02 | −2.600E−01 | 8.102E−01 | −1.361E+00 |
| 5 | 2.010E+01 | −4.344E−01 | 6.230E−01 | −7.056E+00 | 1.064E+01 |
| 8 | −1.000E+11 | 9.340E−02 | −1.184E−01 | 3.492E−02 | 4.190E−03 |
| 9 | −1.579E+01 | 4.223E−02 | −2.043E−02 | −2.452E−03 | 3.037E−03 |
| 12 | −1.000E+08 | 2.349E−01 | −3.394E−01 | 1.610E−01 | −1.859E−02 |

| S | E | F | G | H | J |
|---|---|---|---|---|---|
| 1 | −1.018E+01 | 4.091E+01 | −2.376E+01 | −7.537E+00 | −5.419E+01 |
| 4 | −2.056E+01 | 5.747E+01 | 1.366E+01 | −3.019E+01 | −3.271E+02 |
| 5 | 1.072E+01 | −5.060E+01 | −3.040E+01 | −8.285E+01 | −2.395E+02 |
| 8 | −7.508E−03 | −5.305E−04 | 1.281E−03 | 2.424E−04 | −1.494E−04 |
| 9 | 8.711E−04 | −3.629E−04 | 0.000E+00 | 0.000E+00 | 0.000E+00 |
| 12 | −6.069E−03 | 7.015E−04 | 2.949E−04 | 3.513E−05 | −2.125E−05 |

Seventeenth Embodiment

Figure 33:
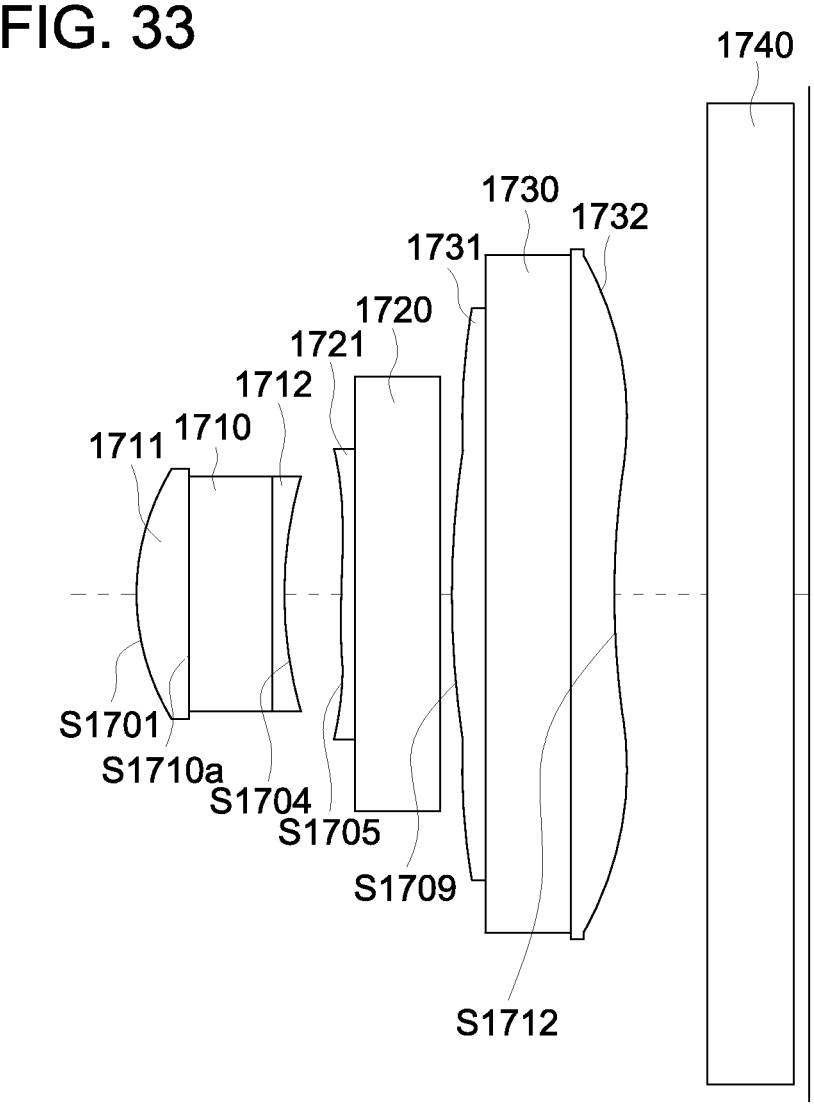
FIG. 33 illustrates a sectional view of the imaging lens according to a seventeenth embodiment of the present invention.

FIG. 33 illustrates a sectional view of the imaging lens according to a seventeenth embodiment of the present invention.

As illustrated in FIG. 33, the imaging lens according to this embodiment of the present invention is configured of a lens system including a 1f-th lens element 1711, an aperture diaphragm 1710a, a first lens flat plate 1410, a 1b-th lens element 1712, a 2f-th lens element 1721, a second lens flat plate 1720, a 3f-th lens element 1731, a third lens flat plate 1730, a 3b-th lens element 1732 and a fourth lens flat plate 1740 in the order from the object side. Here, the imaging lens configured of four lenses is described in this embodiment of the present invention. However, the imaging lens may be configured of more lenses. For example, in the case where "i" number of lenses are used, an i-th lens disposed at the most image side may be configured similar to the third lens in this embodiment In this case, any kind of lens (for example, a bonded lens, a spherical lens or an aspherical lens) may be used in between the second lens and the i-th lens. Further, as long as the trated in Table 33 below. Here, "Sm" represents the m-th surface number sequentially from the object side. "Sm" also includes each surface of a lens element and a lens flat plate. Surfaces muturally bonded are counted as one as a whole.

TABLE 33

| Sm | Curvature Radius (mm) | Surface Distance on Axis (mm) | Refractive Inde | Abbe's Number | FIG. 33 |
|---|---|---|---|---|---|
| 1* | 0.874 | 0.232 | 1.520 | 57.00 | S1701 |
| 2 ape) | ∞ | 0.400 | 1.474 | 56.40 | |
| 3 | ∞ | 0.050 | 1.550 | 32.00 | |
| 4* | 1.846 | 0.279 | | | S1704 |
| 5* | −4.004 | 0.050 | 1.520 | 57.00 | S1705 |
| 6 | ∞ | 0.400 | 1.474 | 56.40 | |
| 7 | ∞ | 0.000 | | | |
| 8 | ∞ | 0.050 | | | |
| 9* | 1.72 | 0.160 | 1.520 | 57.00 | S1709 |
| 10 | ∞ | 0.400 | 1.474 | 56.40 | |
| 11 | ∞ | 0.196 | 1.550 | 32.00 | |
| 12* | 2.093 | 0.432 | | | S1712 |

TABLE 33-continued

| Sm | Curvature Radius (mm) | Surface Distance on Axis (mm) | Refractive Inde | Abbe's Number | FIG. 33 |
|---|---|---|---|---|---|
| 13 | ∞ | 0.400 | 1.516 | 64.16 | |
| 14 | ∞ | 0.076 | | | |

In this embodiment of the present invention, a ratio of Di/Dt=0.016 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 1711 and the 1b-th lens element 1712 is represented by |ν1−ν2|=25. Thus, the difference in the Abbe's number satisfies the conditional relationship (4). A ratio of fsl/f=0.96 where "fsl" represents a focal length of the object side surface of the 1f-th lens element 1711 and "f" represents a focal length of the overall optical system. Thus, the ratio of fsl/f satisfies the conditional relationship (1).

Figure 34:
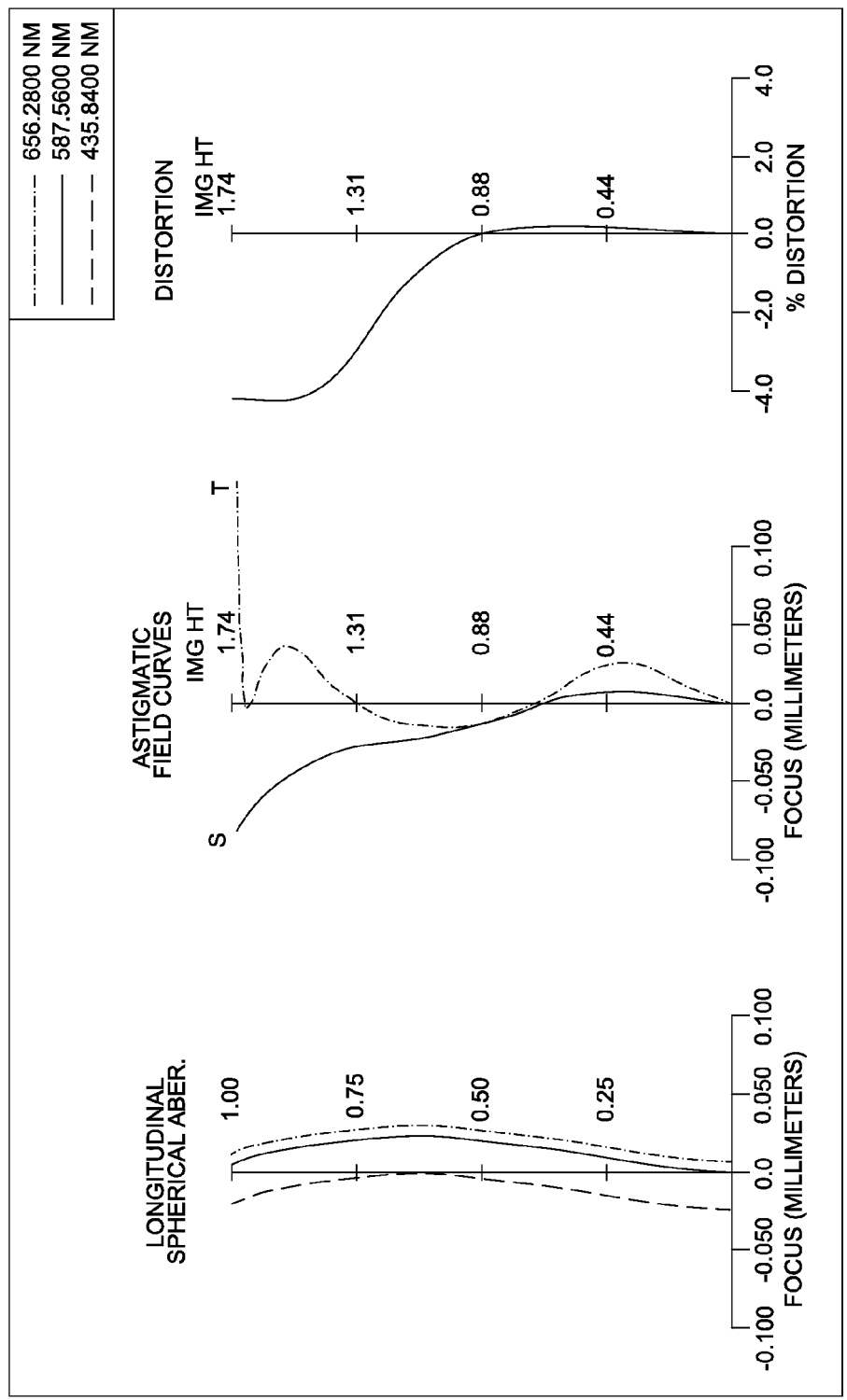
FIG. 34 illustrates aberration graphs of the imaging lens according to the seventeenth embodiment of the present invention.

FIG. 34 illustrates aberration graphs of the imaging lens of FIG. 33. The lens system is simply configured. The lens system satisfies the conditional relationships (1) and (4) so that the overall optical length is short. Further, as illustrated in FIG. 34, the lens system obtains satisfactory aberration properties and allows the most image-side resin layer to be thin. By using the resin material, the cost can be maintained low and the production can be performed easily.

The following Table 34 illustrates the value of "$A_q$" in the above-mentioned mathematical expression of the aspheric sag amount "X" and specifies the aspheric surface form. In this embodiment of the present invention, the most image-side lens element surface of a lens has, at the height h that is in the direction perpendicular to the optical axis and of the principal ray of the maximum image height, an aspheric sag amount:

$|X-X_q|/Y=0.16$.

Thus, the conditional relationship (2) is satisfied.

TABLE 34

| S | K | A | B | C | D |
|---|---|---|---|---|---|
| 1 | −3.013E−01 | 2.864E−02 | 7.652E−01 | −5.270E+00 | 2.736E+01 |
| 4 | 1.226E+01 | 5.674E−02 | 5.807E−01 | −9.555E+00 | −7.038E+00 |
| 5 | 8.347E+00 | 3.443E−01 | −1.202E+00 | 2.433E+00 | −4.890E−01 |
| 9 | −4.169E+01 | 8.850E−02 | −8.152E−01 | 1.359E+00 | −9.521E−01 |
| 12 | −3.429E+01 | 7.345E−03 | −1.608E−01 | 8.299E−02 | −1.406E−02 |

| S | E | F | G | H | J |
|---|---|---|---|---|---|
| 1 | −8.298E+01 | 1.138E+02 | 0.000E+00 | 0.000E+00 | 0.000E+00 |
| 4 | 3.234E+02 | −1.045E+03 | 0.000E+00 | 0.000E+00 | 0.000E+00 |
| 5 | 0.000E+00 | 0.000E+00 | 0.000E+00 | 0.000E+00 | 0.000E+00 |
| 9 | 3.136E−01 | −4.176E−02 | 0.000E+00 | 0.000E+00 | 0.000E+00 |
| 12 | −6.955E−03 | 3.822E−03 | 0.000E+00 | 0.000E+00 | 0.000E+00 |

Eighteenth Embodiment

Figure 35:
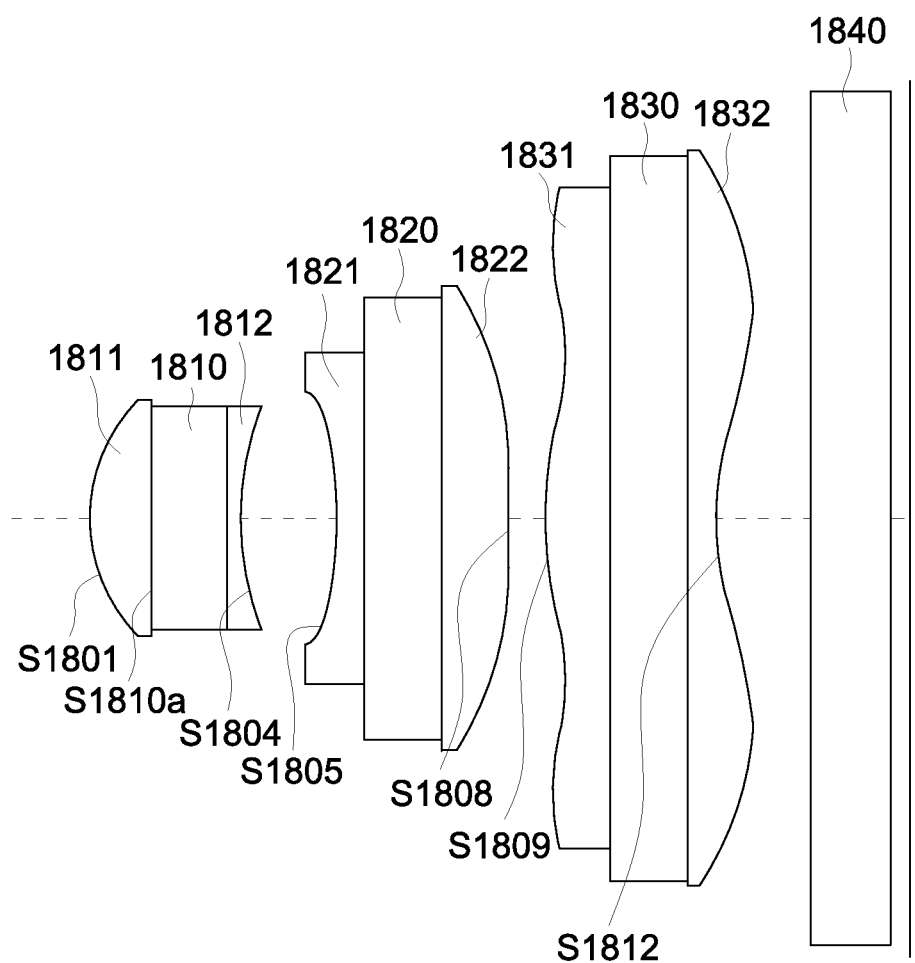
FIG. 35 illustrates a sectional view of the imaging lens according to an eighteenth embodiment of the present invention.

FIG. 35 illustrates a sectional view of the imaging lens according to an eighteenth embodiment of the present invention.

As illustrated in FIG. 35, the imaging lens according to this embodiment of the present invention is configured of a lens system including a 1f-th lens element 1811, an aperture diaphragm 1810a, a first lens flat plate 1810, a 1b-th lens element 1812, a 2f-th lens element 1821, a second lens flat plate 1820, a 2b-th lens element 1822, a 3f-th lens element 1831, a third lens flat plate 1830, a 3b-th lens element 1832 and a fourth lens flat plate 1840 in the order from the object side. Here, the imaging lens configured of four lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to four, and the number of lenses may be five or six. The object side surface of the 1f-th lens element 1811 has a convex surface directed toward the object side and has a positive refractive power. The image side surface of the 1b-th lens element 1812 has a concave surface directed toward the image side and has a negative refractive power. The object side surface of the 2f-th lens element 1821 has a concave surface directed toward the object side and has a negative refractive power. The image side surface of the 2b-th lens element 1822 has a convex surface directed toward the image side and has a positive refractive power. The object side surface of the 3f-th lens element 1831 has a convex surface directed toward the object side near the optical axis and has a convex surface directed toward the object side in the periphery. The 3f-th lens element 1831 has a positive refractive power. In this embodiment of the present invention, the 1f-th lens element 1811, the 1b-th lens element 1812, the 2f-th lens element 1821, the 2b-th lens element 1822, the 3f-th lens element 1831, the third lens flat plate 1830, the 3b-th lens element 1832 and the fourth lens flat plate 1840 are made of UV hardening type resin. The Abbe's number ν1 of the 1f-th lens element 1811 is set to 57.0. The Abbe's number ν2 of the 1b-th lens element 1812 is set to 32.0. Lens surfaces S1801, S1804, S1805, S1808, S1809 and S1812 have aspheric surface form. The glass material used for the lens flat plate may differ respectively.

In the embodiment having the above mentioned configuration, each parameter value of the imaging lens is as illustrated in Table 35 below. Here, "Sm" represents the m-th surface number sequentially from the object side. "Sm" also includes each surface of a lens element and a lens flat plate. Surfaces muturally bonded are counted as one as a whole.

TABLE 35

| Sm | Curvature Radius (mm) | Surface Distance on Axis (mm) | Refractive Index | Abbe's Number | FIG. 35 |
|---|---|---|---|---|---|
| 1* | 0.820 | 0.233 | 1.520 | 57.00 | S1801 |
| 2 (ape) | ∞ | 0.300 | 1.474 | 56.40 | |
| 3 | ∞ | 0.050 | 1.550 | 32.00 | |
| 4* | 2.017 | 0.369 | | | S1804 |
| 5* | −2.302 | 0.113 | 1.550 | 32.00 | S1805 |
| 6 | ∞ | 0.300 | 1.474 | 56.40 | |
| 7 | ∞ | 0.250 | 1.520 | 57.00 | |
| 8* | −324.731 | 0.151 | | | S1808 |
| 9* | 1.397 | 0.250 | 1.520 | 57.00 | S1809 |
| 10 | ∞ | 0.300 | 1.474 | 56.40 | |
| 11 | ∞ | 0.114 | 1.520 | 57.00 | |
| 12* | 1.377 | 0.369 | | | S1812 |
| 13 | ∞ | 0.300 | 1.516 | 64.14 | |
| 14 | ∞ | 0.077 | | | |

In this embodiment of the present invention, a ratio of Di/Dt=0.047 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A). A difference in the Abbe's numbers of the 1f-th lens element 1811 and the 1b-th lens element 1812 is represented by $|v1-v2|=25.0$. Thus, the difference in the Abbe's number satisfies the conditional relationship (4). A ratio of fsl/f=0.86 where "fsl" represents a focal length of the object side surface of the 1f-th lens element 1811 and "f" represents a focal length of the overall optical system. Thus, the ratio of fsl/f satisfies the conditional relationship (1).

Figure 36:
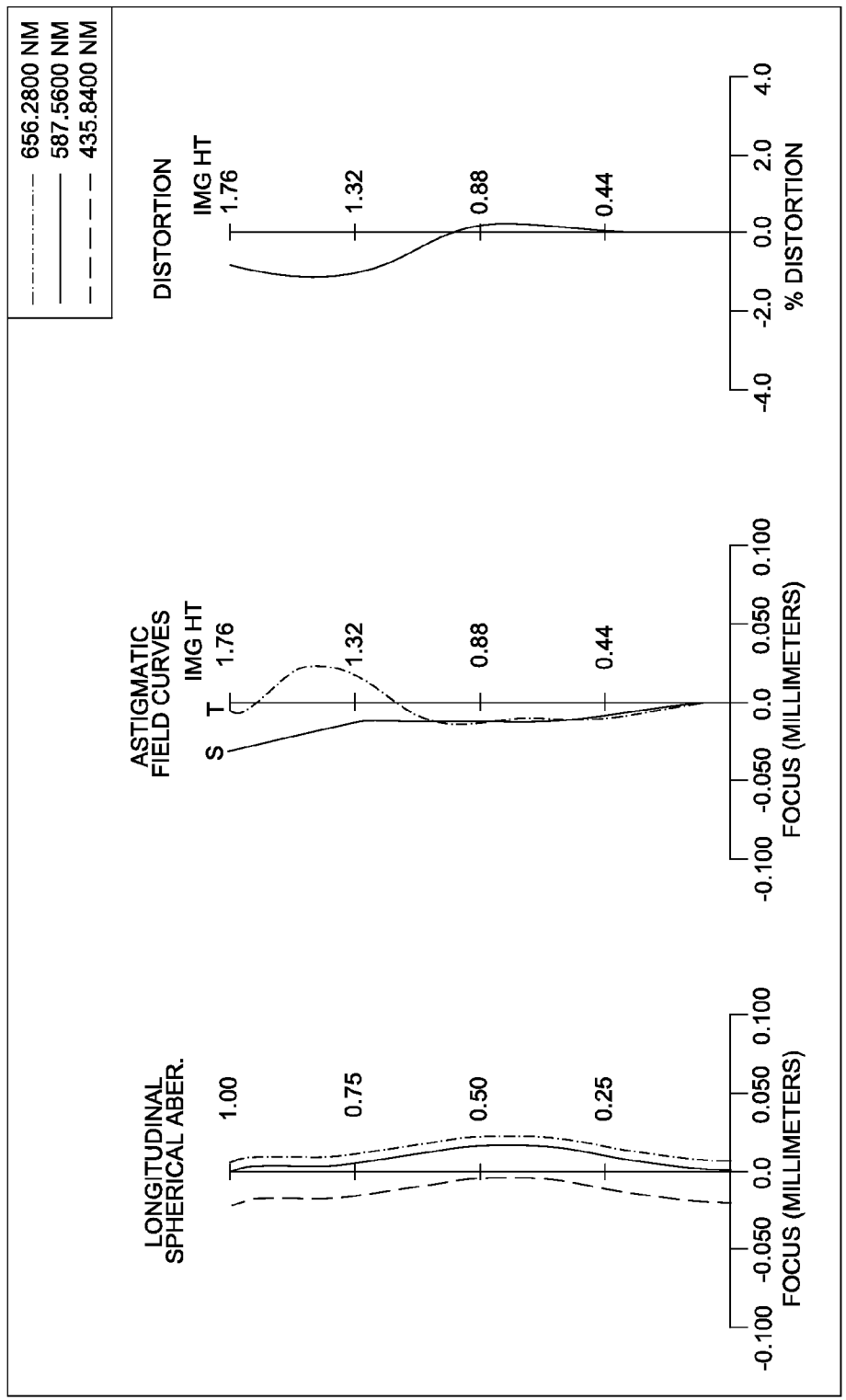
FIG. 36 illustrates aberration graphs of the imaging lens according to the eighteenth embodiment of the present invention.

FIG. 36 illustrates aberration graphs of the imaging lens of FIG. 35. The lens system is simply configured. The lens system satisfies the conditional relationships (1) and (4) so that the overall optical length is short. Further, as illustrated in FIG. 36, the lens system obtains satisfactory aberration properties and allows the most image-side resin layer to be thin. By using the resin material, the cost can be maintained low and the production can be performed easily.

The following Table 36 illustrates the value of "$A_q$" in the above-mentioned mathematical expression of the aspheric sag amount "X" and specifies the aspheric surface form.

TABLE 36

| S | K | A | B | C | D |
|---|---|---|---|---|---|
| 1 | 3.732E−01 | −9.682E−02 | 3.722E−01 | −1.991E+00 | 2.404E+00 |
| 4 | 1.097E+01 | 1.206E−01 | −5.657E−01 | 2.056E+00 | −3.087E−01 |
| 5 | 1.587E+01 | 2.494E−02 | −1.244E+00 | 1.218E+00 | 6.707E+00 |
| 8 | 3.000E+01 | −4.035E−01 | 2.869E−01 | −2.112E−02 | −5.881E−02 |
| 9 | −7.954E−01 | −6.140E−01 | 3.366E−01 | −6.980E−03 | −5.178E−02 |
| 12 | −2.468E+00 | −2.468E−01 | 9.872E−02 | −3.893E−02 | 1.152E−02 |

| S | E | F | G | H | J |
|---|---|---|---|---|---|
| 1 | 0.000E+00 | 0.000E+00 | 0.000E+00 | 0.000E+00 | 0.000E+00 |
| 4 | 0.000E+00 | 0.000E+00 | 0.000E+00 | 0.000E+00 | 0.000E+00 |
| 5 | −2.423E+01 | 0.000E+00 | 0.000E+00 | 0.000E+00 | 0.000E+00 |
| 8 | 5.251E−03 | 0.000E+00 | 0.000E+00 | 0.000E+00 | 0.000E+00 |
| 9 | 1.279E−02 | 0.000E+00 | 0.000E+00 | 0.000E+00 | 0.000E+00 |
| 12 | −1.375E−03 | 0.000E+00 | 0.000E+00 | 0.000E+00 | 0.000E+00 |

Nineteenth Embodiment

Figure 37:
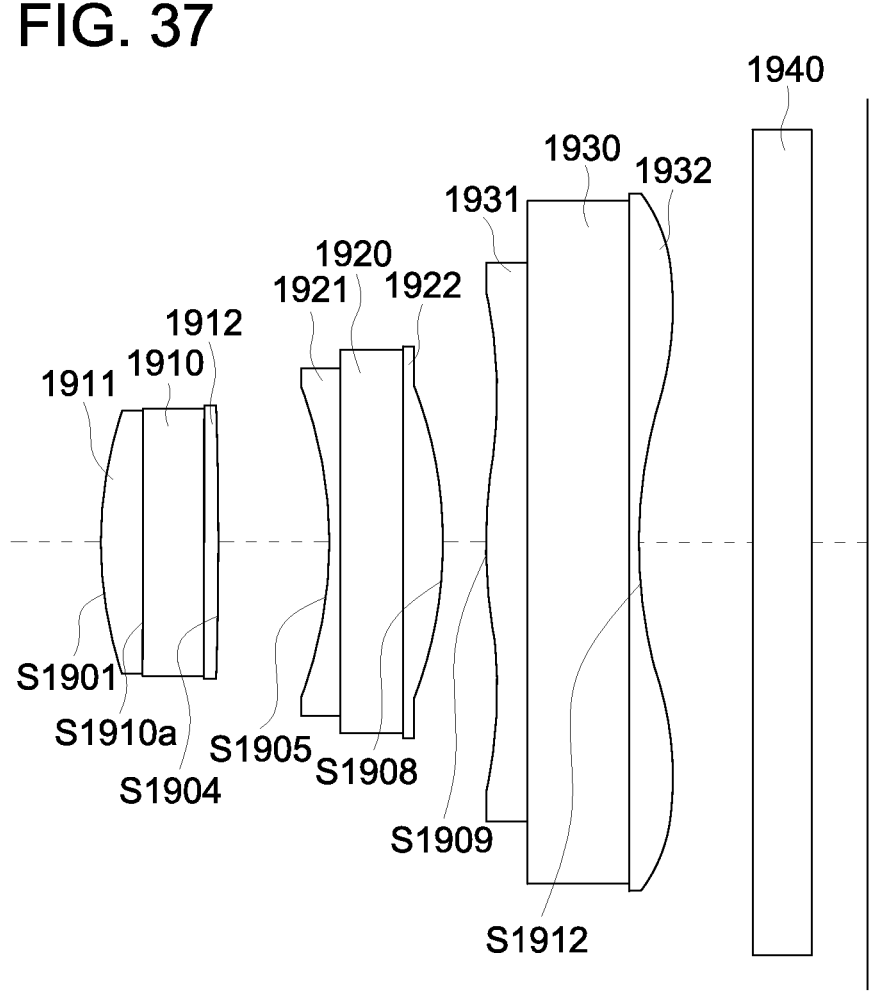
FIG. 37 illustrates a sectional view of the imaging lens according to a nineteenth embodiment of the present invention.

FIG. 37 illustrates a sectional view of the imaging lens according to a nineteenth embodiment of the present invention.

As illustrated in FIG. 37, the imaging lens according to this embodiment of the present invention is configured of a lens system including a 1f-th lens element 1911, an aperture diaphragm 1910*a*, a first lens flat plate 1910, a 1b-th lens element 1912, a 2f-th lens element 1921, a second lens flat plate 1920, a 2b-th lens element 1922, a 3f-th lens element 1931, a third lens flat plate 1930, a 3b-th lens element 1932 and a fourth lens flat plate 1940 in the order from the object side. Here, the imaging lens configured of four lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to four, and the number of lenses may be five or six. The object side surface of the 1f-th lens element 1911 has a convex surface directed toward the object side and has a positive refractive power. The image side surface of the 1b-th lens element 1912 has a convex surface directed toward the image side and has a positive refractive power. The object side surface of the 2f-th lens element 1921 has a concave surface directed toward the object side and has a negative refractive power. The image side surface of the 2b-th lens element 1922 has a convex surface directed toward the image side and has a positive refractive power. The object side surface of the 3f-th lens element 1931 has a convex surface directed toward the object side near the optical axis and has a concave surface directed toward the object side in the periphery. The 3f-th lens element 1931 has a positive refractive power. In this embodiment of the present invention, the 1f-th lens element 1911, the 1b-th lens element 1912, the 2f-th lens element 1921, the 2b-th lens element 1922, the 3f-th lens element 1931, the third lens flat plate 1930, the 3b-th lens element 1932 and the fourth lens flat plate 1940 are made of UV hardening type resin. The Abbe's number v1 of the 1f-th lens element 1911 is set to 57.0. The Abbe's number v2 of the 1b-th lens element 1912 is set to 57.0. Lens surfaces S1901, S1904, S1905, S19908, S1909 and S1912 have aspheric surface form. The glass material used for the lens flat plate may differ respectively.

In the embodiment having the above mentioned configuration, each parameter value of the imaging lens is as illustrated in Table 37 below. Here, "Sm" represents the m-th surface number sequentially from the object side. "Sm" also includes each surface of a lens element and a lens flat plate. Surfaces muturally bonded are counted as one as a whole.

TABLE 37

| Sm | Curvature Radius (mm) | Surface Distance on Axis (mm) | Refractive Inde | Abbe's Number | FIG. 37 |
|---|---|---|---|---|---|
| 1* | 1.540 | 0.200 | 1.520 | 57.00 | S1901 |
| 2 (ape) | ∞ | 0.300 | 1.516 | 64.14 | |
| 3 | ∞ | 0.065 | 1.520 | 57.00 | |
| 4* | −26.455 | 0.543 | | | S1904 |
| 5* | −1.351 | 0.050 | 1.520 | 57.00 | S1905 |
| 6 | ∞ | 0.300 | 1.516 | 64.16 | |
| 7 | ∞ | 0.200 | 1.520 | 57.00 | |
| 8* | −1.423 | 0.217 | | | S1908 |
| 9* | 2.280 | 0.190 | 1.520 | 57.00 | S1909 |
| 10 | ∞ | 0.500 | 1.516 | 64.14 | |
| 11 | ∞ | 0.050 | 1.520 | 57.00 | |
| 12* | 1.387 | 0.534 | | | S1912 |
| 13 | ∞ | 0.300 | 1.516 | 64.14 | |
| 14 | ∞ | 0.265 | | | |

In this embodiment of the present invention, a ratio of Di/Dt=0.058 where "Di" represents a distance between the second lens and the third lens on the optical axis (distance between lenses) and "Dt" represents an optical-axis top distance from the object side surface to the image side surface of the first lens (overall optical length). Thus, the ratio of Di/Dt satisfies the conditional relationship (A).

Figure 38:
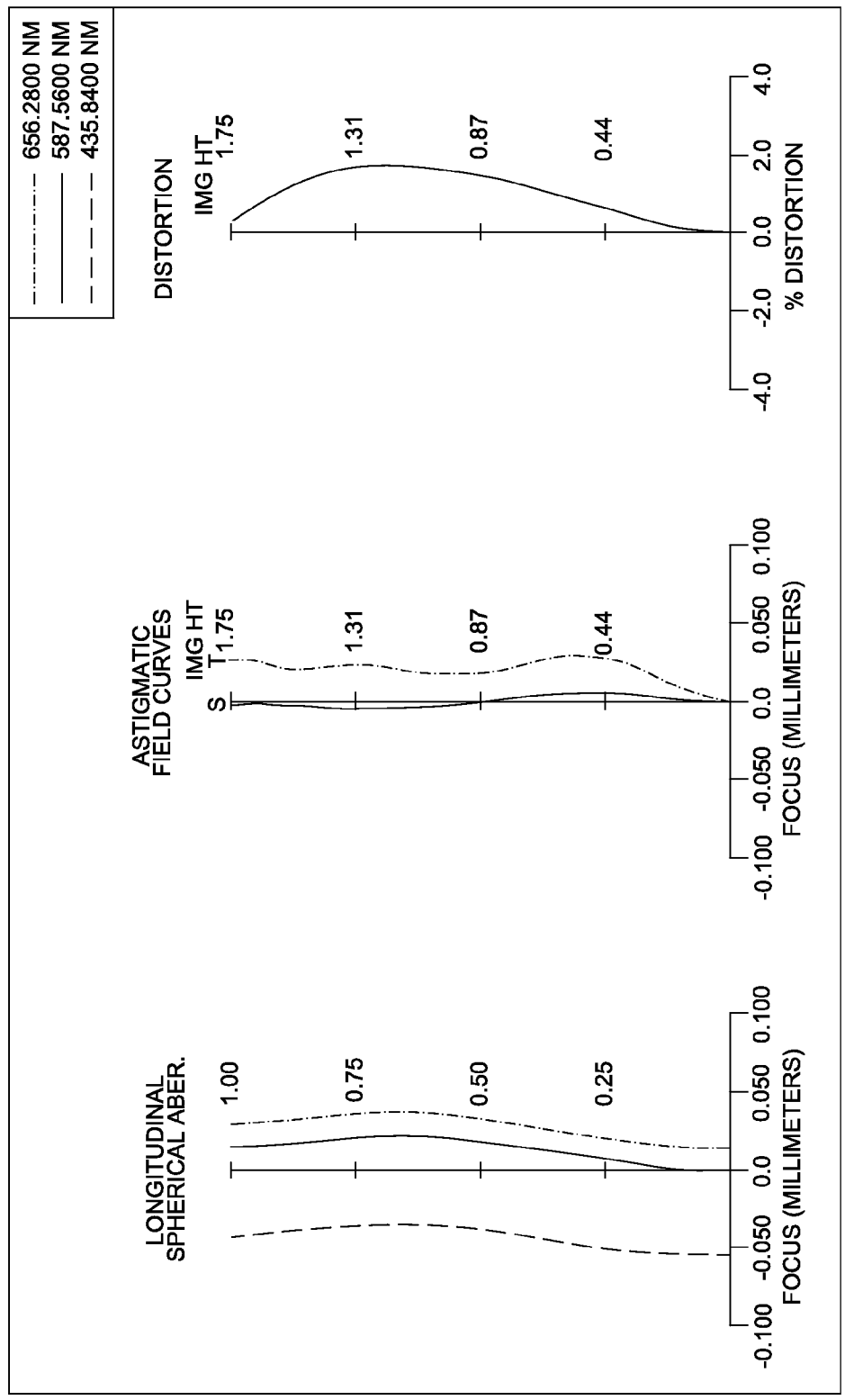
FIG. 38 illustrates aberration graphs of the imaging lens according to the nineteenth embodiment of the present invention.

FIG. 38 illustrates aberration graphs of the imaging lens of FIG. 37. The lens system is simply configured. The overall optical length is short. Further, as illustrated in FIG. 38, the lens system obtains satisfactory aberration properties and allows the most image-side resin layer to be thin. By using the resin material, the cost can be maintained low and the production can be performed easily.

The following Table 38 illustrates the value of "$A_q$" in the above-mentioned mathematical expression of the aspheric sag amount "X" and specifies the aspheric surface form.

TABLE 38

| S | K | A | B | C | D |
|---|---|---|---|---|---|
| 1 | 3.303E+00 | −1.462E−01 | −2.367E−01 | 2.284E−01 | −1.248E+00 |
| 4 | −3.084E+00 | −1.515E−03 | −2.667E−01 | 8.782E−01 | −1.097E+00 |
| 5 | −8.582E+00 | −2.994E−01 | 7.223E−01 | 1.158E−01 | −1.083E+00 |
| 8 | 9.862E−02 | −6.624E−02 | 4.518E−01 | 6.741E−02 | 3.573E−02 |
| 9 | −2.740E+01 | −2.376E−01 | 1.244E−01 | 1.384E−02 | −3.849E−02 |
| 12 | −4.393E+00 | −1.877E−01 | 1.089E−01 | −5.490E−02 | 1.496E−02 |

| S | E | F | G | H | J |
|---|---|---|---|---|---|
| 1 | 0.000E+00 | 0.000E+00 | 0.000E+00 | 0.000E+00 | 0.000E+00 |
| 4 | 0.000E+00 | 0.000E+00 | 0.000E+00 | 0.000E+00 | 0.000E+00 |
| 5 | 6.221E−01 | 0.000E+00 | 0.000E+00 | 0.000E+00 | 0.000E+00 |
| 8 | −1.109E−01 | 0.000E+00 | 0.000E+00 | 0.000E+00 | 0.000E+00 |
| 9 | 1.431E−02 | 0.000E+00 | 0.000E+00 | 0.000E+00 | 0.000E+00 |
| 12 | −1.956E−03 | 0.000E+00 | 0.000E+00 | 0.000E+00 | 0.000E+00 |

Twentieth Embodiment

Figure 39:
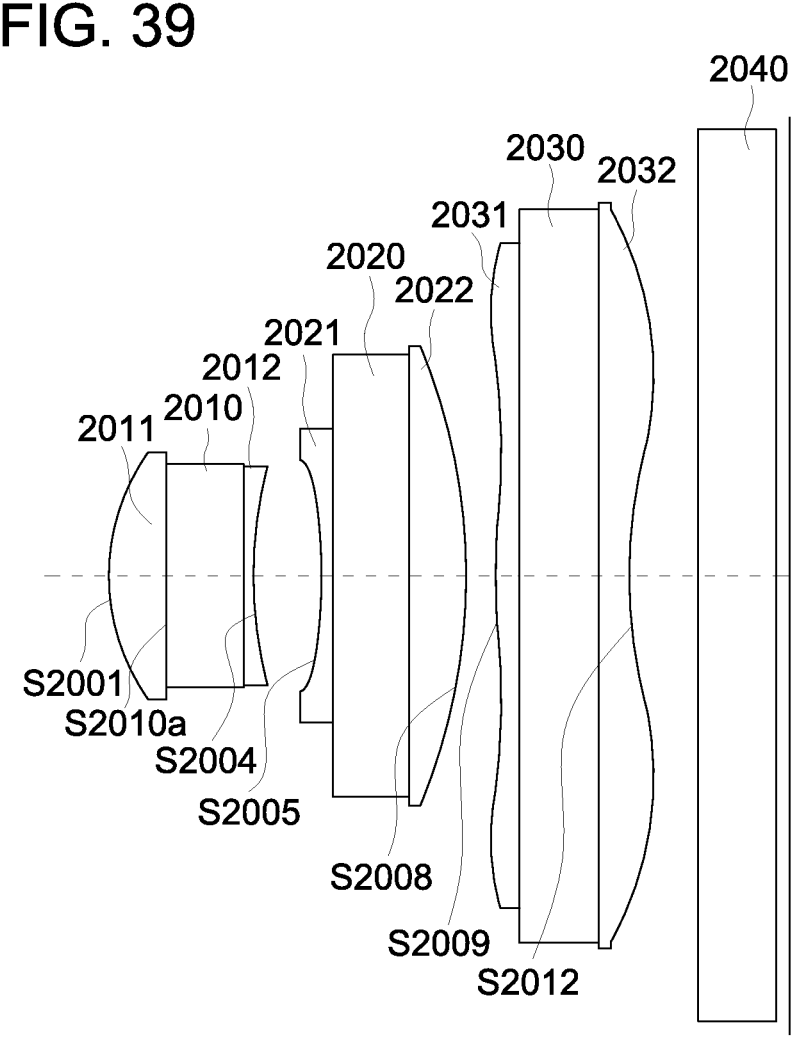
FIG. 39 illustrates a sectional view of the imaging lens according to a twentieth embodiment of the present invention.

FIG. 39 illustrates a sectional view of the imaging lens according to a twentieth embodiment of the present invention.

As illustrated in FIG. 39, the imaging lens according to this embodiment of the present invention is configured of a lens system including a 1f-th lens element 2011, an aperture diaphragm 2010a, a first lens flat plate 2010, a 1b-th lens element 2012, a 2f-th lens element 2021, a second lens flat plate 2020, a 2b-th lens element 2022, a 3f-th lens element 2031, a third lens flat plate 2030, a 3b-th lens element 2032 and a fourth lens flat plate 2040 in the order from the object side. Here, the imaging lens configured of four lenses is described in this embodiment of the present invention. However, the imaging lens may be configured of more lenses. For example, in the case where "i" number of lenses are used, an i-th lens disposed at the most image side may be configured similar to the third lens in this embodiment. In this case, any kind of lens (for example, a bonded lens, a spherical lens or an aspherical lens) may be used in between the second lens and the i-th lens. Further, as long as the requested compactness can be secured, the number of lenses is not limited to four, and the number of lenses may be five or six. The object side surface of the 1f-th lens element 2011 has a convex surface directed toward the object side and has a positive refractive power. The image side surface of the 1b-th lens element 2012 has a concave surface directed toward the image side and has a negative refractive power. The object side surface of the 2f-th lens element 2021 has a concave surface directed toward the object side and has a negative refractive power. The image side surface of the 2b-th lens element 2022 has a convex surface directed toward the object side and has a positive refractive power. The object side surface of the 3f-th lens element 2031 has a convex surface directed toward the object side near the optical axis and has a convex surface directed toward the object side in the periphery. The 3f-th lens element 2031 has a positive refractive power. In this embodiment of the present invention, the 1f-th lens element 2011, the 1b-th lens element 2012, the 2f-th lens element 2021, the 2b-th lens element 2022, the 3f-th lens element 2031, the third lens flat plate 2030, the 3b-th lens element 2032 and the fourth lens flat plate 2040 are made of UV hardening type resin. The Abbe's number v1 of the 1f-th lens element 2011 is set to 57.0. The Abbe's number v2 of the 1b-th lens element 2012 is set to 57.0. Lens surfaces S2001, S2004, S2005, S2008, S2009 and S2012 have aspheric surface form. The glass material used for the lens flat plate may differ respectively.

In the embodiment having the above mentioned configuration, each parameter value of the imaging lens is as illustrated in Table 39 below. Here, "Sm" represents the m-th surface number sequentially from the object side. "Sm" also includes each surface of a lens element and a lens flat plate. Surfaces muturally bonded are counted as one as a whole.

TABLE 39

| Sm | Curvature Radius (mm) | Surface Distance on Axis (mm) | Refractive Index | Abbe's Number | FIG. 39 |
|---|---|---|---|---|---|
| 1* | 0.819 | 0.248 | 1.520 | 57.00 | S2001 |
| 2 (ape) | ∞ | 0.350 | 1.474 | 56.40 | |
| 3 | ∞ | 0.050 | 1.520 | 57.00 | |
| 4* | 2.048 | 0.311 | | | S2004 |
| 5* | −1.845 | 0.050 | 1.520 | 57.00 | S2005 |
| 6 | ∞ | 0.350 | 1.474 | 56.40 | |
| 7 | ∞ | 0.250 | 1.520 | 57.00 | |
| 8* | −3.168 | 0.144 | | | S2008 |
| 9* | 2.202 | 0.111 | 1.520 | 57.00 | S2009 |
| 10 | ∞ | 0.350 | 1.474 | 56.40 | |
| 11 | ∞ | 0.145 | 1.550 | 32.00 | |

TABLE 39-continued

| Sm | Curvature Radius (mm) | Surface Distance on Axis (mm) | Refractive Index | Abbe's Number | FIG. 39 |
|---|---|---|---|---|---|
| 12* | 1.430 | 0.311 | | | S2012 |
| 13 | ∞ | 0.350 | 1.516 | 64.14 | |
| 14 | ∞ | 0.066 | | | |

In this embodiment of the present invention, a ratio of Di/Dt=0.047 where "Di" represents a distance between the second lens and the third lens on the optical axis (distance between lenses) and "Dt" represents a distance on the optical axis from the object side surface of the first lens to the image plane (overall optical length). Thus, the ratio of Di/Dt satisfies the conditional relationship (A).

Figure 40:
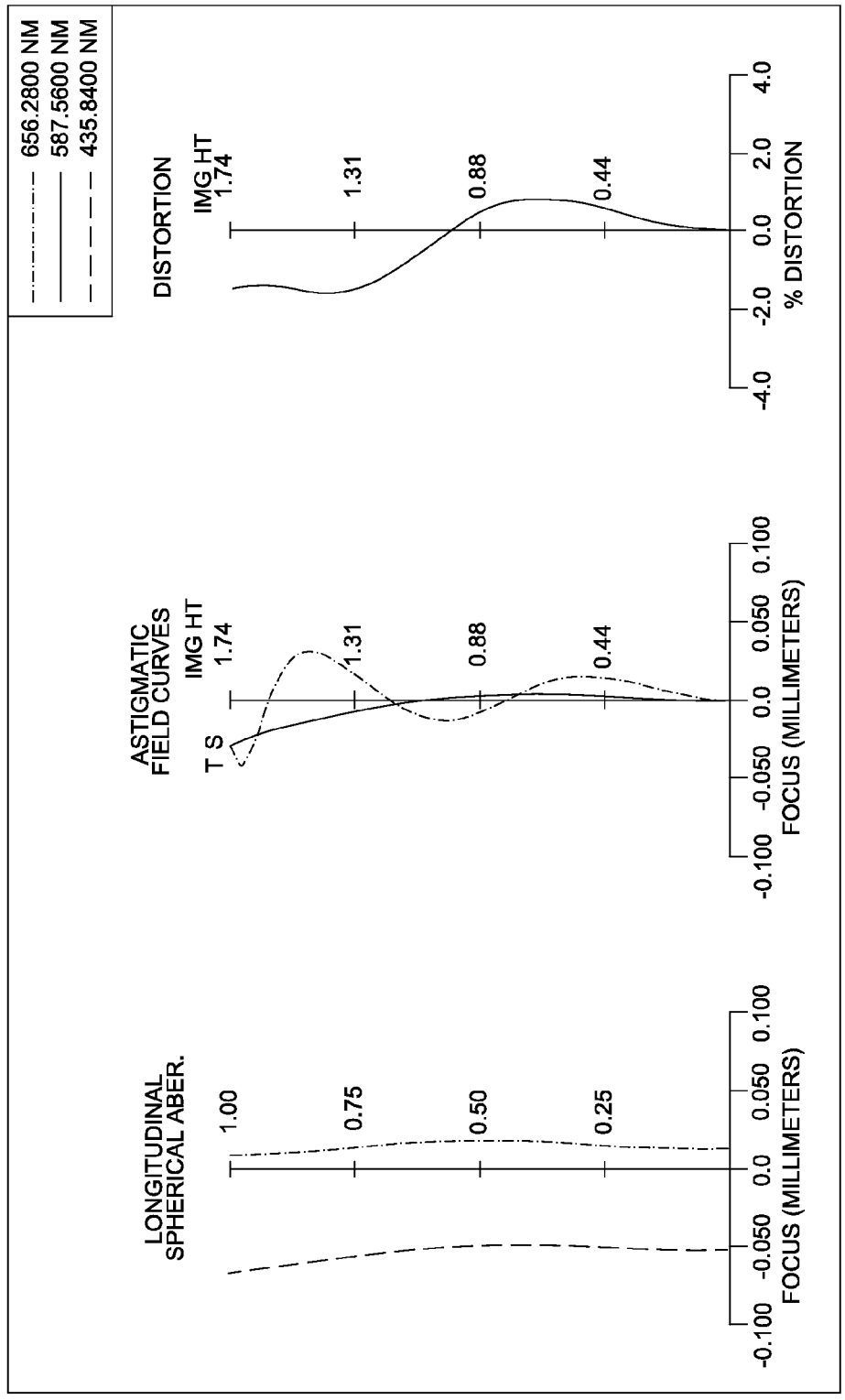
FIG. 40 illustrates aberration graphs of the imaging lens according to the twentieth embodiment of the present invention.

FIG. 40 illustrates aberration graphs of the imaging lens of FIG. 39. The lens system is simply configured. The overall optical length is short. Further, as illustrated in FIG. 40, the lens system obtains satisfactory aberration properties and allows the most image-side resin layer to be thin. By using the resin material, the cost can be maintained low and the production can be performed easily.

The following Table 40 illustrates the value of "$A_q$" in the above-mentioned mathematical expression of the aspheric sag amount "X" and specifies the aspheric surface form.

TABLE 40

| S | K | A | B | C | D |
|---|---|---|---|---|---|
| 1 | 2.704E−01 | −5.248E−02 | 1.886E−02 | −3.301E−01 | −2.198E−02 |
| 4 | 1.179E+01 | 1.022E−01 | −7.890E−01 | 3.276E+00 | −9.879E+00 |
| 5 | 1.189E+01 | 7.063E−02 | −1.156E+00 | 1.529E+00 | −2.281E+00 |
| 8 | 7.572E+00 | −1.438E−01 | 1.077E−02 | 2.102E−01 | 8.810E−03 |
| 9 | 2.284E−01 | −6.024E−01 | 4.070E−01 | −2.178E−02 | −6.746E−02 |
| 12 | −4.684E+00 | −2.310E−01 | 8.978E−02 | −3.411E−02 | 9.570E−03 |

| S | E | F | G | H | J |
|---|---|---|---|---|---|
| 1 | 0.000E+00 | 0.000E+00 | 0.000E+00 | 0.000E+00 | 0.000E+00 |
| 4 | 0.000E+00 | 0.000E+00 | 0.000E+00 | 0.000E+00 | 0.000E+00 |
| 5 | 2.829E+00 | 0.000E+00 | 0.000E+00 | 0.000E+00 | 0.000E+00 |
| 8 | −9.653E−02 | 0.000E+00 | 0.000E+00 | 0.000E+00 | 0.000E+00 |
| 9 | 1.816E−02 | 0.000E+00 | 0.000E+00 | 0.000E+00 | 0.000E+00 |
| 12 | −7.596E−04 | 0.000E+00 | 0.000E+00 | 0.000E+00 | 0.000E+00 |

The corresponding relationship numbers with respect to Di/Dt, "fs1", "f", fs1/f, sag amount, image height, sag amount/image height, $v_1 - v_2$ and Abbe's number in each of the above described embodiments are summarized in the following Table 41.

TABLE 41

| Embodiment | Di/Dt | f | fs1/f | Sag Amount | Image Height | Sag Amount/Image Height | $|v_1 - v_2|$ | Equation Number corresponding to Abbe's Number |
|---|---|---|---|---|---|---|---|---|
| 1 | 0.050 | 2.75 | 1.03636 | 0.13 | 1.75 | 0.07429 | 25 | Equation (4) |
| 2 | 0.054 | 2.75 | 1.04000 | 0.17 | 1.75 | 0.09714 | 25 | Equation (4) |
| 3 | 0.136 | 2.75 | 1.17455 | 0.10 | 1.75 | 0.05714 | 25 | Equation (4) |
| 4 | 0.063 | 2.75 | 1.01091 | 0.10 | 1.75 | 0.05714 | 25 | Equation (4) |
| 5 | 0.051 | 2.75 | 1.04364 | 0.13 | 1.75 | 0.07429 | 25 | Equation (4) |
| 6 | 0.055 | 2.76 | 1.03261 | 0.13 | 1.75 | 0.07429 | 25 | Equation (3) |
| 7 | 0.074 | 2.75 | 1.03636 | 0.13 | 1.75 | 0.07429 | — | |
| 8 | 0.108 | 2.76 | 0.97933 | 0.15 | 1.75 | 0.08571 | 35.7 | Equation (3) |
| 9 | 0.050 | 2.75 | 1.01818 | 0.18 | 1.75 | 0.10286 | 9.3 | Equation (3) |
| 10 | 0.202 | 2.75 | 0.83636 | 0.18 | 1.75 | 0.10286 | 9.3 | Equation (3) |
| 11 | 0.115 | 2.75 | 1.06182 | 0.22 | 1.75 | 0.12571 | 41.4 | Equation (3) |

TABLE 41-continued

| Embodiment | Di/Dt | f | fs1/f | Sag Amount | Image Height | Sag Amount/Image Height | $|v_1 - v_2|$ | Equation Number corresponding to Abbe's Number |
|---|---|---|---|---|---|---|---|---|
| 12 | 0.070 | 2.76 | 1.05072 | 0.13 | 1.75 | 0.07429 | 41.4 | Equation (3) |
| 13 | 0.245 | 2.84 | 1.02465 | 0.13 | 1.75 | 0.07429 | 45 | Equation (3) |
| 14 | 0.055 | 2.75 | 1.01455 | 0.13 | 1.75 | 0.07429 | 21 | Equation (4) |
| 15 | 0.055 | 2.75 | 1.05349 | 0.13 | 1.75 | 0.07429 | 26.1 | Equation (4) |
| 16 | 0.052 | 2.77 | 1.05375 | 0.13 | 1.75 | 0.07429 | 9.3 | Equation (3') |
| 17 | 0.016 | 2.65 | 0.96450 | 0.28 | 1.75 | 0.16109 | 25 | Equation (4) |
| 18 | 0.047 | 2.78 | 0.86197 | 0.55 | 1.75 | 0.31474 | 25 | Equation (4) |
| 19 | 0.058 | 2.96 | 1.48698 | 0.30 | 1.75 | 0.17109 | 0 | |
| 20 | 0.047 | 2.69 | 0.89067 | 0.50 | 1.75 | 0.28297 | 0 | |

In each of the above mentioned embodiments, the material used for the lens elements may be a glass material or a resin material such as thermoplastic and UV hardening type resin.

Each of the above described embodiments illustrates a detailed description of the preferred embodiments. However, the invention is not limited thereto.

Effect of the Invention

As described above, in the case where "i" number of lenses are used in the imaging lens according to the present invention, the angle of incidence of a peripheral light ray to the lens element formed on the image side surface of the i-th lens flat plate can be controlled small by forming a lens element, which is formed on the object side surface of the i-th lens flat plate of the i-th lens arranged on the most image side, into a convex shape directed toward the object side at the peripheral portion from the optical axis. Thereby, it becomes unnecessary for a lens element formed on the image side surface of the i-th lens flat plate to keep the incidence angle to the solid-state image sensing device small. Therefore, the aspheric surface sag amount is suppressed. That is, it becomes possible to make a lens element of the i-th lens flat plate thin and to attain the miniaturization of the whole imaging lens. The conditional relationship (A) specifies the optical-axis distance (distance between lenses) between the (i−1)th lens and the first lens. When the conditional relationship (A) is satisfied, it means that the (i−1)th lens is arranged close to the image plane as much as possible. Thus, the (i−1)th lens should play role in maintaining the telecentric characteristic of the light ray of the maximum view angle. Therefore, it becomes possible to make the lens element of the i-th lens thin. In the conditional relationship (A), it is more desirable to set the lower limit and the upper limit to 0.04 and 0.12, respectively.

In the present invention, the error sensitivity that is closely related to a diaphragm position can be moderated by placing the diaphragm toward the image side from the lens apex on the most object side, namely, by placing the lens or a lens element on the most object side. The error sensitivity is usually severe when three or more lenses are arranged compactly. However, by placing the diaphragm in this arrangement, the miniaturization becomes possible while maintaining the mass production capability.

In the imaging lens according to the present invention, the curvature of field in the image periphery section can be satisfactorily corrected by making the image side surface to be convex toward the image side at a position where the principal ray of the maximum image height of the (i−1)th lens passes through. Therefore, the correction load of the i-th lens can be moderated. Thus, it becomes possible to make the lens element of the first lens thin.

It becomes possible to satisfactorily correct astigmatism by making the object side surface of the second lens concave toward the object side By providing a lens flat plate in the i-th lens, the i-th lens can act as a cover glass for a solid-state image sensing device. Thus, a special cover glass becomes unnecessary. Thus, the miniaturization of the imaging lens can be attained. When the lens on the most image side serves as a cover and a lens, the lens can be located closer to the image plane than in the case where the cover glass is arranged separately. Thus, the angle of incidence to the solid-state image sensing device can be controlled effectively.

An infrared cut filter can be easily formed by forming a film of infrared cut filter on the surface of the lens flat plate. That is, in the present invention, it is not necessary to provide a function of an infrared cut filter to the sensor cover glass, and a film of an infrared cut filter can be formed on the plate surface included in a lens. Therefore, the lens can be simply configured.

The conditional relationship (1) in the present invention specifies the focal length of the first lens object side surface. If the ratio of the focal length of the first lens to that of the lens system becomes equal to or shorter than the lower limit of the conditional relationship (1), correction of the spherical aberration and the coma aberration will become difficult. On the other hand, if the focal length becomes equal to or longer than the upper limit of the conditional relationship (1), the overall optical length will become longer. Therefore, by using the conditional relationship (1), it becomes possible to obtain an optical system having a short overall optical length and good aberration performance. In the conditional relationship (1), it is more desirable to set the lower limit and the upper limit to 0.8 and 1.2, respectively.

In the case where an optical system with short overall optical length with which a conditional relationship (1) is satisfied exceeds the upper limit of the conditional relationship (2), the aspheric surface sag amount becomes large and the thickness of the resin section needs to be thick. As the imaging lens in the present invention satisfies the conditional relationship (2), the metal mold die, which transfers the aspheric surface shape, can be made. In the conditional relationship (2), it is more desirable to set the upper limit to 0.14.

The conditional relationship (3) of the present invention defines the difference between Abbe's numbers of the lens element having a positive refractive power and of the lens element having a negative refractive power in the imaging lens, which is a bonded lens of the lens element having a positive refractive power and the lens element having a negative refractive power in the first lens. By satisfying this conditional relationship, it is possible to attain a satisfactory aberration property. In the conditional relationship (3), it is more desirable to set the lower limit and the upper limit to 10 and 50, respectively.

In the case where the first lens contains a lens flat plate, the conditional relationship (3') in the present invention specifies the difference of Abbe's numbers of the 1f-th lens element and the ib-th lens. A satisfactory aberration performance can be attained by satisfying this formula. In the conditional relationship (3), it is more desirable to set the lower limit and the upper limit to 15 and 45, respectively.

Light beam emitted from the first lens enters the plane of incidence and the emission plane of the second lens at a substantially perpendicular angle when the second lens is a meniscus lens in which the convex surface is directed toward the image side. Thereby, the occurrence of the curvature of field can be controlled.

The second lens includes a second lens flat plate and has a 2f-th lens element having a negative refractive power formed on the object side surface of the second lens flat plate, and a 2b-th lens element having the positive refractive power formed on the image side surface of the second lens flat plate. Thereby, the light flux, which has emitted the first lens, enters the incidence plane and the emission plane of the second lens with a substantially perpendicular angle. As a result, the occurrence of a curvature of field can be controlled.

Further, the principal point position of the whole imaging lens system can be arranged farther on the object side by arranging the object side surface of the lens element formed on the object side surface of the i-th lens flat plate into an aspherical surface having a concave shape directed toward the object side near the optical axis. Thereby, the overall optical length can be shortened. In addition, by making the object side surface of the lens element aspheric, it becomes possible to adopt the shape having an inflection point. Thus, the passage point of the principal ray of the maximum image height can be located in convex shape portion on the object side.

In each embodiment, it is more preferable that the lens flat plate be a flat plate. By forming a lens flat plate to be a flat plate, the forming of the plate becomes easier and the cost can be held low. In addition, it is not necessary to position the lens element on the plate.

In addition, in each embodiment, in the case where the L-th lens includes an L-th lens flat plate, an Lf-th lens element and an Lb-th lens element, it is desirable to use a resin material to the lens element as much as possible. By using a resin material for a lens element, the cost can be held low and the production can be performed more easily.

In each embodiment, in the case where the resin material is used for the 1f-th lens element and the 1b-th lens element, the upper limit of the conditional relationship (4) in the present invention restricts the type of selectable glass material. The type of selectable glass materials is further limited to the range of the conditional relationship (4). More preferably, in the case where the difference of Abbe's numbers of the 1f-th lens element having a positive refractive power and the 1b-th lens element having a negative refractive power is equal to 15 or greater in the conditional relationship (4), the chromatic aberration can be satisfactorily corrected. This is because it will become difficult to combine resin materials having a low cost and a high mass production capability when the upper limit of the conditional relationship (4) is exceeded. Therefore, in the conditional relationship (4), the lower limit and the upper limit are preferably set to 10 and 35, respectively.

In the case of UV hardening type resin, it is possible to produce a lot of lenses at once by applying UV lights onto the glass plate after forming the lens element. The compatibility with a replica method is good. That is, since UV hardening type resin is used in the present invention, the lens itself can be hardened when the replica method is used. Since the transparency of the lens is high, irradiated UV lights reaches the entire resin and the resin is hardened smoothly. Therefore, it can be said that it has a good compatibility with the replica method.

UV hardening type resin is excellent in heat resistance, and the lens module using this resin can go through the reflow process. Therefore, a process can be simplified greatly and it is most suitable for mass production and a less expensive lens module.

The conditional relationship (2) in the present invention also plays a big roll in the replica method, which uses UV hardening type resin. That is, when the aspheric surface sag amount is equal to or more than the conditional relationship in the present invention, the thickness of UV hardening type resin section becomes thick, and the penetration of ultraviolet rays will decrease and it will become difficult to harden the resin section.

By forming a film of a cover layer having a light blocking effect, an aperture diaphragm can be formed on the surface of any one of lens flat plates. That is, in the present invention, the conventional aperture diaphragm provided separately in between the first lens and the second lens can be replaced by a cover layer, having a light blocking property, formed on the surface of the lens flat plate, and thereby easily providing the function of the aperture diaphragm without using other members. In the present invention, since edge (thickness) of a filter becomes very small, an occurrence of ghost by the edge (filter section) is controlled.

When the aperture diaphragm is preferably provided between the first lens flat plate and the 1f-th lens elements or on the most object-side surface, the light ray can be gently bent. Therefore, an optical system which is more tele-centric (state where the principal ray is parallel to the optical axis) with respect to the image pick-up surface can be realized.

With respect to a method for manufacturing a plurality of units in which the solid-state image sensing device and the imaging lens section performing an image formation of the photographic object, an imaging lens in which all of the lenses have a lens flat plate is easily produced by a manufacturing method, in which the lens flat plates are laminated wich a lattice shaped spacer member inbetween, and the above mentioned integrated lens flat plates and the above mentioned spacer member portion are cut.

In the imaging lens in which all the lenses have a lens flat plate, the infrared cut filter can be provided on the surface of any one of the lens flat plate by forming a film of infrared cut filter layer.

By making all surfaces of the lens element that contacts the air to be aspheric, the optical system having more satisfactory aberration performance can be obtained. That is, the correction of the aberration is easier in the case in which the aspherical surface lens is used compared to the case where a spherical surface lens is used. Further, it is easier to correct the aberration with a plurality of surfaces rather than correcting the aberration with one surface. Therefore, in the present invention in which a lot of surfaces are formed aspheric, it becomes possible to satisfactorily correct the aberration.

The invention claimed is:

1. An imaging lens, comprising, in order from an object side:
    a first lens having a positive refracting power;
    a second lens having a concave shape toward an object side; and
    (i−2) number of lens, where i is an integer equal to 3 or more, wherein an i-th lens, which is counted from the object side, is on the most image side and includes:
an i-th lens flat plate; and
an if-th lens element which is formed on an object-side surface of the i-th lens flat plate, has a different refractive index than the i-th lens flat plate, and has a convex shape toward the object side at a position where a principal ray of a maximum image height passes through,
wherein the following relationship is satisfied:

$$0.01 < Di/Dt < 0.15 \qquad (A)$$

where:
Di is an optical axis distance, which is a lens interval, between an (i−1)th lens counted from the object side and the i-th lens; and
Dt is an optical axis distance, which is an overall optical distance, from an object-side surface of the first lens and an image plane.

2. An imaging lens, comprising in order from an object side:
a first lens having a positive refracting power;
a second lens having a concave shape toward an object side; and
(i−2) number of lens, where i is an integer equal to 3 or more,
wherein an i-th lens, which is counted from the object side, is on the most image side and includes:
an i-th lens flat plate;
a lens element which is formed on an object-side surface of the i-th lens flat plate, has a different refractive index than the i-th lens flat plate, and has a convex shape toward the object side at a position where a principal ray of a maximum image height passes through.

3. An imaging lens, comprising in order from an object side:
a first lens having a positive refracting power;
a second lens having a concave shape toward an object side; and
(i−2) number of lens, where i is an integer equal to 3 or more,
wherein an i-th lens, which is counted from the object side, is on the most image side, and includes:
an i-th lens flat plate;
a lens element which is formed on a object-side surface of the i-th lens flat plate, has a different refractive index than the i-th lens flat plate, has a convex shape toward the object side at a position where a principal ray of a maximum image height passes through; and
a lens element which is provided on an image-side surface of the i-th lens, and has a convex shape toward the image side at a position where the principal ray of the maximum image height passes through.

4. The imaging lens of claim 1, wherein the following relationship is satisfied:

$$0.6 \leq \frac{f_{s1}}{f} \leq 1.3 \qquad (1)$$

where:
$f_{s1}$ is a focal length of an object-side surface of an object-side lens element of the first lens; and
f is a focal length of the imaging lens.

5. The imaging lens of claim 1, wherein the i-th lens includes:
an ib-th lens element formed on an image-side surface of the i-th lens flat plate
wherein the following relationship is satisfied:

$$\frac{|X - X_0|}{Y} < 0.16 \qquad (2)$$

where:
X is an aspherical deviation given by the following Equation (a);
$X_0$ is an aspherical deviation of a rotational quadric surface given by the following Equation (b); and
Y is a maximum image height in the imaging lens, $$X = \frac{h^2/R_{ib}}{1 + \sqrt{1 - (1 + K_{ib})h^2/R_{ib}^2}} + \sum A_m h^m \qquad \text{Equation (a)}$$

$$X_0 = \frac{h^2/R_{ib}}{1 + \sqrt{1 - (1 + K_{ib})h^2/R_{ib}^2}} \qquad \text{Equation (b)}$$

where:
$A_{im}$ is an m-order aspherical coefficient of an image-side surface of the ib-th lens element;
$R_{ib}$ is a radius of curvature of the image-side surface of the ib-th lens element;
$K_{ib}$ is a conical coefficient of the image-side surface of the ib-th lens element; and
h is a distance between the optical axis and a point, on the image-side surface of the ib-th lens element, at which the principal ray of the maximum image height passes through.

6. The imaging lens of claim 1, wherein the first lens is a cemented lens configured of a first lens piece having a positive refracting power and a second lens piece having a negative refracting power, and the following relationship is satisfied:

$$5 < |v_1 - v_2| < 70 \qquad (3)$$

where:
$v_1$ is an Abbe's number of the first lens piece; and
$v_2$ is an Abbe's number of the second lens piece.

7. The imaging lens of claim 1, wherein the first lens includes:
a first lens flat plane;
a 1f-th lens element formed on an object-side surface of the first lens flat plate and having a positive refracting power; and
a 1b-th lens element formed on an image-side surface of the first lens flat plate and having a negative refracting power,
wherein the following relationship is satisfied:

$$5 < |v_1 - v_2| < 70 \qquad (3')$$

where:
$v_1$ is an Abbe's number of the 1f-th lens element; and
$v_2$ is an Abbe's number of the 1b-th lens element.

8. The imaging lens of claim 1, wherein the second lens is a meniscus lens which has a convex surface toward the image side.

9. The imaging lens of claim 1, wherein the second lens includes:
- a second lens flat plane;
- a 2f-th lens element which is formed on an object-side surface of the second lens flat plane and has a negative refracting power; and
- a 2b-th lens element which is formed on an image-side surface of the second lens flat plane and has a positive refracting power.

10. The imaging lens of claim 1, wherein an object-side surface of the 1f-th lens element is aspheric surface having a concave shape toward the object side in the vicinity of the optical axis.

11. The imaging lens of claim 1, wherein at least one of the lenses and lens elements is made of resin material.

12. The imaging lens of claim 1, wherein all of the first lens to the (i−1)th lens have a lens flat plate and a lens element, and each lens element and each lens flat plate have a different refractive index in each of the first lens to the (i−1)th lens.

13. The imaging lens of claim 1, wherein the first lens includes:
- a first lens flat plane;
- a 1f-th lens element formed on an object-side surface of the first lens flat plate and having a positive refracting power; and
- a 1b-th lens element formed on an image-side surface of the first lens flat plate and having a negative refracting power, wherein the lens element included in the i-th lens is made of UV hardening resin material, and the following relationship is satisfied:

$$5 < |v_1 - v_2| < 40 \qquad (4)$$

where:
- $v_1$ is an Abbe's number of the 1f-th lens element; and
- $v_2$ is an Abbe's number of the 1b-th lens element.

14. The imaging lens of claim 1, wherein i=3.

15. The imaging lens of claim 1, wherein the i-th lens flat plate includes an optical functional thin film on the surface thereof.

16. The imaging lens of claim 1, wherein an optical surface, of each of the lenses, contacting with air is aspherical.

17. An imaging device comprising the imaging lens of claim 1 and a solid-state image sensor.

18. A mobile terminal comprising the imaging device of claim 17.

* * * * *